US009869167B2

(12) United States Patent
Randolph

(10) Patent No.: US 9,869,167 B2
(45) Date of Patent: Jan. 16, 2018

(54) CARBON DIOXIDE-BASED GEOTHERMAL ENERGY GENERATION SYSTEMS AND METHODS RELATED THERETO

(71) Applicant: TerraCOH Inc., Bloomington, MN (US)

(72) Inventor: Jimmy Bryan Randolph, Minneapolis, MN (US)

(73) Assignee: TerraCOH Inc., Bloomington, MN (US)

(*) Notice: Subject to any disclaimer, the term of this patent is extended or adjusted under 35 U.S.C. 154(b) by 0 days.

(21) Appl. No.: 13/800,720

(22) Filed: Mar. 13, 2013

(65) Prior Publication Data

US 2014/0130498 A1    May 15, 2014

Related U.S. Application Data

(60) Provisional application No. 61/725,270, filed on Nov. 12, 2012.

(51) Int. Cl.
*F03G 4/00*    (2006.01)
*E21B 43/24*    (2006.01)
(Continued)

(52) U.S. Cl.
CPC ............ *E21B 43/24* (2013.01); *E21B 43/164* (2013.01); *E21B 43/40* (2013.01); *F24J 3/085* (2013.01); *Y02E 10/14* (2013.01); *Y02P 90/70* (2015.11)

(58) Field of Classification Search
CPC ........ F01K 13/00; F01K 21/005; F01K 23/04; F03G 7/04; F23G 5/46; F23G 2206/203; Y02E 10/10; Y02E 20/12; Y02E 20/14
(Continued)

(56) References Cited

U.S. PATENT DOCUMENTS 3,786,858 A    1/1974 Potter et al.
4,060,988 A    12/1977 Arnold
(Continued)

FOREIGN PATENT DOCUMENTS

CA    2753393 C    9/2013
FR    2881482 A1    8/2006
(Continued)

OTHER PUBLICATIONS

"Amplatzer®—Multifenstrated Septal Occluder—"Cribriform"", © 2007-2010 AGA Medical Corporation, 10 pgs.
(Continued)

*Primary Examiner* — Jonathan Matthias
(74) *Attorney, Agent, or Firm* — Schwegman Lundberg & Woessner, P.A.

(57) ABSTRACT

A system comprises an injection well in communication with an underground reservoir containing a native methane-containing solution at a first temperature, a production well in communication with the reservoir, a supply system providing a non-water based working fluid to the injection well at a second temperature lower than the first temperature, wherein exposure of the working fluid to the native fluid causes a portion of methane to come out of solution to form a production fluid of at least a portion of the working fluid and the portion of methane, and exposure to the first temperatures heats the production fluid to a third temperature higher than the second temperature, wherein the heated production fluid enters the production well, and an energy recovery apparatus in communication with the productions well for converting energy in the production fluid to electricity, heat, or a combination thereof.

34 Claims, 18 Drawing Sheets

(51) Int. Cl.
  *E21B 43/16* (2006.01)
  *E21B 43/40* (2006.01)
  *F24J 3/08* (2006.01)

(58) Field of Classification Search
  USPC ......... 166/302, 268, 402, 267, 305.1, 272.1, 166/303; 60/641.2–641.5
  See application file for complete search history.

(56) References Cited

U.S. PATENT DOCUMENTS

| | | | |
|---|---|---|---|
| 4,132,269 A | 1/1979 | Chasteen | |
| 4,137,719 A | 2/1979 | Rex | |
| 4,200,152 A | 4/1980 | Foster et al. | |
| 4,223,729 A | 9/1980 | Foster | |
| 4,357,802 A | 11/1982 | Wahl, III et al. | |
| 4,765,143 A | 8/1988 | Crawford et al. | |
| 4,787,450 A * | 11/1988 | Andersen et al. | 166/267 |
| 5,038,567 A | 8/1991 | Mortiz | |
| 5,685,362 A | 11/1997 | Brown | |
| 6,668,554 B1 * | 12/2003 | Brown | E21B 41/0064 60/641.2 |
| 7,320,221 B2 | 1/2008 | Bronicki | |
| 7,562,708 B2 | 7/2009 | Cogliandro et al. | |
| 7,624,801 B2 | 12/2009 | Zubrin et al. | |
| 7,650,939 B2 | 1/2010 | Zubrin et al. | |
| 7,654,320 B2 | 2/2010 | Payton | |
| 7,654,330 B2 | 2/2010 | Zubrin et al. | |
| 7,753,122 B2 | 7/2010 | Curlett | |
| 7,753,972 B2 | 7/2010 | Zubrin et al. | |
| 7,810,565 B2 | 10/2010 | Zubrin et al. | |
| 7,866,385 B2 | 1/2011 | Lambirth | |
| 7,937,948 B2 | 5/2011 | Zubrin et al. | |
| 7,946,346 B2 | 5/2011 | Zornes | |
| 7,975,482 B2 | 7/2011 | Foppe | |
| 8,047,007 B2 | 11/2011 | Zubrin et al. | |
| 8,316,955 B2 | 11/2012 | Saar et al. | |
| 8,833,475 B2 | 9/2014 | Saar et al. | |
| 8,991,510 B2 | 3/2015 | Saar et al. | |
| 2002/0195246 A1 | 12/2002 | Davidson | |
| 2004/0200618 A1 | 10/2004 | Piekenbrock | |
| 2005/0189108 A1 | 9/2005 | Davidson | |
| 2006/0026961 A1 * | 2/2006 | Bronicki | F02C 1/05 60/641.2 |
| 2007/0193744 A1 | 8/2007 | Bridges | |
| 2007/0223999 A1 | 9/2007 | Curlett | |
| 2007/0261844 A1 | 11/2007 | Cogliandro et al. | |
| 2008/0283247 A1 | 11/2008 | Zubrin et al. | |
| 2008/0283249 A1 | 11/2008 | Zubrin et al. | |
| 2008/0296018 A1 | 12/2008 | Zubrin et al. | |
| 2009/0008089 A1 | 1/2009 | Zubrin et al. | |
| 2009/0014170 A1 | 1/2009 | Zubrin et al. | |
| 2009/0236093 A1 | 9/2009 | Zubrin et al. | |
| 2010/0038082 A1 | 2/2010 | Zubrin et al. | |
| 2010/0163226 A1 | 7/2010 | Zornes | |
| 2010/0206565 A1 | 8/2010 | Embry et al. | |
| 2010/0224369 A1 | 9/2010 | Calderon et al. | |
| 2010/0272515 A1 | 10/2010 | Curlett | |
| 2010/0314136 A1 | 12/2010 | Zubrin et al. | |
| 2011/0000210 A1 * | 1/2011 | Miles | 60/641.2 |
| 2011/0067410 A1 | 3/2011 | Zubrin et al. | |
| 2011/0173139 A1 | 7/2011 | Zauderer | |
| 2011/0203292 A1 | 8/2011 | Zubrin et al. | |
| 2011/0272166 A1 * | 11/2011 | Hunt | 166/402 |
| 2011/0290483 A1 | 12/2011 | Zornes | |
| 2012/0001429 A1 | 1/2012 | Saar et al. | |
| 2012/0038174 A1 * | 2/2012 | Bryant et al. | 290/1 R |
| 2012/0240577 A1 * | 9/2012 | Mandelberg et al. | 60/641.15 |
| 2013/0043678 A1 * | 2/2013 | Saar et al. | 290/2 |
| 2013/0062890 A1 | 3/2013 | Saar et al. | |

FOREIGN PATENT DOCUMENTS

| | | |
|---|---|---|
| JP | 2008-248837 A1 | 10/2008 |
| JP | 2008248837 A | 10/2008 |
| WO | WO-2010/104599 A2 | 9/2010 |
| WO | WO 2010104599 A2 * | 9/2010 |
| WO | WO-2014015307 A1 | 1/2014 |
| WO | WO-2014075071 A2 | 5/2014 |
| WO | WO-2014075071 A3 | 5/2014 |

OTHER PUBLICATIONS

"U.S. Appl. No. 13/202,746, Examiner Interview Summary dated Apr. 16, 2012", 4 pgs.

"U.S. Appl. No. 13/202,746, Examiner Interview Summary dated Jun. 11, 2012", 8 pgs.

"U.S. Appl. No. 13/202,746, Non Final Office Action dated Jan. 12, 2012", 10 pgs.

"U.S. Appl. No. 13/202,746, Non Final Office Action dated May 3, 2012", 8 pgs.

"U.S. Appl. No. 13/202,746, Notice of Allowance dated Jul. 31, 2012", 5 pgs.

"U.S. Appl. No. 13/202,746, Response dated Apr. 12, 2012 to Non Final Office Action dated Jan. 12, 2012", 16 pgs.

"U.S. Appl. No. 13/202,746, Response dated Jul. 20, 2012 to Non Final Office Action dated May 3, 2012", 8 pgs.

"U.S. Appl. No. 13/663,893, Non Final Office Action dated Feb. 27, 2013", 9 pgs.

"U.S. Appl. No. 13/663,893, Response dated May 22, 2013 to Non Final Office Action dated Feb. 27, 2013", 18 pgs.

"Binary cycle geothermal plant", The Encyclopedia of Alternative Energy and Sustainable Living, [online] {archived Apr. 13, 2008]. Retrieved from the Internet: <URL: http://web.archive.org/web/20080413112401/http://www.daviddarling.info/encyclopedia/B/AE_binary_cycle_geothermal_plant.html>, (2008). 2 pgs.

"Canadian Application Serial No. 2,753,393, Office Action dated Dec. 14, 2012", 2 pgs.

"Canadian Application Serial No. 2,753,393, Response filed Mar. 1, 2013 to Office Action dated Dec. 14, 2012", 13 pgs.

"Carbon Dioxide Enhanced Oil Recovery", The Energy Lab, National Energy Technology Laboratory, U.S. Department of Energy, (2010), 32 pgs.

"International Application Serial No. PCT/US2010/000756, International Preliminary Report on Patentability dated Sep. 22, 2011", 5 pgs.

"International Application Serial No. PCT/US2010/000756, International Search Report dated Nov. 17, 2010", 3 pgs.

"International Application Serial No. PCT/US2010/000756, Written Opinion dated Nov. 17, 2010", 3 pgs.

Atrens, A. D, et al., "$CO_2$ Thermosiphon for Competitive Geothermal Power Generation", Energy & Fuels, 23, (2009), 553-557.

Freifeld, B., et al., "Geothermal Energy Production Coupled With CCS: Heat Recovery Using an Innovative High Efficiency SupercriticalCO₂ Turboexpansion Cycle", Powerpoint presentation giving at an Alberta Innovates Technology Futurs conference, (Mar. 26, 2012), 20 pgs.

Mathias, J. A., et al., "Experimental Testing of Gerotor and Scroll Expanders Used in, and Energetic and Exergetic Modeling of, an Organic Rankine Cycle", *Journal of Energy Resources Technology*, 131, (Mar. 2009), 012201-1-012201-9.

Quoilin, S., et al., "Experimental study and modeling of an Organic Rankine Cycle using scroll expander", *Applied Energy*, 87, (2010), 1260-1268.

Randolph, J. B., et al., "Coupling carbon dioxide sequestration with geothermal energy capture in naturally permeable, porous geologic formations: Implications for $CO_2$ sequestration", *Energy Procedia*, 4, (2011), 2206-2213.

Randolph, J. B., et al., "Coupling Geothermal Energy Capture with Carbon Dioxide Sequestration in Naturally Permeable, Porous Geologic Formations: A Comparison with Enhanced Geothermal Systems", *GRC Transactions*, vol. 34, (Oct. 2010), 433-437.

Randolph, J. B., et al., "Combining geothermal energy capture with geologic carbon dioxide sequestration", *Geophysical Research Letters*, vol. 38, L10401, (May 19, 2011), 7 pgs.

(56) References Cited

OTHER PUBLICATIONS

Smith, T. C. B., "Low Cost Organic Rankine Cycles for Grid Connected Power Generation", *Proceedings of ISES Solar World Congress*, (Jun. 2003), 8 pgs.

Taggart, I., "Extraction of Dissolved Methane in Brines by $CO_2$ Injection: Implication for $CO_2$ Sequestration", SPE 124630, *SPE Annual Technical Conference and Exhibition*, held in New Orleans, Louisiana, USA, Oct. 4-7, 2009, (2009), 14 pgs.

U.S. Appl. No. 13/663,893, filed Oct. 30, 2012, Carbon Dioxide-Based Geothermal Energy Generation Systems and Methods Related Thereto.

U.S. Appl. No. 13/554,868, filed Jul. 20, 2012, Carbon Dioxide-Based Geothermal Energy Generation Systems and Methods Related Thereto.

"AN 2008-M08991, Database WPI Week 200871", Thomson Scientific, London, GB, 2 pgs.

"U.S. Appl. No. 13/554,868, Non Final Office Action dated Jul. 28, 2014", 5 pgs.

"U.S. Appl. No. 13/663,893 , Response dated Nov. 21, 2013 to Final Office Action dated Sep. 27, 2013", 10 pgs.

"U.S. Appl. No. 13/663,893, Final Office Action dated Sep. 27, 2013", 8 pgs.

"U.S. Appl. No. 13/663,893, Non Final Office Action dated Jan. 27, 2014", 5 pgs.

"U.S. Appl. No. 13/663,893, Notice of Allowance dated May 12, 2014", 5 pgs.

"U.S. Appl. No. 13/663,893, Response filed Apr. 24, 2014 to Non Final Office Action dated Jan. 27, 2014", 7 pgs.

"Australian Application Serial No. 2010223059, First Examiner Report dated Mar. 15, 2014", 3 pgs.

"European Application Serial No. 10751138.8, Office Action dated Nov. 22, 2013", 1 pg.

"European Application Serial No. 10751138.8, Response dated May 21, 2014 to Office Action dated Nov. 22, 2013", 15 pgs.

"European Application Serial No. 10751138.8, Supplementary European Search Report dated Nov. 5, 2013", 6 pgs.

"International Application Serial No. PCT/US2013/051379, International Search Report dated Oct. 2, 2013", 4 pgs.

"International Application Serial No. PCT/US2013/051379, Written Opinion dated Oct. 2, 2013", 9 pgs.

"International Application Serial No. PCT/US2013/069680, International Search Report dated Sep. 19, 2014", 4 pgs.

"International Application Serial No. PCT/US2013/069680, Written Opinion dated Sep. 19, 2014", 5 pgs.

Hosseini, Seyyed Abolfazl, et al., "Analytical Model for CO2 Injection into Brine Aquifers-Containing Residual CH4", Transport in Porous Media, vol. 94, No. 3, (Jun. 12, 2012), 795-815.

Oldenburg, Curtis M, et al., "CO2 Injection for Enhanced Gas Production and Carbon Sequestration", SPE International Petroleum Conference and Exhibition in Mexico, (Feb. 12, 2002).

Taggart, Ian James, et al., "Extraction of Dissolved Methane in Brines by CO2 Injection: Implication for CO2 Sequestration", SPE Annual Technical Conference and Exhibition, (Oct. 31, 2009), 791-801.

"U.S. Appl. No. 13/554,868, Notice of Allowance dated Nov. 12, 2014", 5 pgs.

"U.S. Appl. No. 13/554,868, Response dated Oct. 28, 2014 to Non Final Office Action dated Jul. 28, 2014", 8 pgs.

"Australian Application Serial No. 2010223059, Response dated Jul. 23, 2014 to First Examiner Report mailed Mar. 15, 2014", 11 pgs.

"International Application Serial No. PCT/US2013/051379, International Preliminary Report on Patentability dated Jan. 29, 2015", 10 pgs.

"International Application Serial No. PCT/US2013/069680, International Preliminary Report on Patentability dated May 21, 2015", 7 pgs.

"European Application Serial No. 13745264.5, Office Action dated Mar. 13, 2015", 2 pgs.

"European Application Serial No. 13745264.5, Response dated Aug. 27, 2015 to Office Action dated Mar. 13, 2015", 19 pgs.

\* cited by examiner

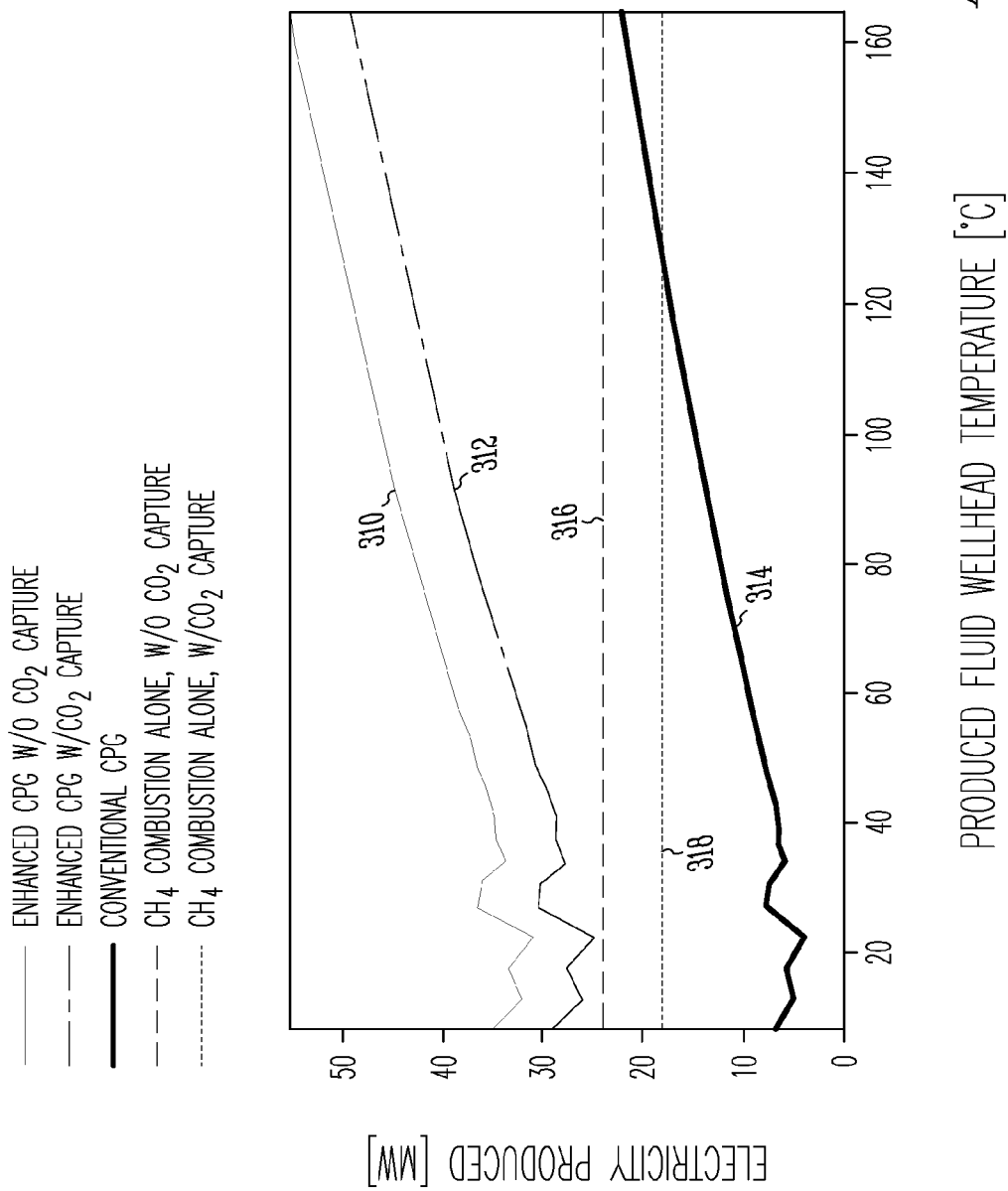

CARBON DIOXIDE-BASED GEOTHERMAL ENERGY GENERATION SYSTEMS AND METHODS RELATED THERETO

CROSS-REFERENCE TO RELATED APPLICATIONS

The subject matter of this application is related to Randolph, U.S. Provisional Patent Application Ser. No. 61/725,270, entitled "ENHANCED CARBON-DIOXIDE BASED GEOTHERMAL ENERGY GENERATION SYSTEMS AND METHODS," filed on Nov. 12, 2012, which is incorporated by reference herein in its entirety.

BACKGROUND

In light of global climate change and in response to an increased desire to reduce dependence on foreign oil supplies, renewable energy systems, such as wind, solar and geothermal-based systems are being increasingly researched and developed. However, many such systems have only limited potential due to, for example, high costs, overall process inefficiencies, possible adverse environmental impact, and the like.

SUMMARY

This disclosure describes systems and methods for efficiently recovering geothermal heat from reservoirs by injecting a non-water based working fluid, such as carbon dioxide ($CO_2$), into the reservoir to extract geothermal heat. The $CO_2$ can then be produced back to the surface and a portion of the geothermal energy captured by the $CO_2$ can be recovered by an energy recovery apparatus, such as an electricity production apparatus (e.g., an expansion device driving a generator) or a heat recovery apparatus (e.g., one or more heat exchangers for heating a second working fluid).

In particular, this disclosure describes recovering geothermal heat from reservoirs that include a native fluid including a solution comprising natural gas, and in particular methane ($CH_4$). The $CO_2$ can cause the $CH_4$ to come out of solution with the native fluid such that the $CH_4$ forms a production fluid with the $CO_2$. The production fluid can be heated by geothermal heat and produced to the surface where at least a portion of the $CH_4$ can be separated from the production fluid and combusted to increase the overall temperature of the production fluid before it is fed into the energy recovery apparatus. Such a system and method can utilize the chemical properties of $CO_2$ to extract $CH_4$ from the reservoir, and then can use the chemical energy stored in a portion of the $CH_4$ to supplement the geothermal energy captured by the production fluid. The recovery of methane from the reservoir and subsequent combustion of a portion of the methane to boost production fluid temperature or pressure, or both, can increase the overall system efficiency and the overall power produced compared to geothermal capture alone. The methane capture and use of the systems and methods of the present disclosure can allow for economically viable recovery of geothermal energy from low-temperature reservoirs (e.g., down to about 15° C., or, in some situations, down to about 10° C.). The systems and methods of the present invention can, therefore, open up reservoirs for geothermal exploitation that heretofore had been economically difficult or impossible to achieve.

The present disclosure describes a system comprising one or more injection wells for accessing one or more underground reservoirs, the one or more reservoirs being at one or more first temperatures and containing at least one native fluid, the native fluid including a solution comprising methane, each of the one or more injection wells having an injection well reservoir opening in fluid communication with at least one of the one or more reservoirs. The system further includes one or more production wells, each having a production well reservoir opening in fluid communication with at least one of the one or more reservoirs. A working-fluid supply system provides a non-water based working fluid to the one or more injection wells at a second temperature lower than the first temperatures. Exposure of the non-water based working fluid to the native fluid causes at least a portion of the methane to come out of solution with the native fluid to form a production fluid of at least a portion of the non-water based working fluid and the portion of the methane. Exposure of the mixture to the first temperatures heats the production fluid to a third temperature that is higher than the second temperature, wherein the production fluid is capable of entering one or more of the production well reservoir openings. The system also includes an energy recovery apparatus in fluid communication with the one or more productions wells, wherein energy contained in the production fluid can be converted to electricity, heat, or a combination thereof, in the energy recovery apparatus.

The present disclosure also describes a method comprising introducing a non-water based working fluid at a first temperature through one or more injection wells to one or more underground reservoirs containing at least one native fluid, the native fluid including a solution comprising methane, wherein the one or more reservoirs are at one or more second temperatures that are greater than the first temperature, exposing the non-water based working fluid to the native fluid so that at least a portion of the methane comes out of solution with the native fluid to form a production fluid of at least a portion of the non-water based working fluid and the portion of the methane, exposing the production fluid to the second temperature to heat the production fluid to a third temperature that is greater than the first temperature, producing the production fluid through one or more production wells, and extracting energy from the production fluid.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

BRIEF DESCRIPTION OF THE DRAWINGS

FIG. 12A shows a graph of electricity produced by a methane-enhanced geothermal energy recovery system compared to a non-enhanced $CO_2$-based geothermal energy recovery system and compared to methane combustion depending on the wellhead temperature of the produced fluid.

DETAILED DESCRIPTION

Figure 1:
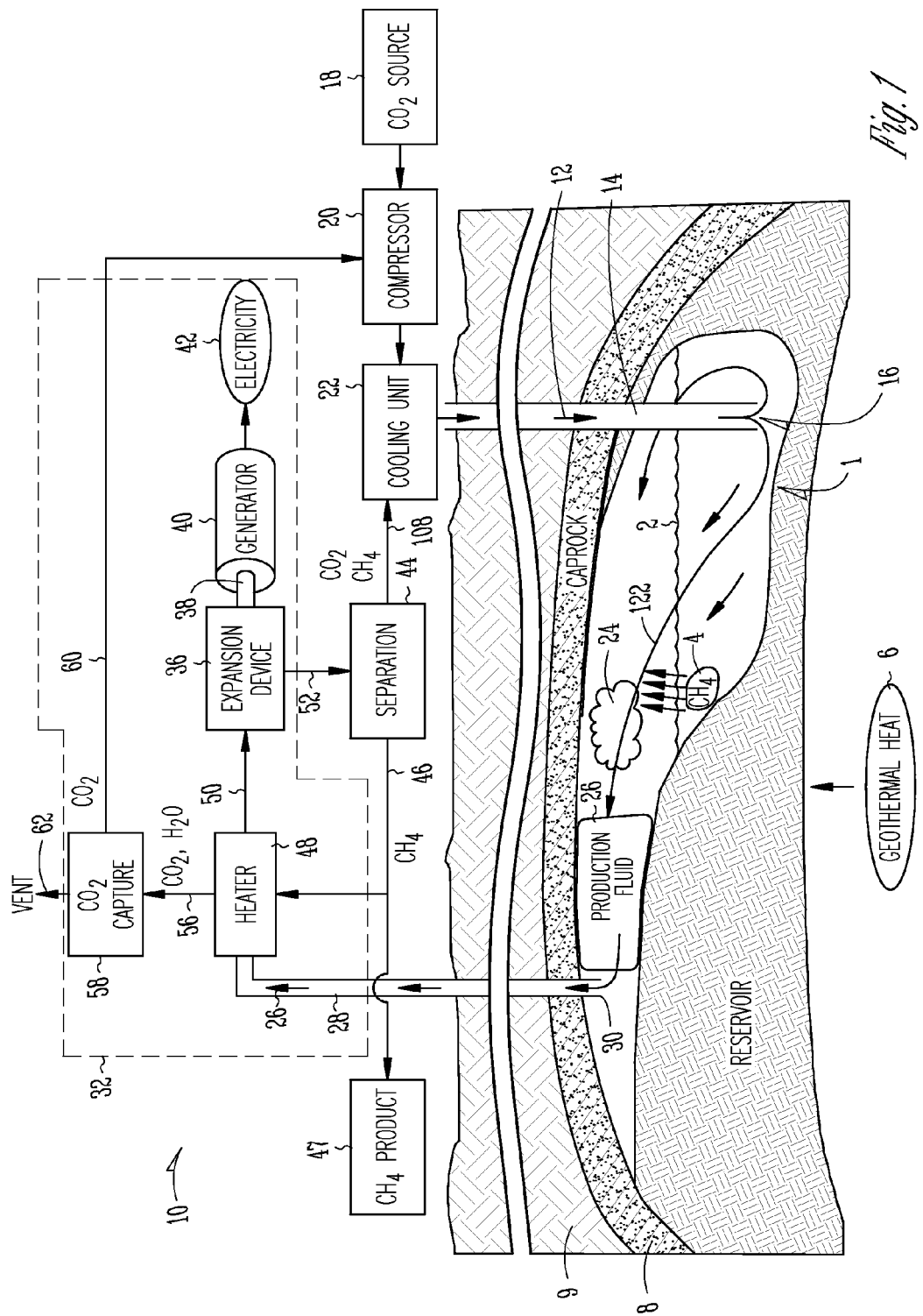
FIG. 1 is a simplified schematic diagram of an example geothermal energy recovery system.

In the following detailed description, reference is made to the accompanying drawings that form a part hereof, and in which is shown by way of illustration, specific examples in which the invention may be practiced. These examples are described in sufficient detail to enable those skilled in the art to practice the invention, and it is to be understood that other embodiments may be utilized. It is also to be understood that structural, procedural, chemical and system changes can be made without departing from the spirit and scope of the present invention. The following detailed description is, therefore, not to be taken in a limiting sense, and the scope of the present invention is defined by the appended claims and their equivalents.

The present disclosure describes geothermal energy recovery systems and methods using a non-water based working fluid, such as carbon dioxide ($CO_2$) for the recovery of geothermal energy. The geothermal energy recovery systems and methods can include aspects of the example systems and methods disclosed in U.S. Pat. No. 8,316,955 to Saar, et al., entitled "CARBON DIOXIDE-BASED GEOTHERMAL ENERGY GENERATION SYSTEMS AND METHODS RELATED THERETO," and U.S. Pat. No. 8,991,510 to Saar et al., entitled "CARBON DIOXIDE-BASED GEOTHERMAL ENERGY GENERATION SYSTEMS AND METHODS RELATED THERETO," both of which are hereby incorporated by reference herein in their entireties. As described in these applications, a carbon dioxide working fluid can travel through the reservoir as a gas plume such that the system in the applications are referred to as Carbon Dioxide (or $CO_2$) Plume Geothermal ("CPG") systems.

The present disclosure also describes feeding the non-water based working fluid to a reservoir that contains a native fluid comprising a solution including methane. For example, the reservoir can comprise a deep brine aquifer comprising a brine solution with natural gas (the natural gas comprising generally about 97% methane or more) dissolved in the brine solution. Because "natural gas," as it is used herein, is generally at least about 97 wt % methane or more, the remainder of this disclosure will refer to it as "methane" for the sake of brevity. It will be understood by a person of ordinary skill in the art that "methane" can refer to other gaseous hydrocarbons that can be included in natural gas, such as ethane, propane, and higher order alkanes. The injection of a carbon dioxide working fluid into the brine aquifer can cause a portion of the $CO_2$ to dissolve into the brine solution, which can force a substantial portion of the dissolved methane out of solution. The released methane can combine with the remaining $CO_2$ to form a production fluid in the form of a gaseous plume similar to the $CO_2$ plumes in the CPG systems. In addition, a zone of a mixture of brine solution with dissolved or free-phase methane plus $CO_2$ can form between the native brine solution and the zone of $CO_2$ combined with methane. The fluid comprising brine, methane, and/or $CO_2$ can also form a production fluid, in addition to the production fluid that is similar to a $CO_2$ plume formed in a CPG system. As described in more detail below, a portion of the methane recovered from the brine aquifer can be combusted to increase the temperature or the pressure, or both, of the production fluid prior to recovering energy from the production fluid, such as by passing the production fluid through an expansion device that powers a generator to produce electricity. The remainder of the methane present in the production fluid can either be separated out and sold, or it can be re-injected into the reservoir to provide for further production and use in the energy recover system. The use of recovered methane to boost the economic efficiency of the system can be referred to herein as methane-enhanced $CO_2$ Plume Geothermal ("ME-CPG") systems.

Alternatively, the reservoir can include an oil or natural gas field where the oil or natural gas hydrocarbons have been partially recovered using conventional recovery methods. The oil or natural gas hydrocarbons can be recovered via the injection of carbon dioxide or other recovery fluids into the field in order to release a portion of the hydrocarbons from the reservoir. This process can be referred to as "enhanced oil recovery" (EOR) (described in more detail below). The production fluid from an EOR field can include the $CO_2$ working fluid, methane and other natural gas components, other higher order hydrocarbons, and brine. As with the brine aquifer reservoir described above, a portion of the methane recovered from the EOR field can be used to increase the temperature, the pressure, or both of the production fluid before further energy recovery is conducted. The EOR hydrocarbons can be separated from the production fluid and sold. A portion of the separated hydrocarbons can also be combusted to heat the working fluid or increase the working fluid's pressure prior to energy recovery.

The systems of this disclosure can include components or aspects where considerable heat is generated—heat that typically is lost to the atmosphere. For example, both EOR and CPG systems can include one or more compressors for the $CO_2$ so that the $CO_2$ can be injected back into the reservoir for further oil or natural gas recovery, geothermal heat recovery, or $CO_2$ sequestration. The compressors can generate considerable heat, on the order of 400 to 450 kilojoules (kJ) per kilogram (kg) of $CO_2$ compressed for each stage of compression, depending on the type of compressor system used. EOR systems can also generate considerable heat during the separation of the oil and natural gas hydrocarbons from the production fluid, for example if a portion of the methane or other produced fluid is combusted to heat the production fluid in order to improve separation efficiency.

In some examples, the geothermal energy recovery system and the EOR system (if present) can be co-located with another facility type, e.g., a power plant or an ethanol or biofuel production facility. For example, the co-located facility can be the initial source of $CO_2$ that is compressed and injected into the reservoir for the recovery of geothermal heat, methane, and/or other hydrocarbons. The co-located facility can also typically produce considerable waste heat. In addition, for a co-located biofuel production facility, such as an ethanol plant, a portion of the biofuel produced at the plant can be combusted to increase the temperature of a working fluid or production fluid or to increase the pressure of the working fluid, or both, prior to energy recovery from the working fluid or production fluid. Similarly, biofuel or other from an off-site third party can be obtained and transported to the geothermal recovery system and combusted to increase the temperature of a working fluid or production fluid or to increase the pressure of the working fluid, or both.

In some examples, the systems and methods of the present disclosure can include a heat recovery system for recovering waste heat generated by some other aspect of the system or method, such as waste heat from the $CO_2$ compressors, the EOR separation system, or a co-located facility. The waste heat recovered by the heat recovery system can also be used to increase the temperature, the pressure, or both of the production fluid before it is fed into the energy recovery system (e.g., the expansion device and generator). Waste heat capture with a heat recovery system can increase the efficiency of the geothermal energy recovery system and method similar to the enhancement provided by recovered methane combustion in the ME-CPG system. The capture of waste heat to boost the economic efficiency of the system can be referred to herein as waste heat-enhanced $CO_2$ Plume Geothermal ("WHE-CPG") systems. It will be appreciated that both ME-CPG and WHE-CPG can be used in the same system.

Conventional Geothermal Energy Technology

Geothermal energy is heat energy generated and stored within the earth (or any other planet), which can be "mined" for various uses, including to produce electricity, for direct use, or for ground-source heat pumps. Geothermal energy sources can be relatively constant with heat energy replenished on human time scales after being "mined." Geothermal energy also can require no storage other than the earth.

Potential uses of conventional geothermal energy are generally temperature dependent, with cascading systems utilizing a single geothermal resource for multiple purposes. Water-based geothermal systems that use water as a working fluid (e.g., conventional water-based enhanced geothermal systems (EGS) and conventional non-EGS water-based) can require very high temperatures. For example, electricity generation at water-based geothermal power plants typically requires temperatures in excess of 165° C. Direct uses, such as aquaculture, greenhouse, industrial and agricultural processes, resorts, space and district heating (wells to structures) from such systems can utilize more moderate temperatures of about 38 to 165° C. when water is the subsurface geothermal working fluid. Residential and commercial building ground-source heat pumps from water-based geothermal systems, which may use a secondary heat exchange fluid (e.g., isobutene) in order to transfer geothermal heat energy from the ground for use, can generally require temperatures between about 4 and 38° C.

Definitions

The terms "subterranean" or "subsurface" or "underground," as used herein, can refer to locations and/or geological formations beneath the Earth's surface.

The term "in situ," as used herein, can refer to a natural or original position or place of a geologic feature which may be above ground or underground, such that it is located in a place where it was originally formed or deposited by nature and has remained substantially undisturbed over time, such that it is in substantially the same original condition. A geologic feature can be rock, mineral, sediment, reservoir, caprock and the like, or any combination thereof. A geologic feature is further considered to remain "in situ" following minor manmade disturbances used to create and/or position components, such as channels such as injection wells and/or production wells, within, around or near the feature. A feature is also considered to remain "in situ" following minor man-initiated disturbances, such as causing a controllable or limited amount of rock, mineral, sediment or soil to become dislodged as a result of the minor manmade or natural disturbance. In contrast, a feature is not considered to remain "in situ" following any type of large-scale manmade disturbances, including large-scale hydrofracturing (such as to create an artificial reservoir), or man-initiated disturbances, such as permanent deformation of a geologic feature, earthquakes and/or tremors following large-scale hydrofracturing, all of which can have a further negative impacts on groundwater flow paths, habitats and man-made structures.

The term "large-scale hydrofracturing," as used herein, can refer to a known method for creating or inducing artificial fractures and/or faults in a feature, such as a rock or partially consolidated sediments, typically during operation of an enhanced geothermal system (EGS). See, for example, U.S. Pat. No. 3,786,858 to Potter, which employs water for hydraulic fracturing of rock to create a thermal geological reservoir from which fluid is transported to the surface. Large-scale hydrofracturing is known to create unintended fluid flow pathways that can result in fluid loss or "shortcutting," which in turn decreases geothermal heating efficiencies of the working fluid. Large-scale hydrofracturing can also cause (micro-) seismicity and damages to natural and/or manmade structures.

The term "rock," as used herein, can refer to a relatively hard, naturally formed mineral, collection of minerals, or petrified matter. A collection of rocks is commonly referred to as a "rock formation." Various types of rocks have been identified on Earth, to include, for example, igneous, metamorphic, sedimentary, and the like. A rock can erode or be subject to mass wasting to become sediment and/or soil proximate to or at a distance of many miles from its original location.

The term "sediment," as used herein, can refer to a granular material eroded by forces of nature, but not yet to the point of becoming "soil." Sediment may be found on or within the Earth's crust. A collection of sediments is commonly referred to as a "sediment formation." Sediment is commonly unconsolidated, although "partially consolidated sediments" are often referred to simply as "sediments" and are therefore considered to be included within the definition of sediment.

The term "soil," as used herein, can refer to a granular material comprising a biologically active, porous medium. Soil is found on, or as part of, the uppermost layer of the Earth's crust and evolves through weathering of solid materials, such as consolidated rocks, sediments, glacial tills, volcanic ash, and organic matter. Although often used interchangeably with the term "dirt," dirt is technically not biologically active.

The term "fluid," as used herein, can refer to a liquid, gas, or combination thereof, or a fluid that exists above the critical point, e.g., a supercritical fluid. A fluid is capable of flowing, expanding, and accommodating a shape of its physical surroundings. A fluid can comprise a native fluid, a working fluid, or combinations thereof. Examples of fluid include, for example, air, water, brine (i.e., salty water), hydrocarbon, $CO_2$, magma, noble gases, or any combination thereof.

The term "native fluid," as used herein, can refer to a fluid which is resident in a rock formation or sediment formation prior to the implementation of the systems or methods of the present disclosure. A native fluid includes, but is not limited to, water, saline water, oil, natural gas, hydrocarbons (e.g., methane, natural gas, oil), and combinations thereof. Carbon dioxide can also be previously-present in the rock or sediment formation and thus constitute a native fluid in this case.

The term "working fluid," as used herein, can refer to a fluid which is not native to a rock formation or sediment formation and that is used by the systems or methods of the present disclosure for some purpose. A working fluid can undergo a phase change from a gas to a liquid (energy source), a liquid to gas (refrigerant), or can become part of a solution (e.g., by dissolving into a native fluid). A "working fluid" in a machine or in a closed loop system can be the pressurized gas or liquid which actuates the machine. Water is used as a working fluid in conventional (e.g., water-based) heat engine systems. Non-water based working fluids can include, but are not limited to, ammonia, sulfur dioxide, carbon dioxide, and non-halogenated hydrocarbons such as methane. A working fluid can include a fluid in a supercritical state. Different working fluids can have different thermodynamic and fluid-dynamic properties, resulting in different power conversion efficiencies.

The term "pore space" as used herein, can refer to any space not occupied by a solid (rock or mineral). Pore space can be the space formed between grains or the space formed by fractures, faults, fissures, conduits, caves, or any other type of non-solid space. Pore space can be connected or unconnected and it can evolve over time due to changes in solid space volume or size (which can come from chemical reactions, deformations, etc.). A space can be filled with fluid and still be deemed to be "pore space."

The term "$CO_2$ plume" as used herein, can refer to a large-scale (e.g., meters to several kilometers to tens of kilometers across) $CO_2$ presence within subsurface pore spaces. Within a $CO_2$ plume, a significant percentage of fluid in the pore space can be $CO_2$. The $CO_2$ plume can include other fluids, such as native methane or other hydrocarbons, which can be collected and carried by the $CO_2$ plume as it travels through a reservoir. For example, a $CO_2$ plume can include a substantial percentage (e.g., as much as 20 wt. %) methane that has been desorbed from a saline aquifer (as described in more detail below). A $CO_2$ plume can also include a substantial portion of native hydrocarbons, (e.g., up to 90 wt % hydrocarbons or more), and can still be considered a "$CO_2$ plume" within the meaning of the present disclosure. A $CO_2$ plume can contain a substantial portion, e.g., as much as 70% by volume, or more, of a native fluid such as brine or hydrocarbons extracted from a reservoir. The brine or other native fluid can be immobile or only minimally mobile and, therefore, generally considered in the art to be residually trapped.

The term "reservoir" or "storage rock formation" or "storage sediment formation," as used herein, can refer to a formation comprising one or more of rock, sediment, and soil that can be capable of receiving and storing an amount of fluid substantially "permanently" as that term is understood in the geological arts.

The term "geothermal heat flow," as used herein, can refer to any kind of heat transfer in the subsurface and can include one or more of conductive heat transfer, advective heat transfer (also referred to as convective heat transfer), and radiative heat transfer (although radiative heat transfer can typically be negligible in the subsurface). A "low" heat flow generally can be considered to be less than about 50 milliwatts per square meter. A "moderate" heat flow generally can be considered to be at least about 50 to about 80 milliwatts per square meter. A "high" heat flow generally can be considered to be greater than 80 milliwatts per square meter.

The term "injection well," as used herein, can refer to a well or borehole, which can be cased (e.g., lined) or uncased, and which can contain one or more pipes through which a fluid can flow (typically in a downward direction) for purposes of releasing that fluid into the subsurface at some depth.

The term "production well," as used herein, can refer to a well or borehole, which can be cased (e.g., lined) or uncased, and which can contain one or more pipes through which a fluid can flow (typically in an upward direction) for purposes of bringing fluids up from the subsurface up to the Earth's surface or near the surface. A production well can exist in the same borehole as an injection well.

The term "enhanced geothermal system" (EGS), as used herein, can refer to a system in which a manmade (e.g., artificial) reservoir is created, usually by means of large-scale hydrofracturing of the subsurface, e.g., by inducing fractures to create space which can contain significant amounts of fluid. Such artificial reservoirs typically can be much smaller than natural reservoirs.

The term "enhanced oil recovery" (EOR) (also referred to as "improved oil recovery," "tertiary recovery," or "quaternary recovery"), as used herein, can refer to a system or method of recovering hydrocarbons, including, by not limited to, liquid hydrocarbons such as crude oil and hydrocarbons such as natural gas that are gaseous at atmospheric pressure and temperature, from a reservoir. EOR can include the injection of a fluid, such as carbon dioxide, or other components into the reservoir in order to improve extraction of the hydrocarbons, such as by at least one of reducing the fluid viscosity, reducing the surface tension of the hydrocarbons, or increasing pressure in the reservoir, in order to more easily remove them from the reservoir.

The term "conventional water-based geothermal system," as used herein, can refer to a geothermal system that uses water as a working fluid. A conventional water-based geothermal approach can be used in natural reservoir systems or in hydrofractured (e.g., EGS) systems.

The term "conventional $CO_2$-based EGS," as used herein, can refer to a conventional EGS system that uses carbon dioxide as the working fluid.

The term "waste heat," as used herein, can refer to heat energy generated by a system or unit operation that typically is allowed to dissipate to the environment rather than being used for some other purpose within the system or method.

Enhanced CPG Systems

FIG. 1 shows an example system 10 for the recovery of geothermal energy from a reservoir 1. The reservoir 1 can include a native fluid 2. The native fluid 2 can include a solution comprising methane ($CH_4$) 4. In an example, the native fluid 2 can comprise a brine within a reservoir 1 that is a saline aquifer. The methane 4 can be dissolved in the brine in low concentrations. In another example, the native fluid 2 can be native hydrocarbons, such as those in an oil field. A working fluid 12 can be injected into the reservoir 1 via an injection well 14. The injection well 14 can include an injection well opening 16 that is in fluid communication with the reservoir 1 to allow the working fluid 12 to enter the reservoir 1.

In an example, the working fluid 12 is a non-water based working fluid 12, such as carbon dioxide ($CO_2$). For the sake of brevity, the remainder of this disclosure will describe the working fluid 12 as $CO_2$ working fluid 12. However, as described above, the working fluid 12 can comprise other suitable compounds capable of absorbing thermal energy from its surroundings, and further releasing the thermal energy as described herein. Other examples of non-water based working fluids 12 can include, but are not limited to, ammonia, sulfur dioxide, or non-halogenated hydrocarbons such as methane.

The $CO_2$ working fluid 12 can be provided from a $CO_2$ source 18, such as a waste stream from a facility that produces $CO_2$, such as via combustion. Examples of facilities that can be a $CO_2$ source 18 include power plants, such as a fossil fuel power plants (e.g., coal plant, natural gas plant, and the like), a plant capable of producing fuel, such as biofuel (e.g., ethanol plant), or an industrial plant, such as a cement manufacturer, steel manufacturer, and the like. The $CO_2$ source 18 can also be natural geologic $CO_2$ produced from a geologic formation. In an example, the $CO_2$ can be transported from a remote $CO_2$ source 18 via any suitable means, (e.g., a pipeline or via various transportation means, such as a truck, ship, or railroad). In another example, the facility that provides the $CO_2$ source 18 can be co-located with the geothermal recovery system 10, such as a co-located power plant, biofuel plant, or industrial plant. As described in more detail below, a co-located facility can provide for synergies allowing for more efficient operation of the co-located facility and of the geothermal energy recovery.

In an example, the system 10 can be located at a site (e.g., in a position) configured to provide access to a target formation. The target formation can comprise a caprock 8 located above a reservoir 1, as shown in FIG. 1. The reservoir 1 can have a natural temperature higher than a temperature of the working fluid. The natural temperature can be caused by in-situ geothermal heat located within the reservoir or the geological formation proximate to the reservoir. The natural temperature in the reservoir 1 can be affected by a geothermal heat 6 flow, such as the geothermal heat 6 flowing up from below.

A top layer 9 can be located above the caprock 8 and the reservoir 1. The top layer 9 can comprise any number of layers and types of natural deposits or formations. For example, the top layer 9 can comprise one or more features such as one or more reservoirs (e.g., the reservoir 1 or a different reservoir) or one or more caprocks (e.g., the caprock 8) having the features as described herein. The top layer 9 can additionally or alternatively comprise additional areas suitable for injection of the working fluid, such as the $CO_2$ working fluid 12. In an example, the top layer 9 additionally or alternatively further comprises any type of rocks, including rocks or sediments in layers, rock or sediment formations, and the like, or any combinations thereof. The top layer 9 can additionally or alternatively comprise a top layer or layers of sediment or soil of varying depths. The permeability and porosity of the top layer 9 can vary widely, as long as drilling can be performed to insert the injection well 14 and production well 28, as described below.

The top layer 9 can include a variety of geologic features, including, but not limited to, soil, sand, dirt, sediment, and the like, or combinations thereof. The top layer 9 can further have a wide range of depths (e.g., "thickness") sufficient to ensure the working fluid introduced into the reservoir 1 can remain in the desired state, such as a supercritical state. In an example, the depth of the top layer 9 is at least 100 meters (m) or more, and can be up to one (1) kilometer (km) or more, such as up to three (3) km, four (4) km, five (5) km, for example, up to 10 km or over 15 km including any range there between, below the Earth's surface (e.g., below or within a given topography in an area, which may or may not be exposed to the atmosphere). In most examples, however, it is expected that the target formations will be located between about 800 m and about four (4) km beneath the Earth's surface.

Factors that can be considered in selecting reservoir depths can also vary according to local geology (e.g., specific rock type, geothermal heat flow rates, subsurface temperatures), access to working fluid (e.g., carbon dioxide from fossil fuel burning power plants, ethanol plants), drilling and operation costs, and sociopolitical circumstances (e.g., consumer locations, constructs, electric grid locations, and the like).

The target formation, which can include the reservoir 1, a caprock 8, and a top layer 9, can be made up of a variety of rock types, including, but not limited to, igneous rock, metamorphic rock, limestone, sedimentary rock, crystalline rock, and combinations thereof. In an example, the target formation is a sedimentary basin having a substantially bowl or convex shape. In other examples, the target formation can have another shape, such as the substantially dome or concave shape, although the present disclosure is not limited to the shapes described or depicted in the figures. In some examples, the target formation is lower than the lowest freshwater aquifer, but this may not always be the case. The target formation can comprise a brine or water aquifer or a brine or water-filled rock formation (e.g., reservoir 1) that includes a native fluid 2. The native fluid 2 can be inhibited or prevented from escaping upwardly, for example due to the presence of the caprock 8. The target formation can also contain a fault which can offset the target formation or a portion of the target formation, thereby forming a geological trap, as the term is understood in the art. In an example, the target formation is a reservoir containing one or more of natural gas, oil, native $CO_2$, fresh water, or brine.

In an example, $CO_2$, such as the $CO_2$ working fluid 12 shown in FIG. 1, is used as the working fluid in combination with a reservoir 1 located at least about 0.1 km, to about 5 km deep. Such a combination can minimize upward leakage of the working fluid, since additional caprocks 8 can be present between the reservoir 1 and the Earth's surface. Additionally, higher natural reservoir temperatures (e.g., greater than about 70° C.) and higher pressures (e.g., greater than about 8 MPa) can be encountered at such depths. Larger depths can also increase the likelihood of the presence of dissolved salts and other minerals in the native fluid, which can reduce the likelihood that such native fluid would otherwise be useful for drinking and irrigation applications.

If present, the caprock, such as the caprock 8 shown in FIG. 1, can be a geologic feature having a very low permeability, e.g., below about $10^{-16}$ m$^2$. Such a low permeability can allow the caprock 8 to essentially function as a barrier for fluid contained in the reservoir 1 below. Permeability can also be dependent, in part, on the depth (e.g., thickness) of the caprock 8, as well as the depth of the top layer 9 above the caprock 8 and the reservoir 1. The porosity of the caprock 8 can vary widely. As is known in the art, even if a rock is highly porous, if voids within the rock are not interconnected, fluids within the closed, isolated pores cannot move. Therefore, as long as the caprock 8 exhibits permeability sufficiently low to allow it to prevent or inhibit fluid leakage from fluid in the reservoir 1, the porosity of the caprock 8 is not limited.

The thickness of the caprock 8 can vary, but is generally substantially less than the thickness of the top layer 9. In an example, the top layer 9 has a thickness on the order of 10, or 10 to 100, up to 1000 times the thickness of the caprock 8, further including any range there between, although the systems and methods of the present disclosure are not so limited. In an example, the thickness of the caprock 8 can vary from about one (1) cm up to about 1000 m or more, such as between about five (5) cm and 1000 m, such as between about one (1) m and about 100 m. The caprock 8 can comprise more than one caprock layer, such that multiple caprocks can be present which partially or completely cover one another and can act jointly as a caprock 8 to prevent or reduce upward leakage of the working fluid from the reservoir 1.

The reservoir 1 can be one or more natural underground rock reservoirs capable of containing fluids. For example, the reservoir 1 can be a previously-created manmade reservoir or a portion of a previously-created manmade reservoir, such as, for example, shale formations remaining from shale fracturing for hydrocarbon removal. The reservoir 1 can also be capable of storing carbon dioxide on a permanent or substantially permanent basis, as this term is understood in the art. In some examples, the reservoir 1 is sufficiently porous and permeable to be able to sequester fluids, such as carbon dioxide, and to receive and retain geothermal heat 6. In contrast to conventional geothermal systems, such as enhanced geothermal systems using a water-based working fluid, there is no requirement that the reservoir 1 be a hot dry rock reservoir, as that term is understood in the art, although, as noted herein, such a reservoir can optionally be used.

The reservoir 1 can be sufficiently permeable to allow multidirectional routes for dispersion or flow of fluid at relatively high rates, including lateral dispersion or flow. The caprock 8 above the reservoir 1, if present, can further enhance the dispersion capabilities of the reservoir 1. In an example, the porosity of the reservoir 1 can range from between about two (2) % to about 50% or greater, such as up to about 60%.

The reservoir 1 can be sufficiently permeable to allow fluids to flow relatively easily, e.g., at a rate of about 0.1 to about 50 liters/minute (L/min) or higher, such as up to several thousand L/min. In an example, the reservoir 1 has a permeability of about $10^{-16}$ m$^2$ to about $10^{-9}$ m$^2$, or greater, such as up to about $10^{-6}$ m$^2$.

In an example, the reservoir 1 has a porosity of at least about two (2) % and a permeability of at least about $10^{-15}$ m$^2$, with the caprock 8 having a maximum permeability of about $10^{-16}$ m$^2$.

The reservoir 1 can have any suitable natural temperature. In an example, the natural temperature of the reservoir 1 is at least about 40° C., although natural temperatures below 40° C. can be sufficient, such as down to 30° C. or 20° C., further including down to 10° C., including any range there between. The ability to economically recover geothermal energy from a reservoir 1 having a natural temperature as low as 10° C., as described below, demonstrates a substantial advantage of the methane-enhanced geothermal recovery systems of the present disclosure over systems that use $CO_2$ alone for geothermal recovery, such as CPG systems described above. Natural temperatures greater than 90° C. can also be present, with the highest temperature limited only by the amount of geothermal heat 6 provided and the ability of the reservoir 1 to capture and retain the geothermal heat 6. For example, it is possible that temperatures greater than about 300° C. can be present in the reservoir 1.

A specific desired natural temperature can be obtained by varying the depth of the injection well 14 or the production well 28, or both. In an example, higher natural temperatures can be obtained by increasing the depth of the injection well 14, with or without increasing the depth of the production well 28. The overall size of the reservoir 1 can also vary.

The geothermal heat 6 can flow at any suitable rate, including at a high rate as is present in "high geothermal heat flow regions", as the term is understood in the art. Conventional water-based systems are known to require high geothermal heat flow in most instances. As a result, as compared to conventional systems using water as the working fluid, the systems described herein can operate in a wider range of locations, including low and moderate geothermal heat flow regions. The methane-enhanced and waste-heat enhanced systems of the present disclosure can also operate a wider range of locations than systems that merely use a $CO_2$ working fluid to recover geothermal energy, including at lower heat flow rates than the $CO_2$ geothermal-only systems. Also in contrast to conventional water-based systems which can be operated in areas containing little natural water (e.g., the American Southwest), thus requiring importation of water, the novel systems described herein do not rely on water as the working fluid, and thus do not import water for use as a working fluid. It is to be understood, that areas having medium or low geothermal heat flow rates can also be used.

In some examples, the $CO_2$ working fluid from the $CO_2$ source 18 can be compressed to an elevated pressure in a compressor 20. In an example, the compressed $CO_2$ can be cooled in a cooling unit 22 because cooling the $CO_2$ working fluid 12 prior to injection into the injection well 14 can be advantageous by improving injectability of the $CO_2$. Most fluids, including $CO_2$, are denser when they are cooler than when they are warmer, such that a relatively cold column of $CO_2$ in the injection well 14 can compress itself more than a relatively hot column of $CO_2$. Therefore, a relatively cold and relatively low pressure $CO_2$ working fluid 12 at the surface can have the same pressure at the bottom of the injection well 14 as a relatively hot and relatively high pressure $CO_2$ working fluid 12 fed to the injection well 14. A pump (not shown) can optionally be included downstream of the cooling unit 22 either before the $CO_2$ working fluid 12 enters the injection well 14 or within the injection well 14.

Although the $CO_2$ from the $CO_2$ source 18 can, in some examples, be used "as is," in other examples, further processing of the $CO_2$ from the $CO_2$ source 18 can be performed prior to introducing the $CO_2$ to the compressor 20, the cooling unit 22, or the injection well 14. For example, some waste streams can require dewatering or drying, or both. In an example, the $CO_2$ from the $CO_2$ source 18 can be stored on site or off site for a period of time. In an example, the cold $CO_2$ that is fed from the cooling unit 22 into the injection well 14 as the $CO_2$ working fluid 12 is a saturated liquid or supercritical $CO_2$.

As shown in FIG. 1, the working fluid 12 can pass through the reservoir 1 in the form of a $CO_2$ plume 24. The $CO_2$ working fluid 12 can cause at least a portion of the methane 4 within the reservoir 1 to come out of solution from within the native fluid 2 where the methane 4 can be carried along with the $CO_2$ plume 24. Together, the $CO_2$ working fluid 12 within the $CO_2$ plume 24 and the methane 4 can form a production fluid 26 that can pass through a production well opening 30 of each of one or more production wells 28. Each production well 28 can carry the production fluid 26 to or near the surface for energy recovery within an energy recovery system 32. In some examples, the production fluid 26 can be sent through a filter system at or near the surface to reduce or prevent particulate matter from entering any surface system components, such as those within the energy recovery system 32.

As mentioned above, in an example the native fluid 2 can comprise a brine, such as what can be present in a deep saline aquifer 1. In an example, a saline aquifer 1 can be present proximate to a hydrocarbon field such that a portion of the methane and other gaseous hydrocarbons, such as ethane and propane, can dissolve into the brine 2 within the aquifer 1. Although many alkane compounds can dissolve in brine, methane has the highest solubility compared to higher-order alkanes (e.g., ethane, propane, butane, etc.). Therefore, while other alkanes can be dissolved into solution in the brine 2, the present disclosure will describe the systems and methods herein as being with respect to dissolved methane. In an example, the composition of methane dissolved in the brine 2 can be from about 0.1 wt % to about 5 wt % methane. Such a low percentage of methane generally makes the methane, by itself, uneconomical to mine. For example, the cost to extract dilute methane dissolved in a saline aquifer would generally be achieved by pumping the brine to the surface and extracting the methane. The energy requirement to pump the brine to the surface can cost considerably more than the actual value of the methane that is extracted.

Figure 5:
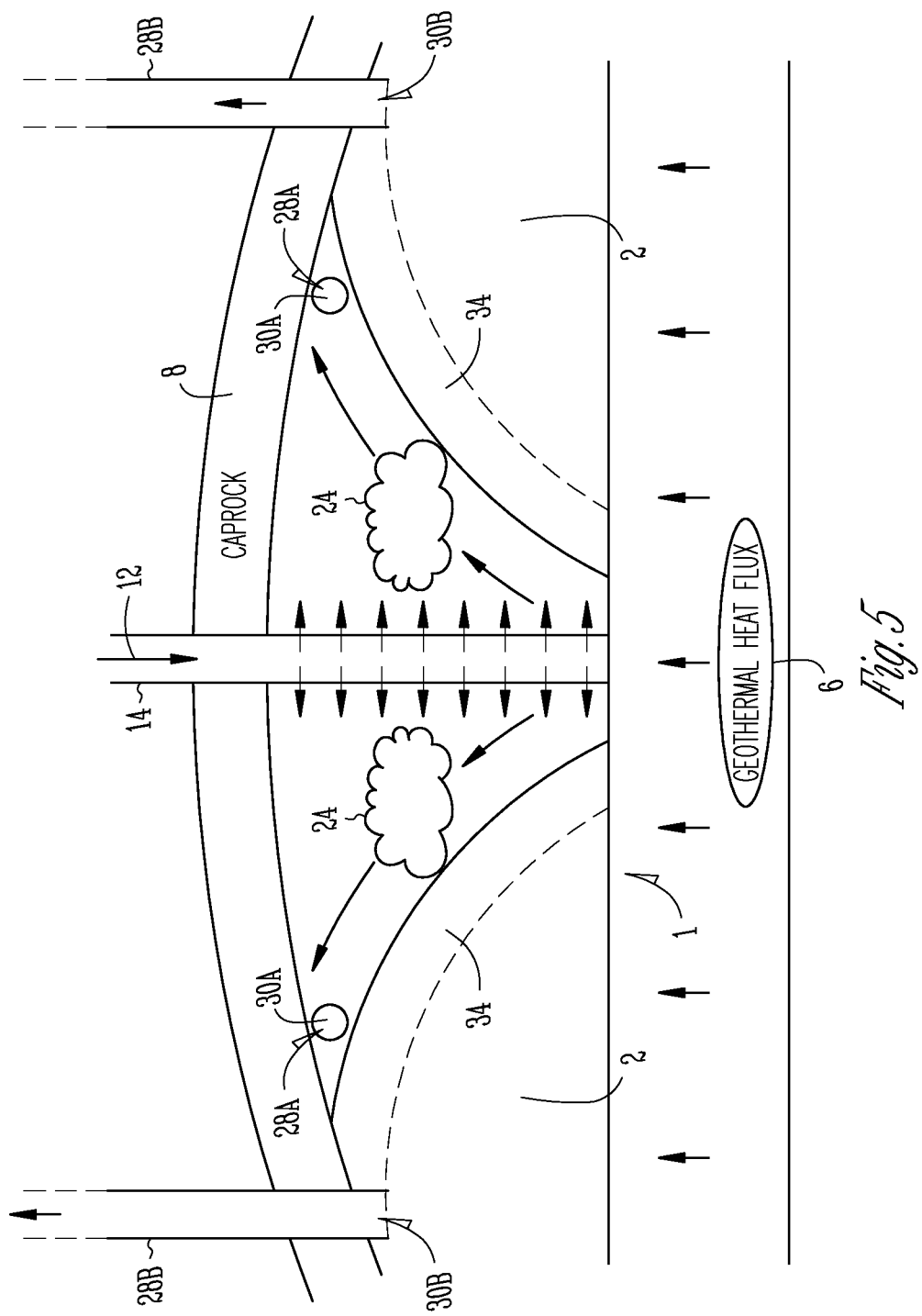
FIG. 5 is a simplified schematic diagram of the formation of a high methane concentration zone within a reservoir.

Carbon dioxide is known to have a higher solubility in brine than methane and other alkanes, such that when the $CO_2$ working fluid 12 is injected into the aquifer 1, the $CO_2$ will preferentially dissolve into the brine 2 and force at least a portion of the methane 4 out of solution. The dissolution of the methane 4 can create a zone of relatively high concentration of methane in front of the advancing $CO_2$ plume 24. FIG. 5 (described in more detail below) shows an example of the formation of a zone 34 that has a high concentration of methane 4 in front of the $CO_2$ plume 24. The $CO_2$ plume 24 can force the high-concentration zone 34, which can also contain a substantial percentage of brine or other native fluid 2, through the reservoir 1 and into the one or more production wells 28. In addition, a portion of the methane 4 that has come out of solution with the brine 2 can dissolve into the $CO_2$ phase to form a $CO_2$/methane solution plume that is advanced by or combines with the $CO_2$ plume 24. As described above, the combination of the methane 4 that has come out of solution and the $CO_2$ plume 24 is referred to herein as "production fluid 26," whether the $CO_2$ and methane form separate plumes, a gas mixture, or a gas solution of methane and $CO_2$. As described in more detail below, in some examples, the high-concentration methane zone 34 can also be produced separately from the $CO_2$ plume 24, such as via the formation of separate production wells 28A, 28B for each.

As the production fluid 26 moves through the reservoir 2, it can become heated by geothermal heat 6 that is present in or is supplied to the reservoir 120. The geothermal heat 6 can raise the temperature of one or more components of the production fluid 26, raise the pressure of one or more components of the production fluid 26, or both. For example, the geothermal heat 6 can raise the temperature of the $CO_2$ working fluid 12, the released methane 4, or both, raise the pressure of the $CO_2$ working fluid 12, the released methane 4, or both, or raise both the temperature and the pressure of the $CO_2$ working fluid 12 or the released methane 4, or both, within the production fluid 26. For example, the temperature of the production fluid 26 as it enters the production well opening 30 can be higher than the temperature of the $CO_2$ working fluid 12 as it exits the injection well opening 16.

Upon its release at the injection well reservoir opening 16, the relatively cool $CO_2$ working fluid 12 can permeate through the reservoir 1 forming the $CO_2$ plume 24. Upon exposure to the temperatures present in the reservoir 1 (which are higher than the temperature of the cold $CO_2$ working fluid 12), the cold $CO_2$ working fluid 12 absorbs heat from the reservoir 1, thus causing an upwardly-migrating $CO_2$ plume 24, which, in an example, can be laterally advected due to non-zero groundwater flow velocities within the reservoir 1. In an example, lateral migration occurs additionally or alternatively due to the $CO_2$ plume 24 spreading, as additional $CO_2$ exits the production well 28. In an example, the $CO_2$ working fluid 12, in the form of the $CO_2$ plume 24 or the production fluid 26, can form a continuous or substantially continuous connected stream from the injection well opening 16 to the production well opening 30.

The $CO_2$ plume 24 can migrate, can be transported (such as in a closed loop system as described herein), or can flow or spreads towards the production well 28, entering a production well reservoir opening 30 as a relatively hot production fluid 26, e.g., a fluid having a temperature greater than the temperature of the cold $CO_2$ working fluid 12 at the injection well opening 16. The $CO_2$ plume 24 can move at any suitable rate in a substantially horizontal manner across the reservoir 1. In an example, the $CO_2$ plume 24 can move at a rate of from about 0.1 to about one (1) m per day, inclusive, such as from about 0.4 to about 0.6 m/day, inclusive, although the systems and methods of the present disclosure are not so limited.

In another example, the reservoir 1 can comprise a hydrocarbon field, such as a reservoir that is part of an oil or natural gas field. The oil or natural gas reservoir 1 can be partially depleted by conventional hydrocarbon recovery methods. In such a case, if the $CO_2$ working fluid can serve to assist in oil or hydrocarbon recovery through enhanced oil recovery (EOR). An EOR system can be set up similar to the system described above for a brine saline aquifer, e.g., with a $CO_2$ source 18 providing the $CO_2$ working fluid that can be injected into the reservoir 1 using a compressor 20 and, in some examples, a cooling unit 22. Therefore, FIG. 1 will be used to describe an EOR system as well.

In an EOR-type system, methane 4 and other hydrocarbon gasses can be in a solution within the native fluid 2, such as by being dissolved or complexed with other hydrocarbons in the native fluid 2, or the methane 4 can be physically stored within the reservoir 1, such as within pores of the rock formation that forms the reservoir 1. The native fluid 2 can also comprise at least one hydrocarbon to be recovered, such as oil, natural gas, or both. The $CO_2$ working fluid 12 can be injected through the one or more injection wells 14 and into the reservoir 1, where the $CO_2$ working fluid 12 can interact with the native fluid 2, and in particular can interact with the at least one hydrocarbon of the native fluid 2, to form at least one production fluid 26. The interaction between the $CO_2$ working fluid 12 and the native fluid 2 can improve the mobility of the hydrocarbons in the resulting production fluid 26 to improve extraction of the hydrocarbons from the reservoir 2. The production fluid 26 can be pushed toward one or more production wells 28, where it can be returned at or near the surface.

In an example, water or other fluids can be injected into the reservoir in addition to the $CO_2$ or other non-water based working fluid 12. For example, a Water Alternating Gas ("WAG") method can be used where the $CO_2$ working fluid 12 and a water-containing working fluid are alternated, with the $CO_2$ working fluid 12 acting to improve mobility of the hydrocarbons, and the water-containing working fluid pushing the $CO_2$ and hydrocarbon production fluid 26 toward one or more production well openings 30 and up the one or more production wells 28. Further description of EOR and WAG is including in National Energy Technology Laboratory (NETL), "Carbon Dioxide Enhanced Oil Recovery," (available at http://www.netl.doe.gov/technologies/oil-gas/publications/EP/small_CO2_eor_primer.pdf) (March 2010) which is incorporated herein by reference in its entirety.

In the case of an EOR-type method, the production fluid 26 can include at least a portion of the $CO_2$ working fluid 12 and at least a portion of the hydrocarbons that had been part of the native fluid 2. The production fluid 26 can also include other native fluids that can be present in the reservoir 1, such as a brine solution, and other injected fluids, such as a water-containing working fluid. In an example, the production fluid 26 can include a non-water based working fluid (e.g., $CO_2$) content between about 0.01 wt % and about 99 wt %, inclusive, for example between about 33 wt % and about 50 wt %, inclusive, of the non-water based working fluid. The production fluid 26 can include a hydrocarbon content of between about 1 wt % and about 95 wt %, inclusive, for example between about 25 wt % and about 50 wt %, inclusive, of hydrocarbons. The production fluid 26 can include a composition of other fluids, such as brine or an injected water-containing working fluid, of between about 1 wt % and about 95 wt %, inclusive, for example between about 25 wt % and about 50 wt %, inclusive, of other native fluids or other injected fluids.

Depending on the composition of the native fluid in the reservoir 1 and the specifics of the particular EOR operation, the production fluid 26 can have a "high" percentage of $CO_2$ from the working fluid, e.g., between about 66 wt % and about 99 wt % $CO_2$, inclusive, a "low" percentage of $CO_2$ from the working fluid, e.g., between 1 wt % and about 33 wt % $CO_2$, inclusive, or any range of $CO_2$ content in between, such as a "medium" percentage of the $CO_2$ working fluid, e.g., between about 33 wt % and about 66 wt % $CO_2$, inclusive. In some examples, the percentage of $CO_2$ in the production fluid can be very low, such as from 1 wt % to 9 wt %, inclusive, for example from 2 wt % to 5 wt %, inclusive.

In the case of a $CO_2$ working fluid 12, the $CO_2$ can be partially or fully miscible with the hydrocarbons so that the $CO_2$ working fluid 12 and the hydrocarbons form a homogenous or substantially homogenous solution of $CO_2$ and hydrocarbon. Alternatively, the $CO_2$ working fluid 12 can be fully or substantially immiscible so that the $CO_2$ only partially dissolves, or substantially does not dissolve in the hydrocarbons so that the $CO_2$ and the hydrocarbons in the production fluid 141 are produced as separate immiscible or substantially immiscible fluids. The $CO_2$ can mix with the hydrocarbons and can provide for at least one of reduced viscosity of the hydrocarbons, reduced surface tension of the hydrocarbons, increased mobility of the hydrocarbons, or increased fluid pressure in the reservoir 1 so that the hydrocarbons can more easily separate from the rock formation of the reservoir 1 or be more easily driven toward the production well opening 30, or both.

The production fluid 26 can be carried up through the reservoir 2, such as by or in conjunction with a $CO_2$ plume 24. The production fluid 26 can also be formed as a zone of mobilized hydrocarbons and $CO_2$ that can be similar to a plume, but not necessarily. In an example where a water-containing working fluid is used, such as in a WAG process (described above), the one or more production fluids 26 can include alternating zones of mobilized hydrocarbons with $CO_2$ and zones of water-containing working fluid. As the production fluid 26 moves through the reservoir 2, it can become heated by geothermal heat 6 that is present in or is supplied to the reservoir 1. The geothermal heat 6 can raise the temperature of one or more components of the production fluid 26, raise the pressure of one or more components of the production fluid 26, or both. For example, the geothermal heat 6 can raise the temperature of at least one of the $CO_2$ working fluid 12, the methane 4 released from the native fluid 2, or other hydrocarbons released from the native fluid 2, raise the pressure of at least one of the $CO_2$ working fluid 12, the methane 4 released from the native fluid 2, or other hydrocarbons released from the native fluid 2, or raise both the temperature and the pressure of at least one of the $CO_2$ working fluid 12, the methane 4 released from the native fluid 2, or other hydrocarbons released from the native fluid 2. For example, the temperature of the production fluid 26 as it enters the production well opening 30 can be higher than the temperature of the $CO_2$ working fluid 12 as it exits the injection well opening 16.

The dissolving of at least a portion of the $CO_2$ working fluid 12 into a brine working fluid 2 can provide for $CO_2$ sequestering, e.g., to store $CO_2$ that has been produced in a power plant, a biofuel plant, or an industrial plant in order to reduce $CO_2$ emissions into the atmosphere. Similarly, a portion of the $CO_2$ working fluid 12 can be sequestered into an oil or hydrocarbon reservoir 1 when the $CO_2$ working fluid 12 is being used for EOR.

Whether the native fluid 2 comprises a fluid with dissolved methane, such as a brine, or a hydrocarbon fluid, such as oil or natural gas in an EOR field, the production fluid 26 can be brought to the surface via the one or more production wells 28 so that energy can be recovered via an energy recovery system 32. In an example, shown in FIG. 1, the energy recovery system 32 can comprise an expansion device 36. The expansion device 36 can provide shaft power 38 to a generator 40, which in turn can generate electricity 42. Because the expansion device 36 in FIG. 1 is being directly driven by the production fluid 26 that is being heated by the geothermal heat 6, the system of FIG. 1 can be referred to as a direct expansion device system, or more commonly a direct turbine system.

The system 10 can include a pump or compressor (not shown) at the surface, e.g., essentially immediately downstream of the production well 28, and upstream of the energy recovery system 32, in order to boost the pressure of the production fluid 26. The increased pressure from this pump or compressor can allow the production fluid 26 to effectively and efficiently produce power when the production fluid 36 is run through the expansion device 36. A pump or compressor in this location, e.g. upstream of the energy recovery system 26, can be particular effective for a reservoir 1 comprising a saline aquifer with native $CO_2$ in the native fluid 2, because the production fluid 26 can be produced at pressures that are too low to cost-effectively produce electricity 42 from the expansion device 36 and the generator 40. Waste heat off this pump or compressor can be harvested, as described in more detail below, for supplementing power production. Alternatively, a pump or compressor can be added to the system essentially immediately upstream of the injection well 14 before reinjection the $CO_2$ into the reservoir 1 as part of the working fluid 12.

The expansion device 36 can comprise any suitable type of expansion device 36 known in the art, such as a turbine, although the present disclosure is not so limited. In contrast to conventional water-based geothermal systems which produce low pressure steam at high volumetric flow rates, the use of a conventional turbine in higher pressure $CO_2$ geothermal energy systems and methods described herein, is an option, rather than a requirement In an example, the expansion device 36 comprises one or more piston-cylinder devices. The expansion device 36 can be one or more scroll, screw or rotary compressors designed to run in reverse as engines. The expansion device 36 can comprise a single expansion device 36, or a plurality of expansion devices 36. Multiple expansion devices 36 can run in parallel, with one or more first expansion devices 36 running pumps or compressors directly and one or more second expansion devices 36 producing electric power for sale. The generator 40 can be any suitable generator known in the art, to produce electricity 42. In an example, the components of the production fluid 26 can comprise primarily or substantially all of lower density gases so that the expansion device 36 can be a direct turbine. Relatively low-density gaseous or supercritical fluids can provide relatively higher energy efficiency, and thus produce relatively more energy in the form of electricity, than higher density fluids in liquid phase when decreasing between the same pressure levels. Passing a low density fluid, such as $CO_2$ and methane, through a direct turbine generally can produce more electricity than extracting thermal energy to operate an Organic Rankine Cycle or other binary system, and then decreasing the pressure through a valve or turbine, when operating between the same inlet and exit conditions.

As described above, the native fluid 2 in the reservoir 2 can comprise methane 4, such as methane 4 within solution in the native fluid 2. As further described above, the injection of the $CO_2$ working fluid 12 can cause at least a portion of the methane 4 to come out of solution with the native fluid 2 and be brought up to the surface with the $CO_2$ working fluid 12 as a production fluid 26. The system and method of the present disclosure can be configured to take advantage of the methane 4 that is produced to the surface in order to improve the efficiency of the geothermal energy recovery by recovering another form of energy from the reservoir 1—namely, a portion of the chemical energy stored in the methane 4.

As shown in FIG. 1, the system 10 can include a separation system 44 that can be configured to separate a portion 46 of the methane from a production fluid comprising $CO_2$ and methane. The separated methane 46 can be combusted to increase the temperature of the production fluid 26, the pressure of the production fluid 26, or both. In an example, at least a portion of the separated methane 46 can be fed into a heater 48 that can heat the production fluid 26, or increase the pressure of the production fluid 26, or both, to form a heated and/or pressurized production fluid 50.

After combustion in the heater 48, the methane 46 is converted into $CO_2$ and water vapor in an exhaust stream 56. In an example, at least a portion of the $CO_2$ in the exhaust stream 56 can be captured by a $CO_2$ capture system 58. In an example, the $CO_2$ capture system 58 can comprise an absorber through which an absorbing material can flow, such as an absorbing solution comprising one or more amines, and a regenerator that can strip $CO_2$ from the amine solution. The outputs from the $CO_2$ capture system 58 can include a $CO_2$-rich stream 60 and a vented gas 62 (e.g., water vapor and other non-absorbed compounds). If desired, the vented gas 62 can be further treated. The $CO_2$ output stream 60 can be fed back into the reservoir 1, such as by compressing the $CO_2$ output stream 60 in a compressor, which can be the same compressor 20 as is used to compress the $CO_2$ from the $CO_2$ source 18, as shown in FIG. 1, or it can be a different compressor.

In another example, rather than heating the production fluid 26 with a heater 48, the separated methane 46 can be combusted in a conventional gas turbine or gas engine (not shown) to produce electricity from the turbine or engine. The combustion of the methane 46 in the gas turbine or the engine can produce substantial waste heat in the form of hot combustion gases (e.g., $CO_2$ and steam) and hot engine or turbine cooling jacket fluid. The waste heat can be added to the production fluid 26, such as via a heat exchanger. This configuration can, in some cases, lead to higher energy conversion efficiency then directly heating the production fluid 26 in a heater 48.

In some examples, a portion of the separated methane 46 can be split off from the methane stream 46 and stored or sold as a methane product 47. However, in some situations, it may be inefficient or uneconomical to sell a portion of the separated methane 46 rather than combusting all of the methane 46 to boost the temperature or pressure of a working fluid or production fluid. The reason for this is because the most likely end point for sold methane is a natural gas power plant where it will be burned to produce electricity. As described above, the separated methane 46 combusted in the heater 48 is used to heat a working fluid or production fluid, which in turn can be sent through an energy recovery system 32 to generate electricity 42. However, the sold methane 47 can lose some economic efficiency due to transportation costs to bring the methane 47 to the outside power plant. Burning methane in a power plant can also be less efficient than the energy recovery system 32 because power plants do not also incorporate geothermal energy recovery. Moreover, natural gas power plants typically employ steam turbines, which can be considerably less efficient than direct turbines using supercritical $CO_2$ as the working fluid or $CO_2$ and methane as a production fluid. In addition, the majority of natural gas power plants are not equipped for $CO_2$ capture so that the methane 47 delivered to these power plants will likely contribute to $CO_2$ emissions. In contrast, the energy recovery systems 32 of the present disclosure can also be configured with a $CO_2$ capture system 58, as described above, to capture any $CO_2$ formed by the heater 48. Thus, the systems of the present disclosure can provide for reduced $CO_2$ emissions to the atmosphere. Even if the outside power plant were to have $CO_2$ capturing capabilities, the systems and methods of the present disclosure can provide for more efficient reduction of emissions because the $CO_2$ capture system and geologic storage of $CO_2$ can be co-located with the geothermal energy recovery system, reducing or eliminating the need for transportation systems necessary to reduce or prevent emissions from natural gas power plants.

The heater 48 can be positioned upstream of the expansion device 36, as shown in FIG. 1, so that the heated and/or pressurized production fluid 50 is formed prior to the production fluid 50 being fed into the expansion device 36. After passing through the expansion device 36, the heated and/or pressurized production fluid 50 can become a slightly cooled production fluid 52.

In some examples, the separation system 44 can cool or depressurize the production fluid in order to achieve the separation of the methane 46 (described in more detail below). Therefore, in an example, the methane separation system 44 is downstream of the expansion device 36 such that the cooled production fluid 52 is fed into the separation system 44. By separating the methane 46 from the production fluid 52 downstream of the expansion device 36, the system can prevent or reduce the loss of geothermal energy during the separation of the methane 46 from the production fluid 52.

In an example, the methane separation system 44 can comprise one or more membranes that are configured to selectively allow the passage of one or more components within the production fluid 52 through the membrane while preventing or impeding the passage of one or more other components within the production fluid 52 through the membrane. For example, the membrane can be selectively permeable between $CO_2$ and methane, so that the $CO_2$ can pass substantially unimpeded through the membrane, while a portion of the methane 46 is prevented from passing through the membrane, or vice versa. In an example, the pressure difference across the membrane can be controlled, which can control the percentage of methane that can be removed from the production fluid 52 in order to control the amount of methane in the separated methane stream 46.

It has been found that even if only a small percentage of the methane is separated from the production fluid can provide for substantial increases in energy recovery from the energy recovery system 32. In an example, the production fluid contains about 5 wt % methane, and about 10 wt % to about 30 wt % of this can be separated out and combusted, which can provide for an increase in the production of electricity 42 of from about 75% to 1000% above the electricity that can be produced from the geothermal energy collected by the production fluid alone. Moreover, separating only a small portion of the methane from the production fluid can ensure that a substantial amount of methane is still present in the production fluid before it is re-injected back into the reservoir 1 (described in more detail below). The presence of methane in the re-injected production fluid can ensure that methane is present in the reservoir to be extracted over time such that there is a generally always a portion of methane that can be brought to the surface with the production fluid 26.

The use of the separated methane 46 can allow for economically viable geothermal energy recovery from reservoirs having lower temperatures than can be achieved through simply extracting the thermal energy from the production fluid 26. For example, a $CO_2$ plume 24 is used to collect geothermal energy, with no combustion of produced methane or any other heat-recovery methods (such as those described below), the recovery of geothermal energy from the reservoir may only be economically efficient at temperatures down to between about 30° C. and about 50° C., and in most cases only down to about 60° C. However, with the use of the methane separation system 44 and the methane combustion heater 48, economically viable recovery of geothermal energy can be achieved down to a reservoir temperature of about 10° C. to about 25° C., depending on the percentage of methane that can be produced from the reservoir 1, the reservoir depth and temperature, and the local ambient temperature.

Figure 2:
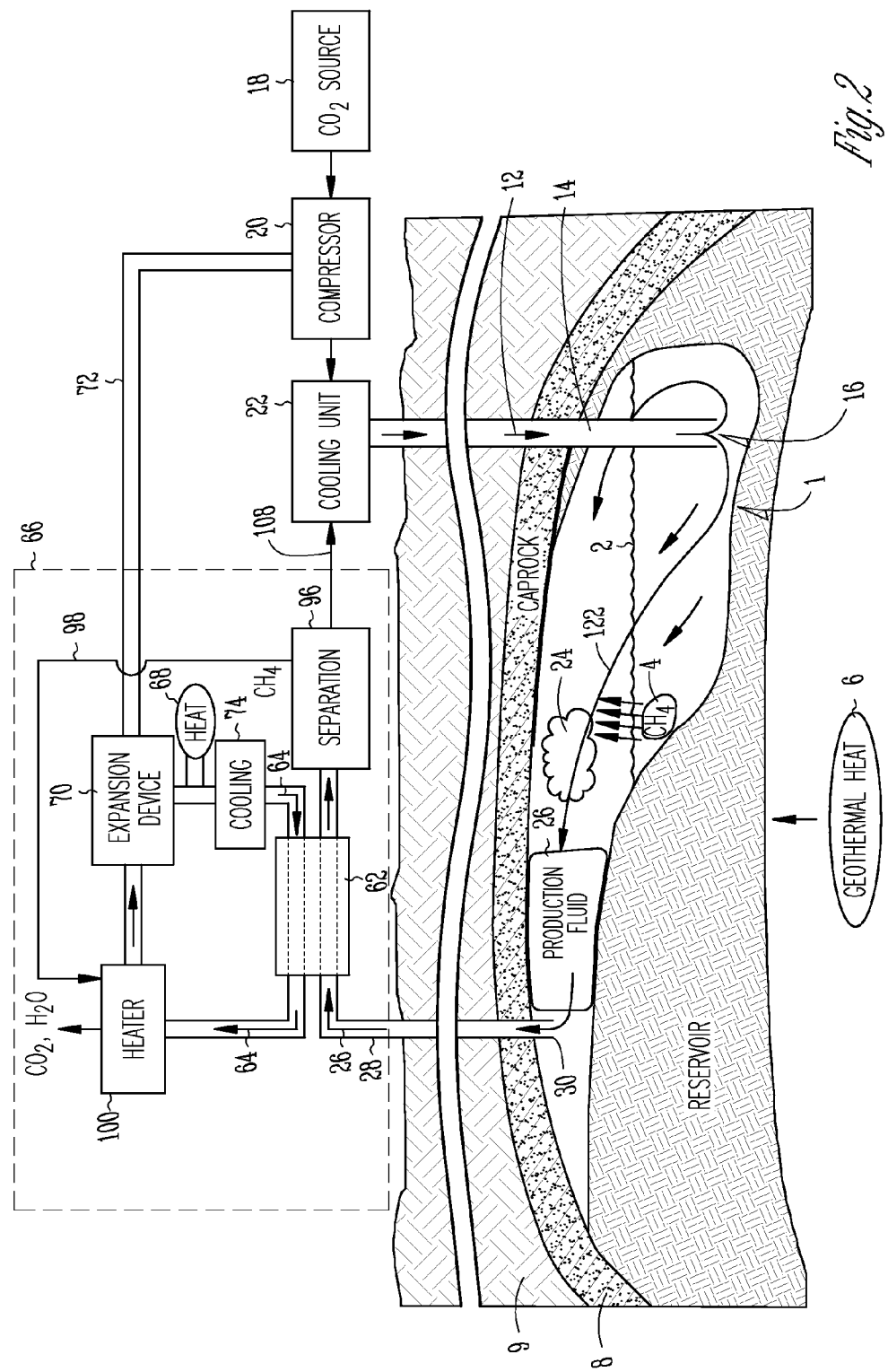
FIG. 2 is a simplified schematic diagram of another example geothermal energy recovery system.
Figure 3:
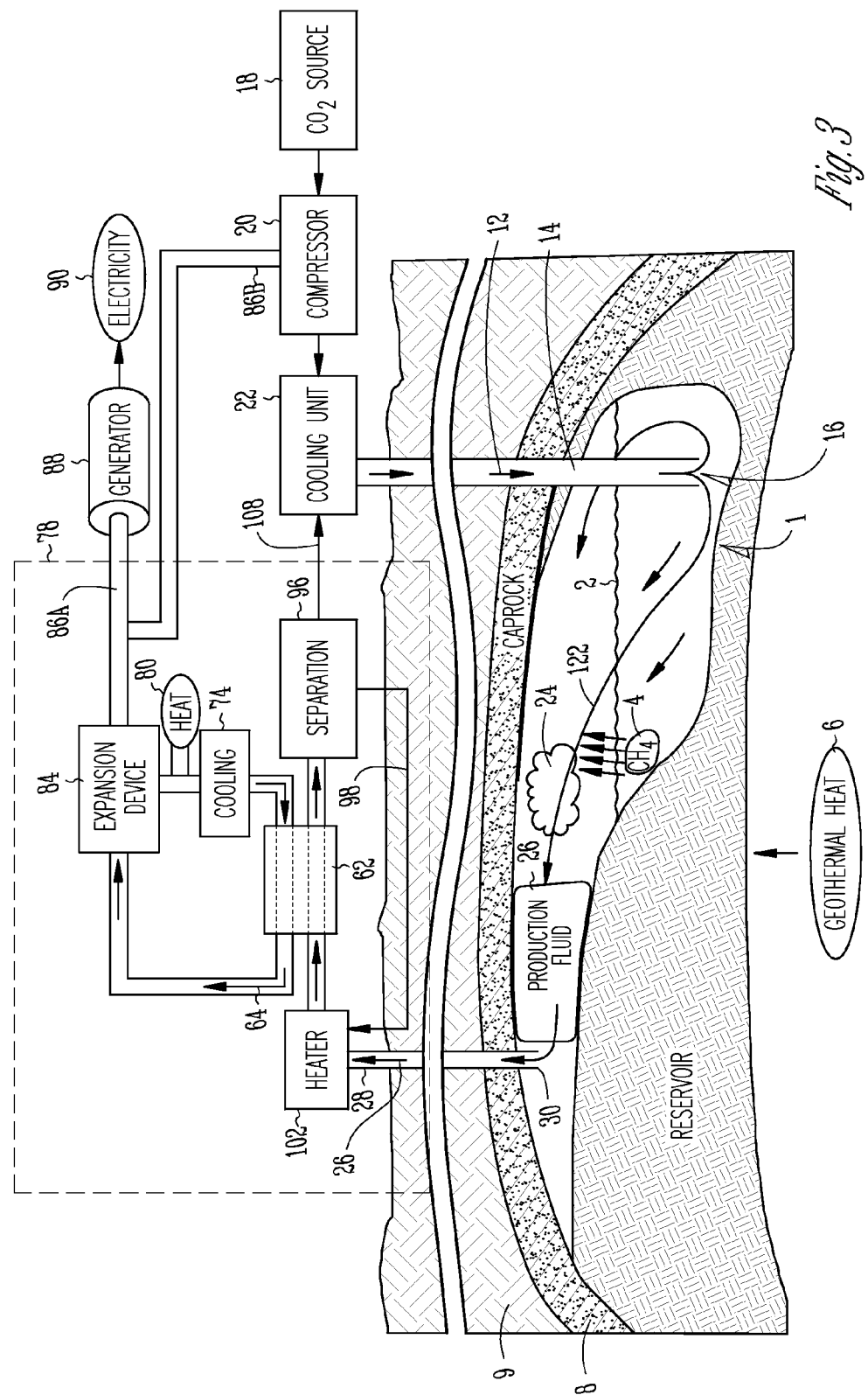
FIG. 3 is a simplified schematic diagram of another example geothermal energy recovery system.
Figure 4:
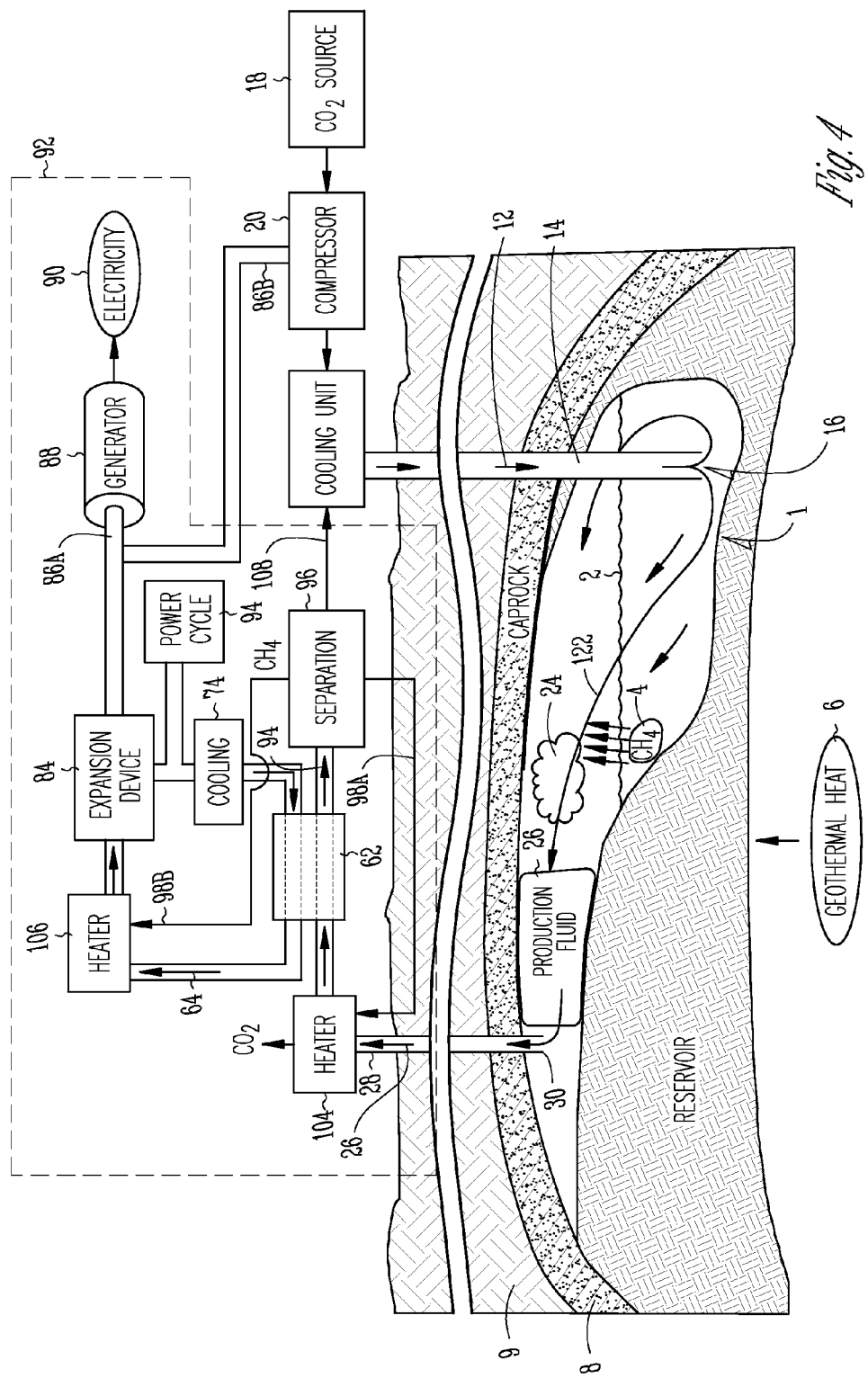
FIG. 4 is a simplified schematic diagram of another example geothermal energy recovery system.

As noted above, the system 10 of the present disclosure can be used for geothermal energy capture, as described herein, and can also be used for sequestering $CO_2$ within the rock formation or native fluid 2 within the reservoir 1. Therefore, in some examples, at least a portion of the $CO_2$ working fluid 12 can be stored permanently or semi-permanently within the reservoir 1, such that a replacement supply of $CO_2$ can be required in order to continue operation of the system. The capture of the $CO_2$ output stream 60 from the exhaust stream 56 can provide for a substantial portion of the make-up $CO_2$ required. In an example, the $CO_2$ output stream 60 from the $CO_2$ capture system 58 can provide all or substantially all of the $CO_2$ required to make up for $CO_2$ that is sequestered within the reservoir 1. FIGS. 2-4 show examples of indirect energy recovery systems that can be used for the purpose of recovering energy from the production fluid 26. Each of FIGS. 2-4 shows the production fluid 26 being passed through a heat exchanger 62 in order to heat a secondary working fluid 64. The secondary working fluid 64 can be sent through one or more energy conversion devices. The systems of FIGS. 2-4 are often referred to as "binary systems" because they use two working fluids, rather than one.

FIG. 2 shows an example energy recovery system 66 where a portion of the energy from the secondary working fluid 64 is drawn off as heat 68. The heat 68 can be used in any suitable direct-use applications, such as space heating. The secondary working fluid 64 can then be sent through an expansion device 70 to produce shaft power 72 that can be provided to the compressor 20 for compressing the $CO_2$ from the $CO_2$ source 18 or the $CO_2$ output stream 60, or both. After passing through the expansion device 70, the additional heat 68 can be extracted for the direct-use heat applications. The secondary working fluid 64 can be cooled in a secondary cooling unit 74 before sending the secondary working fluid 64 back into the heat exchanger 62 in order to complete the cycle of the secondary working fluid 64.

FIG. 3 shows another example energy recovery system 78 where both heat 80, e.g., for a direct-use application, and electricity 82 can be generated from the secondary working fluid 64. In the example of FIG. 3, the working fluid 64 can be passed through an expansion device 84, similar to the expansion device 70 in FIG. 2, where at least a first portion of the shaft power 86A from the expansion device 84 is used to drive a generator 88 to produce the electricity 82. A second portion of the shaft power 86B from the expansion device 84 can be used to assist in driving the compressor 20.

FIG. 4 shows another example energy recovery system 92, where a portion of the energy in the secondary working fluid 64 can be recovered as electricity 90 in a method similar to that described above with respect to FIG. 3, and another portion of the energy from the secondary working fluid 64 can be provided as heat to a separate power cycle 94 having components as understood in the art, such as a Rankine power cycle, an Organic Rankine Cycle (ORC), or a Kalina Cycle. With a separate power cycle 94, the condensing pressure can be subcritical and the highest pressure during the heat addition can be either supercritical or subcritical.

Each of the binary systems 66, 78, 92 of FIGS. 2-4 can provide for separation and combustion of a portion of the methane within the production fluid 26 in order to supplement energy recovery from the reservoir 1. For example, in FIG. 2, after the production fluid 26 is passed through the heat exchanger 64, the production fluid can be passed through a methane separation system 96 that can be similar to the methane separation system 44 described above with respect to FIG. 1. The methane separation system 96 can separate off a portion 98 of the methane within the production fluid, which can be supplied to a combustion heater 100. In an example, the combustion heater 100 can be configured to heat the circulating secondary working fluid 64 before it enters the expansion device 70. In the example shown in FIG. 2, the heat 68 is drawn off of the secondary working fluid 64 after heating the secondary working fluid 64 with the methane combustion heater 100 and after passing the secondary working fluid 64 through the expansion device 70. However, the system is not so limited, and the heat 68 can be drawn off from the secondary working fluid 64 before heating with the methane combustion heater 100 or before passing the secondary working fluid 64 through the expansion device 70.

In the example of FIG. 3, the separated methane 98 from the separation system 96 can be fed to a heater 102 that is configured to heat the production fluid 26 before it is fed into the heat exchanger 62. FIG. 4 shows an example where both the production fluid 26 before the heat exchanger 62 and the secondary working fluid 64 before the expansion device 84 are heated with combusted methane 98 separated with a methane separation system 96. In the example shown in FIG. 4, a first combustion heater 104 is supplied with a first portion 98A of the separated methane to heat the production fluid 26, and a second combustion heater 106 is supplied with a second portion 98B of the separated methane to heat the secondary working fluid 64. In another example (not shown), both the production fluid 26 and the secondary working fluid 64 can be heated with a single, common combustion heater.

As with the heater 48 in FIG. 1, the exhaust gas from each of the heaters 100, 102, 104, and 106 can be sent through a $CO_2$ capture system in order to capture the $CO_2$ from the combustion of the methane 98 in order to inject the separated $CO_2$ into the reservoir 1. $CO_2$ capture and recirculation to the compressor is not shown in FIGS. 2-4, but a person of ordinary skill in the art will understand that a $CO_2$ capture system can be implemented.

The methane separation system 44, 96 can separate the methane stream 46, 98, as described above, and can leave a final production fluid 108 that can comprise $CO_2$ and methane. The final production fluid 108 can also include other compounds, such as oil and gas compounds from an EOR reservoir or entrained brine solution from a saline aquifer, that can be further separated from the final production fluid 108 and sold as separate products, or the other compounds can be injected back into the reservoir 1 or into another reservoir. In an example, further cooling of the final production fluid 108 can be needed such that the final production fluid 108 is sent through a cooling unit, such as a cooling tower to further cool the production fluid before re-injecting the production fluid back into the reservoir. In an example, the final production fluid 108 can be cooled with the same cooling unit 22 that can cool compressed $CO_2$ coming of the compressor 20. The systems of FIGS. 2-4 can include a pump (not shown) can optionally be included downstream of the cooling unit 22 either before the $CO_2$ working fluid 12 enters the injection well 14 or within the injection well 14.

Alternatively, the other compounds, such as oil and gas compounds or brine solution, can be separated from the production fluid 26 after it is produced from the production well 28 but before the energy recovery system 32, 66, 78, 92. In such a case, the production fluid 26 can be separated into various component streams, such as a $CO_2$ and methane stream, a hydrocarbon stream, and a brine stream. Each of the components streams will include geothermal heat extracted from the reservoir 1. Therefore, thermal energy can be extracted from each stream with a separate energy recovery system, such as an expansion device and generator, as described above with respect to FIG. 1, or as a binary system, as described above with respect to FIGS. 2-4. The energy recovery system that is employed for each stream can therefore be tailored to the particular characteristics of the stream. For example, for a $CO_2$ and methane stream, a direct turbine system can be appropriate because it is generally the most efficient for low-density, supercritical or gaseous working fluids. In contrast, for a hydrocarbon stream or a brine stream, a binary system may be more appropriate and efficient. Therefore, in the case where the production fluid 26 comprises multiple compounds that are to be separated, the energy recovery system can be design to be the most economically efficient for each particular stream.

The physical and thermodynamic properties of $CO_2$ and methane, which can be the two primary components in the production fluid 26, can allow for the final production fluid 108 to be re-injected into the reservoir 1 via the injection well 14 without the need for an injection pump. In other words, the system 10 can be configured so that the $CO_2$ working fluid 12/production fluid 26, 108 can form a thermosiphon as it circulates through the reservoir 1, to the surface via the production well 28, through the energy recovery system 32, 66, 78, 92, and back into the injection well 14.

In the case of $CO_2$ and methane, a thermosiphon can be formed due to the expansion properties of the gases as they are heated in the reservoir 1. In an example, a relatively cold and compressed $CO_2$ working fluid 12 (which can include methane within the re-injected final production fluid 108) is injected into the injection well 14, forming a long column of cold fluid. As the depth into the well is increased, the fluid at a particular point within the injection well becomes more and more compressed, until the $CO_2$ working fluid exits the injection well 14 as a heavy, dense fluid from the injection well opening 16. As described above, at least a portion of the $CO_2$ working fluid 12 can form a $CO_2$ plume 24 (which can include re-injected methane, un-dissolved methane 4, and other compounds from the native fluid 2). The $CO_2$ plume 24 can form a connected link between the injection well opening 16 and the production well opening 30. As the $CO_2$ plume 24 moves through the reservoir 1, it can be heated by the geothermal heat 6 within or flowing into the reservoir 1. Both $CO_2$ and methane expand substantially as they are heated, e.g., on the order of about a 100% expansion per 100° C. for $CO_2$ and about a 20% expansion per 50° C. for methane.

The limited space in the reservoir 1 for expansion can cause the $CO_2$ plume 24 to become more and more compressed as it moves through the reservoir 1 from the injection well 14 to the production well 28. This effect can partially offset the pressure loss due to Darcy flow as the $CO_2$, methane, and other fluids move through the reservoir. Therefore, once the $CO_2$ plume 24 reaches the production well opening 30 as the production fluid 26, it is a relatively hot relative to the $CO_2$ working fluid 12 at the injection well opening 16, and has a pressure loss between the injection well opening 16 and the production well opening 30 that is smaller than would be expected from an identical reservoir using other working fluids, such as water or brine. As the production fluid 26 moves up the production well 28, it expands or becomes less dense (e.g., because there is less and less gas on top of the production fluid 26 as it moves up the production well 28), but still is at a relatively hot temperature and a relatively high pressure. In an example, the production fluid 26 expands less as it moves up the production well 28 than the $CO_2$ working fluid 12 compresses as it moves down the injection well 14.

The injection well 14, production well 28, and the various components of the energy recovery system 32, 66, 78, 92 can be configured so that a thermosiphon can form between the production well 28 and the injection well 14 so that the final production fluid 108 can be re-injected into the injection well 14 without the use of a separate pump (as shown in FIG. 1, where the final production fluid 108 can be re-injected into the injection well 14 immediately after the cooling unit 22, without needing to use the compressor 20). In some examples, the system parameters that can be adjusted to provide for a thermosiphon can include the size or diameter of the wells 14, 28, which can determine the frictional losses as the $CO_2$ working fluid 12 and production fluid 26 flow through the injection well 14 and production well 28, and the pressure drop across the equipment through which the production fluid 26 flows, particularly the expansion device 32 in a direct turbine system or the heat exchanger 62 in a binary system.

A thermosiphon or thermosiphon-like system, as described above, can provide efficiency advantages over systems using other working fluids. For example, the formation of a $CO_2$ and/or methane thermosiphon can reduce or minimize parasitic power loses, such as those that can occur due to fluid injection or production pumps. Such parasitic power loses from pumps or compressors can account for as much as 30% or more of the gross power generated in geothermal systems using other working fluids, such as a water-based geothermal recovery system. The ability to provide for a thermosiphon can be a particular advantage for a $CO_2$ working fluid 12 and the methane that can be included in the production fluid 26 over other working fluids, particularly water-based geothermal systems where a thermosiphon is impossible, practically speaking.

The presence of a pump or compressor essentially immediately downstream of the production well 28, as described above, does not prevent the function of a thermosiphon or thermosiphon-like operation of the system. Rather, the pump or compressor can merely improve efficiency of the power production in the energy recovery system 32, 66, 78, 92. A pump or compressor upstream of the energy recovery system 32, 66, 78, 92 can be desirable when the produced $CO_2$ temperature is very low, e.g., temperatures that are far lower than conventional geothermal can economically support, such as temperatures less than about 75° C.). The pump or compressor may be economically viable when supplemental heat, either waste heat or heat from combusted fuel, is added to the production fluid 26 between the upstream pump or compressor and energy recovery system 32, 66, 78, 92.

The residual saturation of the brine native fluid 2 in the reservoir 1 can affect the lifespan of methane production from the system. As used herein, the term "residual saturation" can refer to the fraction of the reservoir pore space that remains occupied by the brine or water native fluid 2 after the $CO_2$ working fluid 12 is injected into the reservoir 1 to form the $CO_2$ plume 24. The residual brine or water native fluid 2 can include dissolved methane 4, and this methane 4 can diffuse out of solution over time and be carried or pushed by the $CO_2$ plume 24. The residual water or brine native fluid 2 can also prevent circulation of the $CO_2$ working fluid 12 through the portions of the reservoir 1 that are occupied by the residual native fluid 2 while still permitting exchange of geothermal heat 6 from the reservoir 1 and residual native fluid 2 to the $CO_2$ working fluid 12. Thus, the residual saturation of the brine native fluid 2 can, in practice, increase the percentage of the reservoir 1 that is occupied by a given volume of the $CO_2$ working fluid 12. Therefore, the residual native fluid 2 can, in essence, increase the volume of the rock formation in the reservoir 1 that is contacted by the $CO_2$ working fluid 12, which in turn can increase the amount of geothermal energy that can be captured by the $CO_2$ working fluid 12. Moreover, the methane 4 that is released from solution from the residual brine or water means that the reservoir 1 can continue to produce methane while increasing the volume of the rock formation that is contacted by the $CO_2$ working fluid 12, thus increasing the methane production and the geothermal energy recovery efficiency of the system. For this reason, residual saturation can provide a substantial feature of the methane-enhanced systems of the present disclosure.

As described above, when the $CO_2$ working fluid 12 is injected into the reservoir 1 where methane 4 and other alkanes are in a solution in the native fluid 2, the $CO_2$ can cause a portion of the methane 4 to come out of solution where the methane can interact with the advancing $CO_2$ plume 24. The release of the methane 4 from the solution can result in the formation of a zone of high methane concentration in front of the advancing $CO_2$ plume 24. FIG. 5 shows a conceptual view of such a high-concentration methane zone 34 in front of the advancing $CO_2$ plume 24. A portion of the released methane 4 can dissolve within or mix with the $CO_2$ plume 24, however, the high-concentration zone 34 can include more methane by weight % than is present in the $CO_2$ plume 24. In an example, in order to maximize methane extraction from the reservoir 1, the production wells 28 can be configured to include one or more first production wells 28A that are located relatively close to the injection well 14 and one or more second production wells 28B that are located further from the injection well 14. In the example shown in FIG. 5, the first production wells 28A so that the production well openings 30A (shown as horizontal production wells 28A in FIG. 5) are located within the $CO_2$ plume 24 that includes $CO_2$ and methane that is mixed with or dissolved into the $CO_2$. The second production wells 28B can be positioned so that the production well openings 30B (shown as vertical production wells 28B in FIG. 5) are within the high-concentration methane zone 34.

The first production wells 28A, which can also be referred to herein as "$CO_2$ production wells 28A," can include a production fluid comprising $CO_2$ and a small portion of methane. The production fluid from the $CO_2$ production wells 28A can be processed in substantially the same manners as described above with respect to the production fluid 26 in FIGS. 1-4, e.g., by separating off at least a portion of the methane present in the production fluid to supplement the geothermal energy absorbed by the production fluid prior to sending the production fluid to an energy recovery system.

The second production wells 28B, which can also be referred to herein as "methane production wells 28B," can produce a combination of methane and brine solution from the reservoir 1. The production fluid from the methane production wells 28B can also include some $CO_2$ and, in some examples, other native fluids, such as hydrocarbons from an EOR reservoir. Because the openings 30B to the methane production wells 28B are designed to be within the high-concentration methane zone 34 within the reservoir 1, the produced fluid from the methane production wells is expected to be primarily methane, with brine solution also comprising a sizable portion of the production fluid.

The separate recovery of the production fluid from the $CO_2$ plume 24 (primary $CO_2$ with a small portion of methane) from the $CO_2$ production wells 28A and from the high-concentration methane zone 34 (primarily methane with a small portion of brine) from the methane production wells 28B can provide for more controlled extraction of methane and $CO_2$ and for maximum methane extraction from the reservoir 1. However, as will be appreciated by a person of ordinary skill in the art, as the $CO_2$ plume 24 expands within the reservoir 1, the high-concentration methane zone 34 can move past the methane production wells 28B. Therefore, a staged approach for the placement and drilling of the production wells 28 can be used to continue to provide for the separate production of $CO_2$ from $CO_2$ production wells 28A and of methane from methane production wells 28B.

Figure 6:
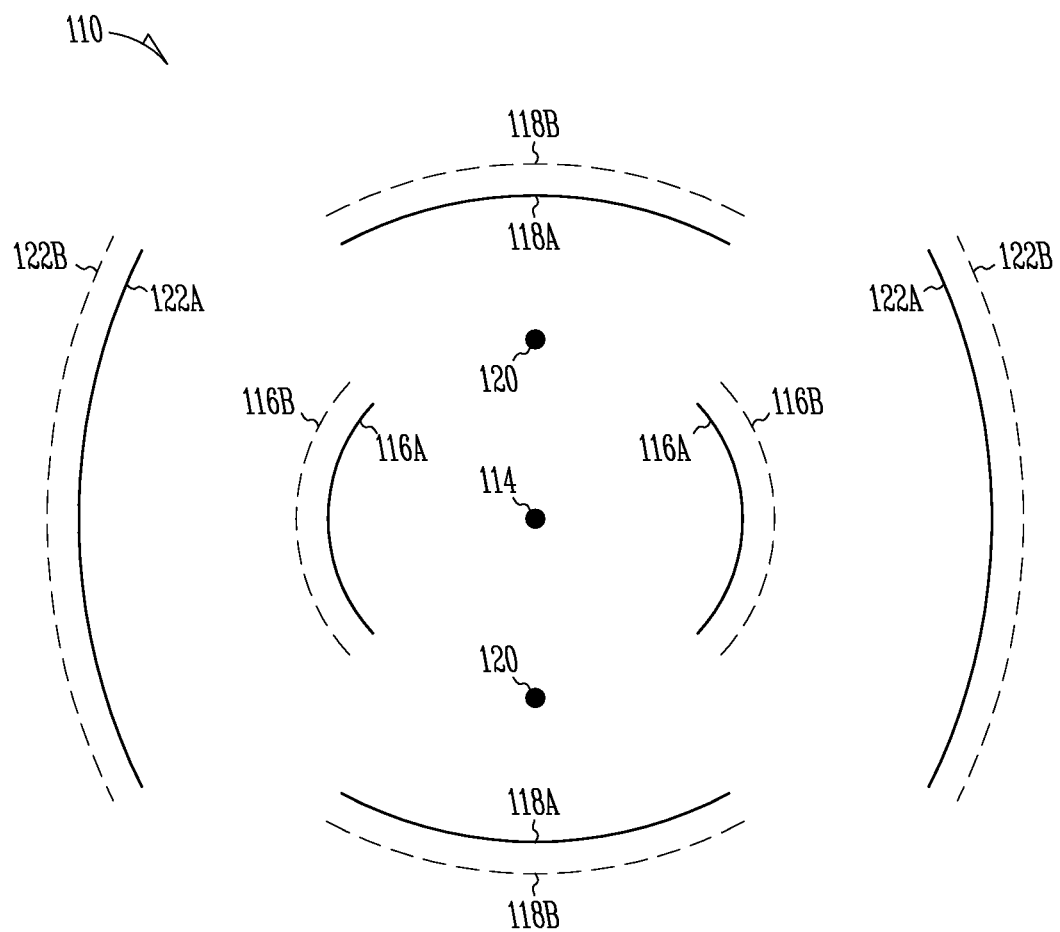
FIG. 6 is a simplified schematic diagram of the placement of various injection wells and production wells for extraction of working fluid and methane from a reservoir.
Figure 6:
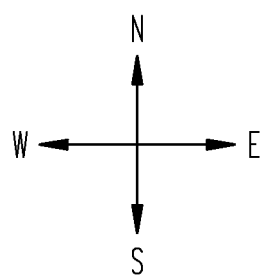

FIG. 6 is a map view showing an example well placement for a staged production using separate $CO_2$ production wells and methane production wells. As shown in the example of FIG. 6, an initial injection well 114 is drilled in a generally central location within a field 110. A set of initial arc production wells can be drilled on either side of the injection well 114. In an example, each set of production wells can include a first, $CO_2$ production well 116A, and a second, methane production well 116B. In an example, at the start up of the system, only the injection well 114, $CO_2$ production wells 116A, and methane production wells 116B are drilled.

A $CO_2$ working fluid can be injected into the injection well 114, as described above, so that a $CO_2$ plume forms within the underground reservoir. As further described above, the $CO_2$ working fluid can cause methane to come out of solution such that a zone of high methane concentration forms in front of the $CO_2$ plume. The $CO_2$ production wells 116A can be positioned relative to the injection well 114 so that a $CO_2$ production well opening is located within the $CO_2$ plume during an initial operating period after start up. The methane production wells 116B can be positioned relative to the injection well 114 so that a methane production well opening is located within the zone of high methane concentration during an initial operating period after start up. In an example, the $CO_2$ production wells 116A are spaced from the injection well 114 at about 100 m to about 2000 m. Each methane production well 116B can be spaced another 10 m to about 1000 m from a corresponding $CO_2$ production well 116A.

As the $CO_2$ working fluid is added to the reservoir from a $CO_2$ source, from circulating $CO_2$, or from $CO_2$ capture off the methane combustion heater, the $CO_2$ plume will grow over time. After an initial operating period, the $CO_2$ plume will reach the methane production wells 116B and the zone of high methane concentration will be pushed beyond the first methane production wells 116B. At such time, a second set of production wells can be drilled, such as a second pair of arc $CO_2$ production wells 118A and a second pair of arc methane production wells 118B. In the example shown in FIG. 6, the first set of production wells (e.g., $CO_2$ production wells 116A and methane production wells 116B) can be positioned along a first axis with respect to the injection well 114 (e.g., east to west through the injection well 114, as shown in FIG. 6). The second set of production wells (e.g., $CO_2$ production wells 118A and methane production wells 118B) can be positioned along a second axis with respect to the injection well 114, wherein the second axis can be generally perpendicular to the first axis (e.g., north to south through the injection well 114, as shown in FIG. 6). The additional production wells 118A, 118B and larger $CO_2$ plume can support a larger $CO_2$ circulation rate through the reservoir. One or more additional injection wells 120 can be drilled to accommodate the additional $CO_2$ circulation. In an example, the added injection wells 120 can be positioned along the second axis relative to the initial injection well 114. The added injection wells 120 can be spaced from the initial injection well 114 with approximately the same spacing as the $CO_2$ production wells 116A are spaced from the injection well 114, e.g., at about 100 m to about 2000 m. Similarly, the second $CO_2$ production wells 118A can be spaced from the added injection wells 120 with approximately the same spacing, e.g., at about 100 m to about 2000 m, with the second methane production wells 118B being spaced from the $CO_2$ production wells 118A at about 10 m to about 1000 m.

As the $CO_2$ plume continues to grow, the $CO_2$ plume can reach the methane production wells 118B such that additional production wells may be drilled. For example, a third set of production wells, such as third $CO_2$ production wells 122A and third methane production wells 122B can be drilled. In an example, the third production wells (e.g., $CO_2$ production wells 122A and methane production wells 122B) can be positioned along the first axis (e.g., the same axis as the first production wells 118A, 118B), or can be positioned along another axis with respect to the injection well 114. In an example, each third $CO_2$ production well 122A can be spaced from a corresponding first $CO_2$ production well 116A by approximately the same spacing as the first $CO_2$ production well 116A is spaced from the injection well 114, e.g., at about 100 m to about 2000 m. Each third methane production well 122B can be spaced from a corresponding third $CO_2$ production well 122A at about 10 m to about 1000 m.

As noted above, the primary components from the methane production wells 28B, 116B, 118B are expected to be methane and brine solution, which will generally be in separate phases at the surface (e.g., gaseous methane and liquid brine solution). Therefore, separation of methane from the production fluid of the methane production wells 28B, 116B, 118B can be relatively easy and inexpensive. A portion of the methane from the methane production wells 28B, 116B, 118B can be added to the combustion heater, along with any methane separated from the $CO_2$ production wells 28A, 116A, 118A, to supplement the geothermal energy recovered by an energy recovery system. A portion of the methane from the methane production wells 28B, 116B, 118B can also be stored or re-injected into the reservoir to ensure methane availability over the lifespan of the reservoir, wherein the re-injected methane can later be produced with $CO_2$, separated, and combusted to supplement geothermal energy recovery from the reservoir.

Any $CO_2$ that is produced from the methane production wells 28B, 116B, 118B can be sent through the energy recovery system, if the temperature and/or pressure of the $CO_2$ from the methane production wells 28B, 116B, 118B is sufficiently high. Alternatively, the $CO_2$ produced form the methane production wells 28B, 116B, 118B can be compressed, such as in compressor 20, and injected into the injection wells 14, 114, 120 along with the $CO_2$ working fluid 12.

Any brine or other liquid produced from either the $CO_2$ production wells 28A, 116A, 118A or the methane production wells 28B, 116B, 118B can be processed with an energy recovery device, such as an expansion device, a binary energy recovery system, or a heat exchanger, to recover geothermal energy that has been absorbed by the brine or other liquids. In most examples, unless the brine has a sufficiently high temperature, heat can be recovered from a brine solution only through a binary power system, such as an organic Rankine cycle (ORC) or a Kalina cycle. If the temperature of the brine solution is at least about 165° C., and preferably at least about 200° C., then a direct flash or dual-flash power system can be employed. In certain examples, it may be desirable to combust a portion of the methane extracted from the reservoir 1 in order to boost the temperature of the brine solution in addition to increasing the temperature and/or the pressure of the $CO_2$ production fluid. However, in general, water-based power systems are less efficient than gas-based power systems, and particularly $CO_2$-based power systems. In some examples, after geothermal heat has been extracted from the brine solution, the brine system can be disposed of, such as by injecting the brine solution into the reservoir 1 or another geological formation, or the brine solution can be used for another purpose within the system, such as a cooling medium within the cooling unit 22. Alternatively, the brine solution can be processed to extract useful minerals or to provide fresh water.

In order to maximize methane production and ensure methane is available for the lifespan of the system, careful and staged $CO_2$ plume development can be employed. A single geologic reservoir that is capable of supporting $CO_2$ injection and sequestration can, for instance, have multiple sublayers that can preferentially permit $CO_2$ flow. Sublayers can be distinguished by permeability and porosity. Sublayers that favorably support $CO_2$ injection via relatively high permeability or porosity, or both, can be near-vertically separated from sublayers of lower permeability, porosity, or both. Such sublayers that support or retard $CO_2$ flow can alternate in any order in a near-vertical stack, where "near-vertical," as used herein, can refer to the geologic layers and sublayers being substantially horizontally oriented, or only inclined from horizontal by from zero to a few degrees in deep naturally permeable and porous formations. Such sublayering is common in deep permeable formations. The sublayer can allow $CO_2$ injection and production to begin in one sublayer and then proceed to others, e.g. by perforating and completing the injection wells, or the production wells, or both, for the $CO_2$ plume (which can include methane plume, as described above) in one sublayer, and with a methane high-concentration zone, in another sublayer as each sublayer matures. In such a way, a long-term methane supply for operation of the geothermal energy recovery system can more readily be achieved.

The examples described above with respect to FIGS. 1-6 have all shown or described a single reservoir that includes a native fluid comprising methane in solution, where the $CO_2$ working fluid injected into the reservoir both extracts a portion of the methane and absorbs geothermal heat. However, other systems and methods can be included with the concepts of the present disclosure. For example, a geological formation can include a first geological formation in close proximity to a second geological formation. The first geological formation can comprise a native fluid that includes methane, while the second geological formation can comprise conditions that are favorable to geothermal heat absorption into a $CO_2$ working fluid, or for $CO_2$ sequestering, or both. For example, the first, methane-containing formation can be located above or below the second, geothermal heat formation. With such a geological configuration, a first set of one or more injection wells and one or more production wells can be drilled for the first formation, and a second set of one or more injection wells and one or more production wells can be drilled for the second formation. A small amount of $CO_2$ working fluid can be injected into the first formation to extract methane therefrom, while a larger amount of $CO_2$ working fluid can be injected into the second formation for geothermal heat recovery or $CO_2$ sequestering, or both. The circulating $CO_2$ working fluid in the first formation can supply methane for the system, while the circulating $CO_2$ working fluid in the second formation can be used for geothermal heat recovery, e.g., via the formation of a $CO_2$ plume, or for sequestering at least a portion of the injected $CO_2$, or both.

Figure 7A:
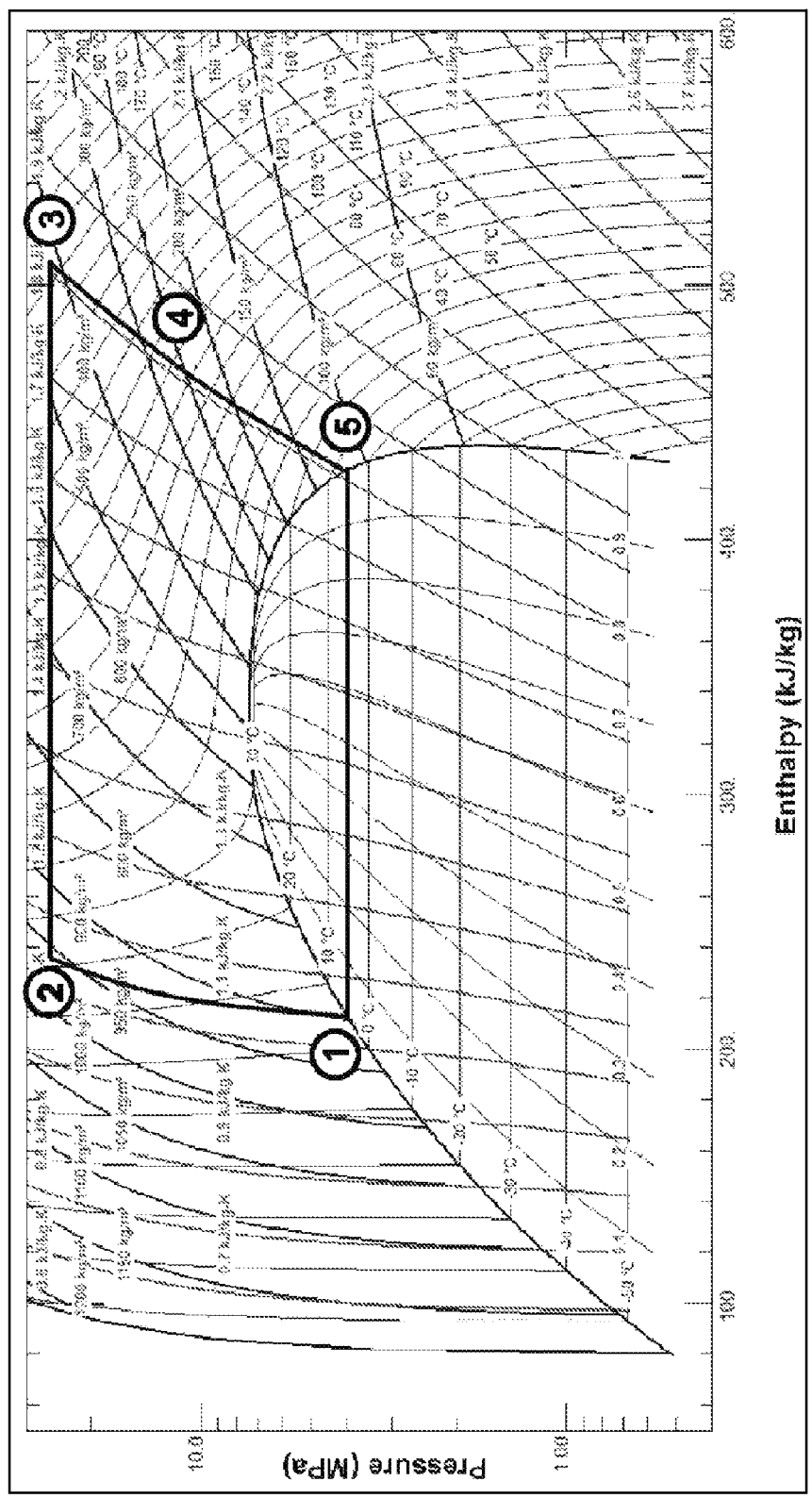
FIG. 7A is a phase diagram of an example power cycle for a $CO_2$-only working fluid.
Figure 7B:
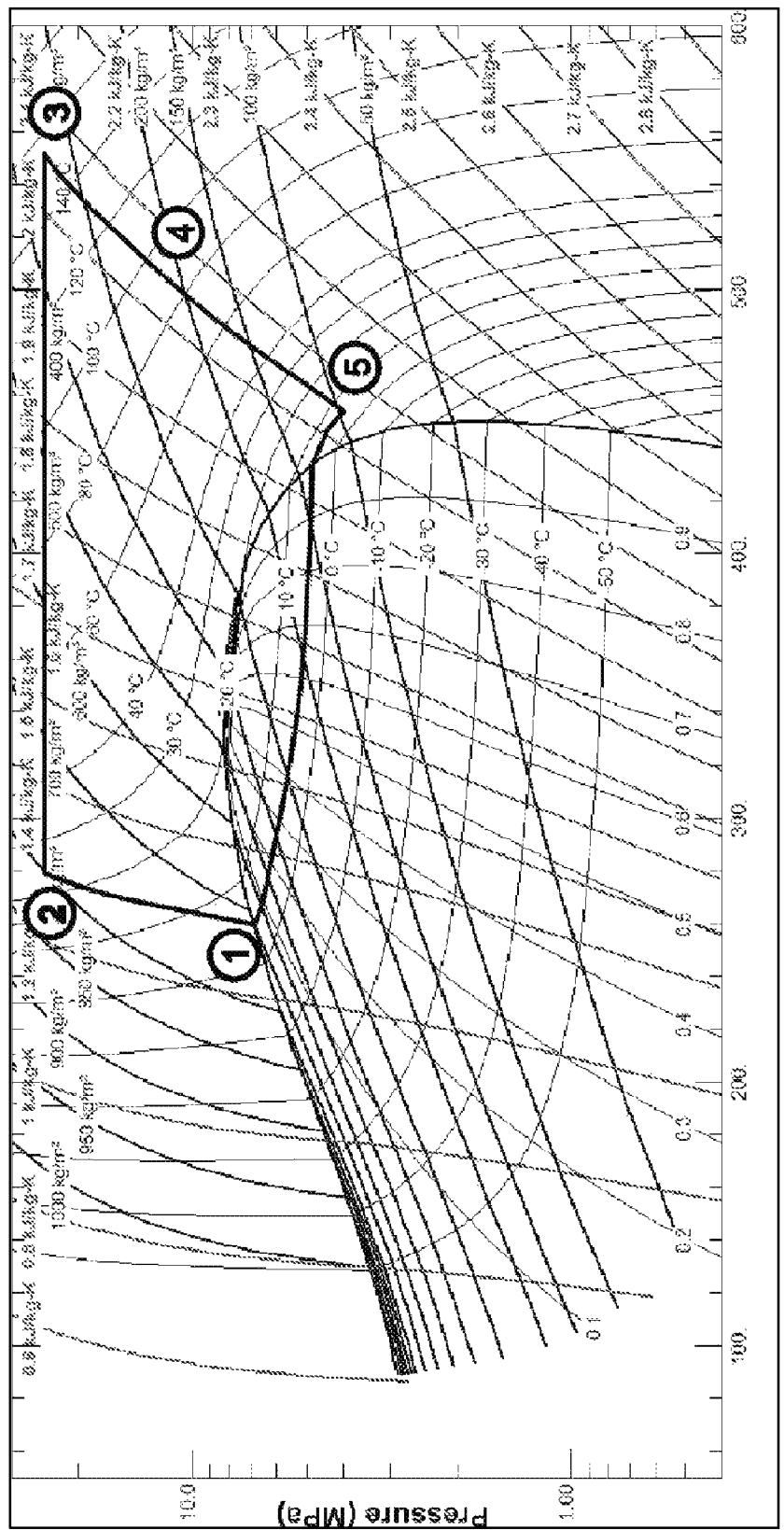
FIG. 7B is a phase diagram of an example power cycle for a $CO_2$-methane working fluid.

As discussed above, the production fluid 26 being produced from the reservoir 1 can have a percentage of methane included within the production fluid 26, e.g., from 1 wt % to 10 wt % or more, such as about 5 wt % methane and 95 wt % $CO_2$. It has been surprisingly found that the inclusion of even a small percentage of methane in the production fluid 26 can have a demonstrable improvement in system efficiency compared to a produced fluid that is substantially all $CO_2$, as in a CPG geothermal recovery system. FIGS. 7A and 7B show pressure-enthalpy phase diagrams for a 100% $CO_2$ working fluid cycling through the system (FIG. 7A) and a 95% $CO_2$, 5% methane working fluid (FIG. 7B). Each phase diagram has been marked with a hypothetical cycle of the working fluid or production fluid as it moves through the reservoir 1, is produced to the surface systems (e.g., the energy recovery system 32), and re-injected back into the reservoir 1.

Each of the phase diagram cycles in FIGS. 7A and 7B is marked with five (5) points representing five specific locations within the cycle. In both FIG. 7A and FIG. 7B, point "1" represents the injection of the working fluid 12 at the top of the injection well 14. Point "2" represents the working fluid 12 as it exits the injection well opening 16. Point "3" represents the production fluid 26 as it enters the production well opening 30. Point "4" represents the point just before the production fluid 26 enters the energy recovery system, e.g., just before it is sent through an expansion device 36. Point "5" represents the production fluid 26 after it has exited the energy recovery system 32, e.g., from the expansion device 36, but before it has been cooled in a cooling unit 22.

As can be seen from the comparison of FIGS. 7A and 7B, the system that includes 5% methane can actually recover more energy within the energy recovery system 32, as indicated by the greater change in enthalpy along the horizontal axis of FIG. 7B between point 4 and point 5, compared to the change in enthalpy between points 4 and 5 in FIG. 7A. For example, the enthalpy change between points 4 and 5 in FIG. 7A ($CO_2$ only) is about 40 kJ/kg of working fluid, while the enthalpy change between points 4 and 5 in FIG. 7B ($CO_2$ and methane) is about 50 kJ/kg of working fluid, or slightly more than a 20% increase in potential energy to be extracted. Although not all of the enthalpy change in the working fluid or production fluid can be recovered by the energy recovery system 32, assuming the efficiency of the energy recovery system 32 recovering energy from a $CO_2$ and methane fluid is substantially the same as the efficiency of the system 32 recovering energy from a pure $CO_2$ system, it is expected that the difference in enthalpy change will result in a higher amount of energy being extracted from the production fluid (and thus a higher amount of electricity produced) for a $CO_2$ and methane system compared to a $CO_2$ only stream as in a CPG system.

In addition, the amount of heat energy that needs to be removed in the cooling unit 22 (represented by the enthalpy change between points 5 and 1 in FIGS. 7A and 7B) is less for the $CO_2$ and methane working fluid or production fluid. For example, the enthalpy change between points 5 and 1 in FIG. 7A ($CO_2$ only) is about 215 kJ/kg, while the enthalpy change between points 5 and 1 in FIG. 7B ($CO_2$ and methane) is about 195 kJ/kg, or approximately a 9% decrease in the heat dump that is required within the cooling unit 22.

As demonstrated by FIGS. 7A and 7B, the addition of even a small portion of methane (5 wt. %) provides for potentially a 20% increase in electricity production and a 10% decrease in the cooling load required before re-injection. This shows that, surprisingly, the extraction of even a small portion of methane from the native fluid 2 within a reservoir 1 can not only be used to boost temperature or pressure of the production fluid, which can increase overall system efficiency (as described above, but also further improves the operating efficiency of the system simply by the methane being present.

Waste Heat-Enhanced CPG System

As noted above, in some examples, the reservoir into which the $CO_2$ working fluid is injected, e.g., reservoir 1 in FIGS. 1-4, can comprise a hydrocarbon field that has been partially depleted via conventional oil or natural gas recovery methods. In these partially-depleted oil and natural gas fields, the $CO_2$ can be injected for the purpose of enhanced oil recovery (EOR). Hydrocarbon reservoirs can contain substantial fractions of oil and gas, which can be far more than the small percentage of methane that can be dissolved in deep brine aquifers. The $CO_2$ working fluid that is injected into such hydrocarbon reservoirs can free and carry to the surface large quantities of hydrocarbons and other fluids such that $CO_2$ constitutes even the minority of the produced flow. In some examples, however, the hydrocarbon field can be substantially depleted of hydrocarbons such that they produce very little oil or natural gas through primary or secondary recovery. In these substantially depleted fields, water or brine and $CO_2$ can comprise far more of the flow than do hydrocarbons. In short, the composition of the production fluid from an EOR field can be complex and varied. In some examples, the methane and other hydrocarbons that are produced can be much greater than is necessary for enhancing geothermal energy recovery and for re-injection into the reservoir, so that the additional methane and other hydrocarbons can be sold in addition to what is kept for use in enhanced CPG operations.

The complex produced fluid from an EOR field, which can generally comprise a combination of $CO_2$, hydrocarbons, and water or brine, can either be separated before or after geothermal heat energy extraction. The heat extraction apparatuses, generally either a direct or a binary power system, that are employed in an EOR setting can be chosen on a site-specific basis according to produced fluid temperature, pressure, and composition conditions.

In an example, the systems required for EOR operations can be powered by electricity. The electricity requirements of an EOR system can be substantially greater than the requirements for a $CO_2$ plume geothermal system or a $CO_2$ geothermal system including methane combustion to supplement the geothermal energy recovery. The electricity for EOR operations can be purchased from the grid or through the use of on-site gas turbines fueled by purchased or locally-produced methane. In the case of produced methane, power production efficiency and total power produced can be increased through the use of the methane-enhanced geothermal recovery systems described above. The increased efficiency of the methane-enhanced systems can be achieved with little or no increase in cost for the site operator because geothermal and gas combustion energy are combined. Moreover, the overall power costs for an EOR system that is supplemented with methane-enhanced geothermal energy recovery can be decreased because the power produced onsite can be produced from all available energy types, e.g., geothermal and gas chemical.

One or more components of the geothermal energy recovery system or other co-located systems, such as an EOR recovery system, can include an operation or equipment that can generate considerable heat. Often, heat generated by these systems, operations, or equipment are allowed to dissipate to the atmosphere such that the heat energy is essentially wasted. This kind of heat is referred to herein as "waste heat."

An example of waste heat that can occur at or near a geothermal energy recovery system can include heat generated by a $CO_2$ compressor. As noted above, $CO_2$ working fluid 12 from a $CO_2$ source 18 can be pressurized in a compressor 20 before it is injected into the injection well 14. Similarly, the $CO_2$ that is formed during combustion of the separated methane 46 to increase the temperature or pressure of the production fluid 26 and the captured can also be compressed with a compressor 20 and injected into the injection well 14. Also, in an enhanced oil recovery (EOR) system, $CO_2$ can be produced from the reservoir 1 and separated from the production fluid 26. The produced $CO_2$ can be compressed and re-injected back into the reservoir 1. It is understood in the art that $CO_2$ compressors, such as those used in EOR systems or for the compression of $CO_2$ for injection into a reservoir, such as for $CO_2$ sequestration, can generate a considerable amount of heat. In an example, a $CO_2$ compressor for the injection of $CO_2$ into the reservoir 1 can generate 50 to 1500 kJ of heat energy per kg of $CO_2$ compressed, such as 200 to 600 kJ of heat energy per kg of $CO_2$ compressed, for example 400 to 450 kJ of heat energy per kg of $CO_2$ compressed.

Another example of a source of waste heat can occur in an EOR system. As described above, a production fluid from an EOR field can include $CO_2$, brine or other native liquids, and hydrocarbons from the oil or gas reservoir. The different components of the production fluid can be separated, either before the geothermal energy is recovered or after. One method for separating hydrocarbons from the other fluids in the production fluid can include burning a portion of the methane or other hydrocarbons that are produced within a separation vessel, which in turn heats the production fluid. The increased temperature of the production fluid can improve separation of liquid hydrocarbons from $CO_2$, natural gas, and brine. However, the heating to improve separation results in a stream of hot liquid hydrocarbons, hot brine, hot $CO_2$ and natural gas, or any combination thereof, that have conventionally simply been allowed to cool by dissipating the heat to the atmosphere.

Still another example of a source of waste heat can occur with a facility that includes the geothermal energy recovery systems of the present disclosure co-located with another type of facility that produces excess heat. For example, if the geothermal energy recovery facility is co-located with an ethanol or other biofuel production plant. A co-located ethanol or biofuel plant can be desirable because such plants generally produce $CO_2$ waste streams during production that can be captured and used as the $CO_2$ source for the geothermal energy recovery systems of the present disclosure. Other examples of waste heat sources from other facilities include, but are not limited to, fermentation tanks in biofuel facilities, furnaces in industrial facilities such as cement manufacturing plants, cooling units in fossil fuel power plants, and the heat energy produced at a flare, such as a methane or natural gas flare. Moreover, the $CO_2$ generated by ethanol and biofuel plants are typically relatively clean $CO_2$ streams that can be captured at a lower cost than $CO_2$ from fossil fuel power plants. Capturing and injecting the $CO_2$ from the ethanol or biofuel plant can require the use of a $CO_2$ compressor, which, as noted above, can generate considerable waste heat.

The above examples of waste heat are intended to be merely exemplary of the sources of waste heat that may be typical or advantageous when co-located with geothermal energy recovery. The above examples are not intended to be limiting, and a person of ordinary skill in the art can readily determine whether other waste heat sources can be used to supplement geothermal energy recovery, as described below.

Figure 8:
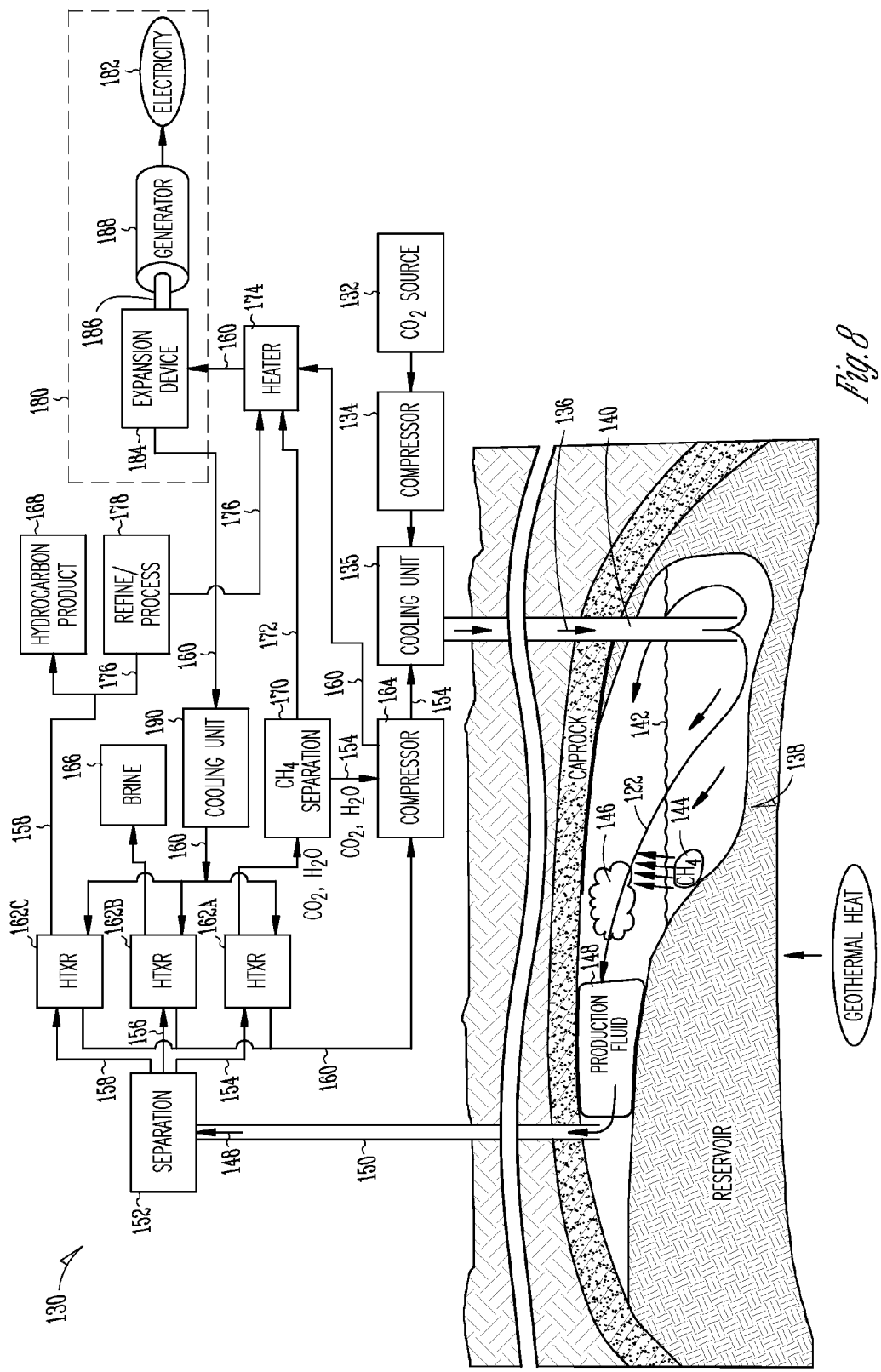
FIG. 8 is a simplified schematic diagram of another example geothermal energy recovery system.

FIG. 8 shows a non-limiting example of a system 130 where geothermal energy recovery can be supplemented by waste heat recovery. The system 130 of FIG. 8 can include a $CO_2$ source 132 that is pressurized in a compressor 134 to form a $CO_2$ working fluid 136 that can be injected into a reservoir 138 through an injection well 140. The $CO_2$ working fluid 136 off the compressor 134 can be cooled in a cooling unit 135.

The reservoir 138 can include a native fluid 142 that can include methane 144 in solution within the native fluid 142. In an example, the native fluid 142 can include oil or other hydrocarbons or brine within an EOR reservoir 138. The $CO_2$ working fluid 136 can form a $CO_2$ plume 146 within the reservoir 138 that can comprise $CO_2$ from the working fluid 136, a portion of the methane 144 that is released from solution within the native fluid 142, hydrocarbons from the native fluid 142 that are released due to the injection of the $CO_2$ working fluid 136, and other native fluids such as brine or water (discussed in more detail above). All of these components can form a production fluid 148 that is produced to the surface via a production well 150. In short, the system 130 can be configured as an enhanced oil recovery (EOR) system. As described above, the system 130 can include several subsystems for energy recovery or conversion that supplements geothermal energy recovery by increasing the energy that is available to an energy recovery system.

The production fluid 148 can be fed into a separation system 152 that can separate the production fluid 148 into its various components. In an example, the separation system 152 can separate the production fluid 148 into a gaseous $CO_2$ and methane stream 154, a liquid brine or water stream 156, and a liquid hydrocarbon stream 158. As described above, in some methods separation can be aided in the separation system 152 by heating the production fluid 148 to high temperatures to more efficiently separate the liquid hydrocarbons 158 from the other components, which can result in all three of the product streams 154, 156, and 158 from the separation system 152 being at a high temperature, such as about 30° C. to about 120° C., for example about 50° C. to about 80° C.

The heat energy created in the separation system 152 had conventionally been allowed to dissipate to the atmosphere as waste heat. The example system 130 of FIG. 8, however, is configured to recover at least a portion of the waste heat from the separation system 152. A secondary working fluid 160 can be circulated throughout the system at the surface in order to recover heat energy from various sources. As shown in the example of FIG. 8, one or more heat exchangers can be configured to recover heat from the hot separated streams 154, 156, 158, such as a first heat exchanger 162A on the $CO_2$/methane stream 154, a second heat exchanger 162B on the brine stream 156, and a third heat exchanger 162C on the liquid hydrocarbon stream 158. The secondary working fluid 160 can be split into three separate streams that are fed through the heat exchangers 162 in order to absorb heat from the hot product streams 154, 156, 158. The secondary working fluid 160 will also absorb at least a portion of the geothermal energy absorbed by the production fluid 148 in the reservoir 138. After passing through the heat exchangers 162, the secondary working fluid 160 can be rejoined for further circulation.

In one example, the separation system 152 may not produce a considerable amount of waste heat, e.g., where liquid hydrocarbon separation can be achieved without further heating. In such a case, the heat exchangers 162 can be configured to only absorb the geothermal energy that has been absorbed by the production fluid 148 (and which is present in the separate product streams 154, 156, 158). Alternatively, a single heat exchanger can be positioned upstream or downstream of the separation system 152 to absorb the geothermal heat energy.

At least a portion of the cooled $CO_2$/methane stream 154 can be pressurized by a compressor 164 for re-injection back into the reservoir 138 through the injection well 140. The cooled brine or water stream 156 can be put into brine storage 166, such as within water or brine tanks or by being injected into a geological formation. At least a portion of the cooled liquid hydrocarbon stream 158 can be sold as a hydrocarbon product 168.

The secondary working fluid 160 can circulate to other parts of the system 130 in order to absorb other heat energy that might otherwise be dissipated to the atmosphere. As described above, the $CO_2$/methane compressor 164 can generate considerable heat energy, e.g., about 400 kJ to about 450 kJ per kg of $CO_2$ and methane being compressed for each stage of compression. In an example, the secondary working fluid 160 can be circulated to the compressor 164 in order to recover a portion of the waste heat energy. In an example, a heat exchanger (not shown) can be placed on the $CO_2$/methane stream 154 immediately downstream of the compressor 164 to transfer heat energy from the hot $CO_2$/methane stream 154 to the secondary working fluid 160. In another example, the compressor 164 can be configured so that the secondary working fluid 160 flows around or through the compressor 164, e.g., through a cooling jacket on the compressor 164, to absorb heat from the compressor 164. Moreover, heat can be absorbed from the outlet of the compressor (e.g., immediately downstream of the compressor), or heat can be absorbed after one or more stages (e.g., from an intercooler) of the compressor.

In an example, the compressor 164 produces more heat energy than the heat energy produced in the separation system 152. For this reason, the circuit of the secondary working fluid 160 can be configured to first recover the heat energy from the separation system 152 (via the heat exchangers 162), and then to recover heat energy from the compressor 164.

As discussed above with respect to FIGS. 1-4, a portion of the methane produced from the reservoir 138 can be separated from the production fluid and combusted to supplement energy recovery by increasing the temperature of a fluid, such as a production fluid or a secondary working fluid. The system of FIG. 8 can optionally include this feature of the present disclosure by including a methane separation system 170 to separate a portion 172 of the methane from the $CO_2$/methane stream 154. The separated methane 172 can be fed into a combustion heater 174 that heats the secondary working fluid 160. In an example, the combustion heater 174 produces more heat energy than the heat energy produced in the separation system 152 or the compressor 164. For this reason, the circuit of the secondary working fluid 160 can be configured to first recover the heat energy from the separation system 152, then recover the heat energy from the compressor 164, and then recover the heat energy from the combustion heater 174.

A portion of the liquid hydrocarbons can be split off from the liquid hydrocarbon stream 158 to be combusted in a heater to further heat the secondary working fluid 160. In the example shown in FIG. 8, a separated portion 176 of the liquid hydrocarbon stream 158 can be processed or refined in a refining or processing system 178 to modify the composition of the separated liquid hydrocarbons 176 to be more ideal for combustion within the heater. The refined or processed liquid hydrocarbons 176 can be fed into a heater, which can be the same heater 174 in which the separated methane 172 is combusted (as shown in FIG. 8), or the refined or processed hydrocarbons 176 can be fed into a separate heater (not shown).

Alternatively, as described above, rather than heating the secondary working fluid 160 with a heater 174, the separated methane 172 and the liquid hydrocarbons 176 can be combusted in a conventional gas turbine or gas engine (not shown) to produce electricity from the turbine or engine. The combustion of the hydrocarbon fuel, e.g., the methane 172 and the liquid hydrocarbons 176 in the gas turbine or the engine can produce substantial waste heat in the form of hot combustion gases (e.g., $CO_2$ and steam) and hot engine or turbine cooling jacket fluid. The waste heat can be added to the working fluid 160, such as via a heat exchanger. This configuration can, in some cases, lead to higher energy conversion efficiency then directly heating the working fluid 160 in a heater 174.

The byproducts of the combustion heater 174 can comprise $CO_2$, which can be captured and compressed for re-injection into the reservoir 138, similar to the $CO_2$ capture system 58 described above with respect to FIG. 1. The captured $CO_2$ can be fed into the same compressor 164 as the separated $CO_2$ and methane 154, or a separate compressor (not shown) can be used. Waste heat from compressing the captured $CO_2$ can also be recovered using the secondary working fluid 160.

After the secondary working fluid 160 has recovered heat from each heat source (e.g., waste heat from the separation system 152 or the compressor 164, or both, and heat from combustion of separated methane 172 or separated liquid hydrocarbons 176 in a combustion heater 174 (if present)), the secondary working fluid 160 can be fed into an energy recovery system 180 that can convert energy in the secondary working fluid 160 to another form, such as electricity 182 or direct-use heat. In the example shown in FIG. 8, the energy recovery system 180 includes an expansion device 184 through which the secondary working fluid 160 passes to produce shaft power 186. The shaft power 186 can drive a generator 188 to produce the electricity 182. The secondary working fluid 160 can then be circulated through a cooling unit 190 before restarting the cycle at the heat exchangers 162.

As is further described above, a separate facility, such as a power plant, a biofuel plant, or an industrial plant can be co-located with the geothermal energy recovery system of the present disclosure. Waste heat from such a co-located facility can be recovered using heat exchangers and a working fluid, such as the secondary working fluid 160, that is pumped between the co-located facility and the geothermal energy recovery system, or the production fluid 148 or one or more of its constituent components can be pumped over to the co-located facility so that the waste heat can be transferred directly to the production fluid or the constituent component or components.

Alternative Configurations

In an example, another combustible fuel, such as natural gas, biomass, or a biofuel (e.g., ethanol or diesel produced from biological sources), can be obtained from a third party outside of the geothermal energy recovery system. In another example, the other fuel can be produced at a co-located facility, such as a co-located ethanol or other biofuel production facility. The other fuel can be used to boost total power production of the geothermal energy recovery system, e.g., by combusting the outside fuel to increase the temperature, the pressure, or both, of the $CO_2$ based working fluid. For example, if a geothermal energy recovery facility has been operating for a long period of time such that the amount of methane that is being produced from the reservoir is low, then the outside fuel can be used to supplement or replace the now-defunct methane production. The geothermal heat recovered with the $CO_2$-based working fluid and the outside fuel source can combine in much the same fashion as $CO_2$-based energy recovery and combusted produced methane, to increase the overall efficiency of conversion energy to electricity and to produce more electricity than either system could provide alone. In some examples, it may be more economical to purchase natural gas (mainly $CH_4$), or other fuels, from a third party rather than relying on, or solely relying on, separated $CH_4$ from the production fluid. For example, if the cost of natural gas is cheaper than the cost of separation. In an example, the fuel used in the combustion heater can comprise solely natural gas or other outside fuel, such as outside natural gas or fuel purchased from a third party, rather than using any separated $CH_4$ produced from the reservoir.

In another example, site development considerations may favor immediate production of the methane within the reservoir, rather than long-term steady production of the methane. For example, rather than ensure gradual methane production over the life of a site, it can be better operated by producing the maximum methane that can be extracted beginning immediately with the onset of $CO_2$ injection and continuing while the $CO_2$ plume is established. The produced methane can be sold or stored onsite, such as in methane storage tanks or within a geologic formation separate from the reservoir into which the $CO_2$ working fluid is injected. In the case of sold methane, a portion of the methane can be purchased back over time to supply the system as needed. In the case of stored methane, the methane can be removed from storage over time to supply the system. Immediate production of the methane can be economically favorable in circumstances when the well or wells that for methane or brine production can be repurposed for $CO_2$ circulation without the need for separate methane and $CO_2$ wells. The economic advantages of repurposing the methane or brine production wells for $CO_2$ circulation can be balanced with the added costs for methane storage (e.g., storage tanks or systems for storing the methane in a geological formation).

Figure 9:
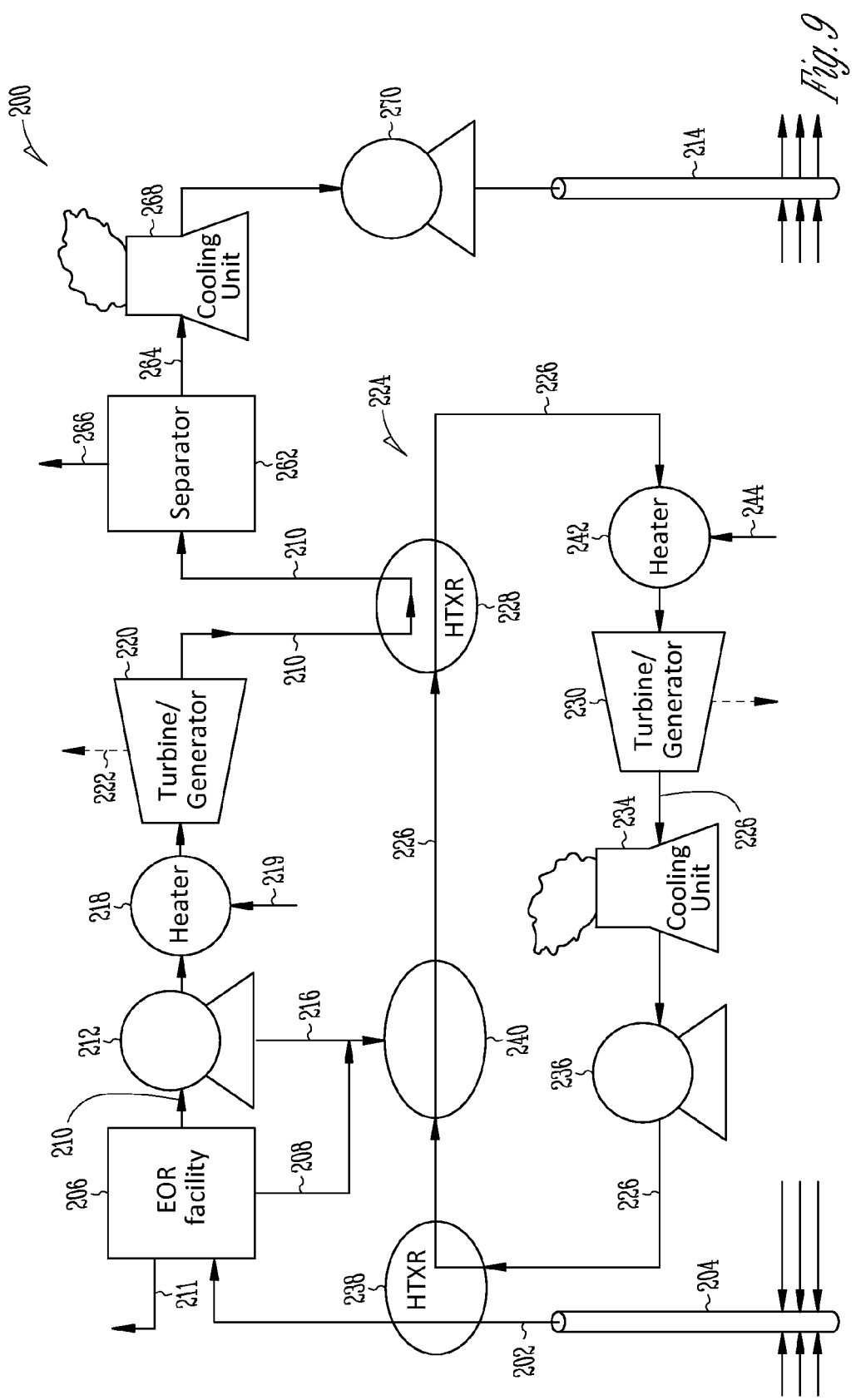
FIG. 9 is a simplified schematic diagram of another example geothermal energy recovery system.

FIG. 9 shows an example of another system 200 for geothermal energy recovery from a production fluid 202 produced via a production well 204 from a reservoir. The reservoir is not shown in FIG. 9, but a person of ordinary skill in the art will understand that the reservoir can be similar to the reservoirs shown in FIGS. 1-4 and 8. The system 200 can be particularly suited for an EOR reservoir, e.g., a reservoir including native fluids including methane, oil or other hydrocarbons, and brine. The system 200 can also include an EOR facility 206, e.g., a facility including one or more unit operations for the separation of the production fluid 202 into its components, some of which are described above with respect to FIG. 8. The geothermal energy present in the production fluid 202 can be used to contribute to the process heat energy used within the EOR facility 206. In other words, the natural geothermal energy recovered by the production fluid 202, in addition to providing for electricity generation as described throughout the present disclosure, can also improve the efficiency of the EOR process within the EOR facility 206. As demonstrated in FIG. 9, EOR waste process heat 208 can be recovered from the EOR facility 206 via any of the techniques described herein.

The EOR facility 206 can separate a production gas stream 210, which can include $CO_2$, $CH_4$, and other gaseous hydrocarbons, and water and other hydrocarbons 211 from the production fluid 202. The system 200 can include a compressor or pump 212 downstream of the EOR facility 206 for increasing the pressure of the production gas stream 210 before recovering energy from the production gas stream 210. In particular, the compressor or pump 212 may be desired if the output pressure of the production gas stream 210 from the EOR facility 206 has a relatively low output pressure. The compressor or pump 212 can also compress the production gas stream 210 to desired injection conditions so that after energy recovery, the production gas stream 210 can be injected back into the reservoir via an injection well 214.

The compressor or pump 212 can increase the overall efficiency of the system. Surprisingly, it has been found that increasing the pressure of the production gas stream 210, such as with the compressor or pump 212, can increase the efficiency of the system by more than the amount of energy required to compress the production gas stream 210. Waste heat 216 from the compressor or pump 212 can be recovered by the system 200, as described in more detail above and below.

After the compressor or pump 212, if present, the production gas stream 210 can be fed through an energy recovery apparatus that can be similar to the methods described above, e.g., but first heating the production gas stream 210 in a heater 218, such as by combusting one or more fuels 219 in the heater 218, such as separated $CH_4$, hydrocarbon fuel from the EOR operation, or other supplied fuel such as supplemental $CH_4$, or via the recovery of waste heat in a heat exchanger/heater 218, to increase the temperature, increase the pressure, or both, of the production gas stream 210. Alternatively, the one or more fuels 219 can be combusted in a conventional gas turbine or gas engine (not shown) to produce electricity from the turbine or engine, and waste heat (in the form of hot combustion gases and hot cooling jacket fluid) from the turbine or engine can be added to the production gas stream 210, such as via a heat exchanger, rather than directly heating the production gas fluid 210 with a heater 218.

The heated or pressurized production gas stream 210 can be fed through a primary energy-recovery system 220 to produce electricity 222 directly from the production gas stream 210, such as one or more of a turbine, a generator, or an energy-recovery loop such as a Rankine power cycle, an organic Rankine cycle (ORC), or a Kalina cycle. A description of several examples of primary energy-recovery systems are described above with respect to FIGS. 1-4 and 8.

The system 200 of FIG. 9 can also include a secondary energy-recovery loop 224 to recover additional energy from the hot, low pressure production gas stream 210. The secondary energy-recovery loop 224 can comprise any feasible type of energy-recovery cycle, such as a Rankine power cycle, an Organic Rankine Cycle (ORC), or a Kalina Cycle. In the example of FIG. 9, the secondary energy-recovery loop 224 includes an ORC-type energy-recovery loop where a secondary working fluid 226 is circulated through the cycle loop 224. Examples of secondary working fluids that can be used in the secondary energy-recovery loop 224 include, but are not limited to, one or more of $CO_2$, isobutene, ammonia, or a variety of other fluids. The type of secondary fluid can be selected and optimized depending on the temperature of the production gas stream 210 directly downstream of the primary energy-recovery system 220 as well as the flow rate of the production gas stream 210.

The secondary working fluid 226 can be heated, via a heat exchanger 228, with the hot production gas stream 210 after it has been fed through the primary generator or turbine system 220. The heated secondary working fluid 226 can then be fed into a secondary turbine or generator 230 to produce additional electricity 232. After passing through the secondary turbine and generator 230, the secondary working fluid 226 can be cooled in a cooling unit 234, and the pressure of the secondary working fluid 226 can be increased with a pump or compressor 236 to increase the pressure of the working fluid 226 before starting the cycle over and heating the working fluid 226, such as with the hot, low pressure production gas stream 210 in the heat exchanger 228.

Depending on the temperature of the production gas stream 210 immediately downstream of the primary energy-recovery system 220, the secondary energy-recovery loop 224 can comprise a supercritical cycle, a transcritical cycle, a subcritical cycle, or a subcritical with superheater cycle.

The secondary energy-recovery loop 224 can provide for energy recovery from relatively lower-temperature sources. Therefore, additional low-temperature heating sources can be applied to further heat the secondary working fluid 226 beyond just using the hot production gas stream 210. The additional heating from lower-temperature sources can include geothermal energy recovery via a heat exchanger 238 that uses the production fluid 202 substantially immediately after being produced from the production well 204 to heat the secondary working fluid 226. The secondary working fluid 226 can also be further heated in a waste-heat heat exchanger 240 heated by waste heat from other parts of the system 200. Waste heat sources that can be particularly useful in the secondary energy-recovery loop 224 can include waste heat 208 from the EOR facility 206 and waste heat 216 from the pump or compressor 212.

It would be difficult to recover heat energy from the relatively lower-temperature energy sources described above using the primary energy-recovery system 220 because the $CO_2$, $CH_4$, and other gases in the production gas stream 210 coming out of the EOR facility 206 or the pump or compressor 212 can be relatively hot. In contrast, for at least portions of the secondary energy-recovery loop 224, the secondary working fluid 226 can be relatively cool, particular after the cooling unit 234 but before heating the secondary working fluid 226 in the heat exchanger 228 with the hot production gas stream 210.

The secondary working fluid 226 can also be further heated by a high-temperature energy source, such as by combusting one or more fuels 244, such as separated $CH_4$, other hydrocarbons from the EOR facility 206, or other fuels (such as purchased $CH_4$), in a secondary combustion heater 242. In an example, the secondary combustion heater 242 operates at a higher temperature than the hot production gas stream 210, so that the secondary heater 242 is placed downstream of the heat exchanger 228 as the last source of heat added to the secondary working fluid 226 in the secondary energy-recovery loop 224. The secondary energy-recovery loop system 200 of FIG. 9 can be particularly well suited for very low-temperature geothermal reservoirs, such as those at temperatures below about 75° C.

Additional energy recovery loops, e.g., a tertiary loop, a quaternary loop, and so on, can be included in the system 200. For example, the hot secondary working fluid 226 coming out of the secondary turbine or generator 230 can be used to heat a tertiary working fluid in a tertiary energy-recovery loop, and so on.

Figure 10:
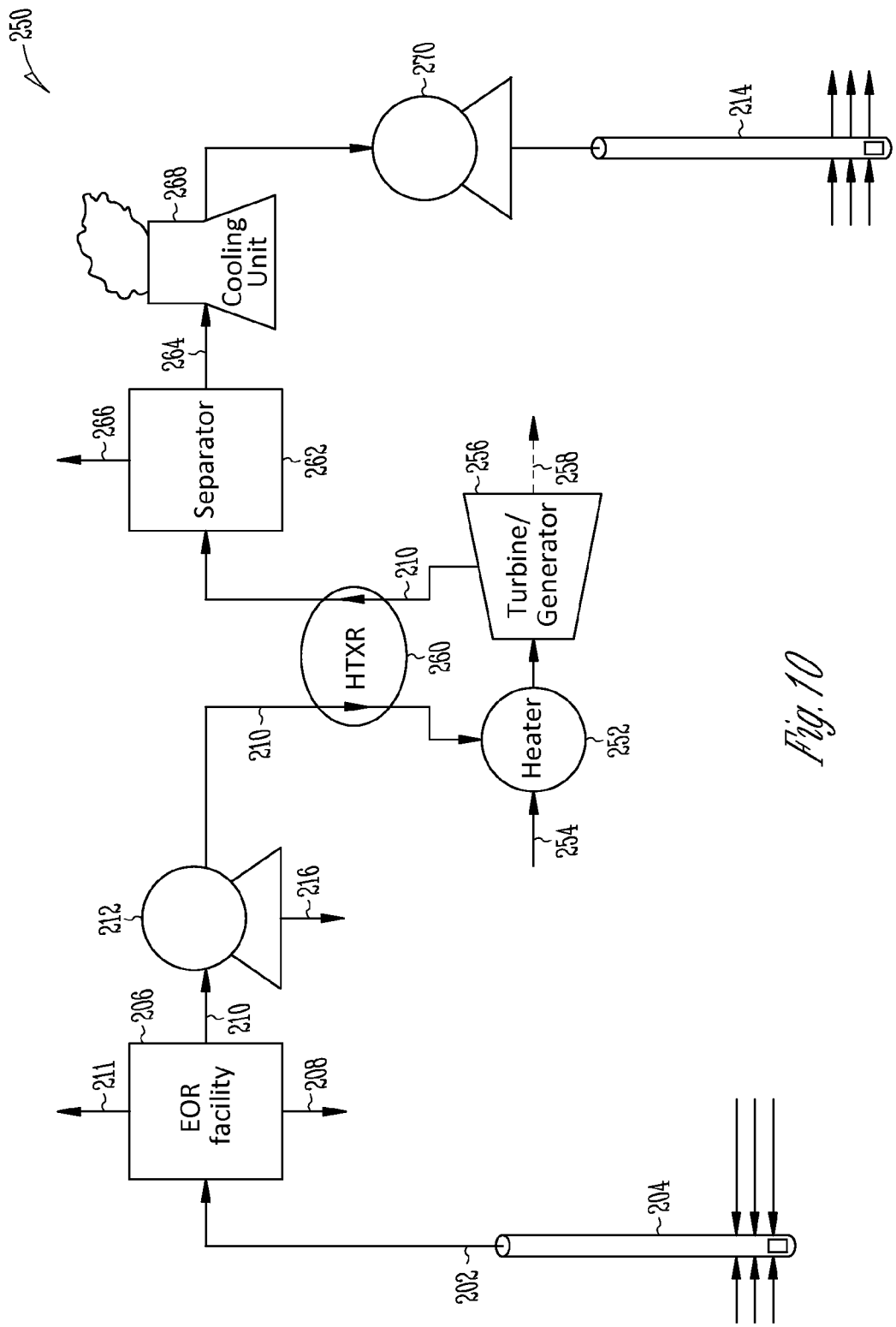
FIG. 10 is a simplified schematic diagram of another example geothermal energy recovery system.

FIG. 10 shows an example of another system 250 for geothermal energy recovery. The system 250 can be similar to the system 200 described above with respect to FIG. 9, e.g., the system 250 can provide for energy recovery from a production fluid 202 produced via a production well 204 from a reservoir. The reservoir is not shown in FIG. 10, but a person of ordinary skill in the art will understand that the reservoir can be similar to the reservoirs shown in FIGS. 1-4 and 8. The system 250 can be particularly suited for an EOR reservoir, e.g., a reservoir including native fluids including methane, oil or other hydrocarbons, and brine. Like the system 200 of FIG. 9, the system 250 can also include an EOR facility 206 that can separate the production fluid 202 into one or more components, including a production gas stream 210, which can include $CO_2$, $CH_4$, and other gaseous hydrocarbons from the production fluid 202.

Similar to the system 200 of FIG. 9, the system 250 in FIG. 10 can include a compressor or pump 212 downstream of the EOR facility 206 for increasing the pressure of the production gas stream 210 before recovering energy from the production gas stream 210, e.g., if the output pressure of the production gas stream 210 from the EOR facility 206 has a relatively low output pressure. The compressor or pump 212 can also compress the production gas stream 210 to desired injection conditions so that after energy recovery the production gas stream 210 can be injected back into the reservoir via an injection well 214.

Like the system 200 of FIG. 9, the system 250 can include sending the production gas stream 210 through a primary energy-recovery apparatus after the compressor or pump 212, if present. For example, the production gas stream 210 can be heated in a heater 252, such as by combusting one or more fuels 254 in the heater 252 to increase the temperature, increase the pressure, or both, of the production gas stream 210. The heated or pressurized production gas stream 210 can be fed through a primary energy-recovery system 256, such as a turbine and generator combination, to produce electricity 258.

The system 250 can also include a recuperator heat exchanger 260 to recover heat energy from the hot production gas stream 210 downstream of the heater 252 and the primary energy-recovery system 256. The recuperator heat exchanger 260 uses the relatively high temperature of the production gas stream 210 downstream of the primary energy-recovery system 256 to increase the temperature of the inlet flow of the production gas stream 210 before it enters the heater 252 and the primary energy-recovery system 256, thus increasing the overall efficiency of the system 250 compared to a system that did not include a recuperator heat exchanger. The recuperator heat exchanger system 250 of FIG. 10 can be particularly well suited for very low-temperature geothermal reservoirs, such as those at temperatures below about 75° C.

After recovering energy from the production gas stream 210, such as via the secondary energy-recovery loop 224, as in FIG. 9, or via the recuperator heat exchanger 260, as in FIG. 10, the production gas stream 210 can be fed into a separator or separation system 262 that can separate $CO_2$ in the production gas stream 210 from $CH_4$ and other gaseous components in the production gas stream 210 to form a relative pure $CO_2$ stream 264 and a $CH_4$ and other fuels stream 266. The $CO_2$ stream can be cooled in a cooling unit 268 and compressed in a pump or compressor 270, if desired, for reinjection back into the reservoir through the injection well 214. The $CH_4$/fuel stream 266 can be used to supply heaters of the system 200, 250, such as to form all or part of the fuel stream 219 for the heater 218 (FIG. 9), all or part of the fuel stream 254 for the heater 252 (FIG. 10), or all or part of the fuel stream 244 for the secondary heater 242 in the secondary energy-recovery loop 224 (FIG. 9). A portion of the $CH_4$/fuel stream 266 can also be used in another part of the facility (such as in the EOR facility 206, or in a co-located ethanol facility or other co-located facility), or a portion or all of the $CH_4$/fuel stream 266 can be sold in the open market.

A direct CO2 turbine may be used after the compressor that is required in all CO2-EOR operations. This configuration may require inclusion of a pump/compressor before the turbine (preferably before the methane heater and waste heat capture unit, as well) if the existing EOR compressor has an insufficient output pressure. A pump could, alternatively, be included after the cooling unit—this configuration may be preferable, since the cold liquid/supercritical stream could relatively easily be recompressed to required injection conditions. Note that the presence of a pump after the power system is defined in the application in some cases, but the case of a direct turbine after the compressor is not explicitly specified.

EXAMPLES

The invention will be further described by reference to the following examples, which are offered to further illustrate various embodiments of the present invention. It should be understood, however, that many variations and modifications may be made while remaining within the scope of the present invention. The Examples include numerical modeling of electricity production from various working fluids or production fluids. The modeling was created using Matlab, sold by The MathWorks Inc., Natick, Mass., USA, together with the National Institute of Standards and Technology (NIST) Reference Fluid Thermodynamic and Transport Properties Database (REFPROP), Version 9.0.

Example 1

Figure 11A:
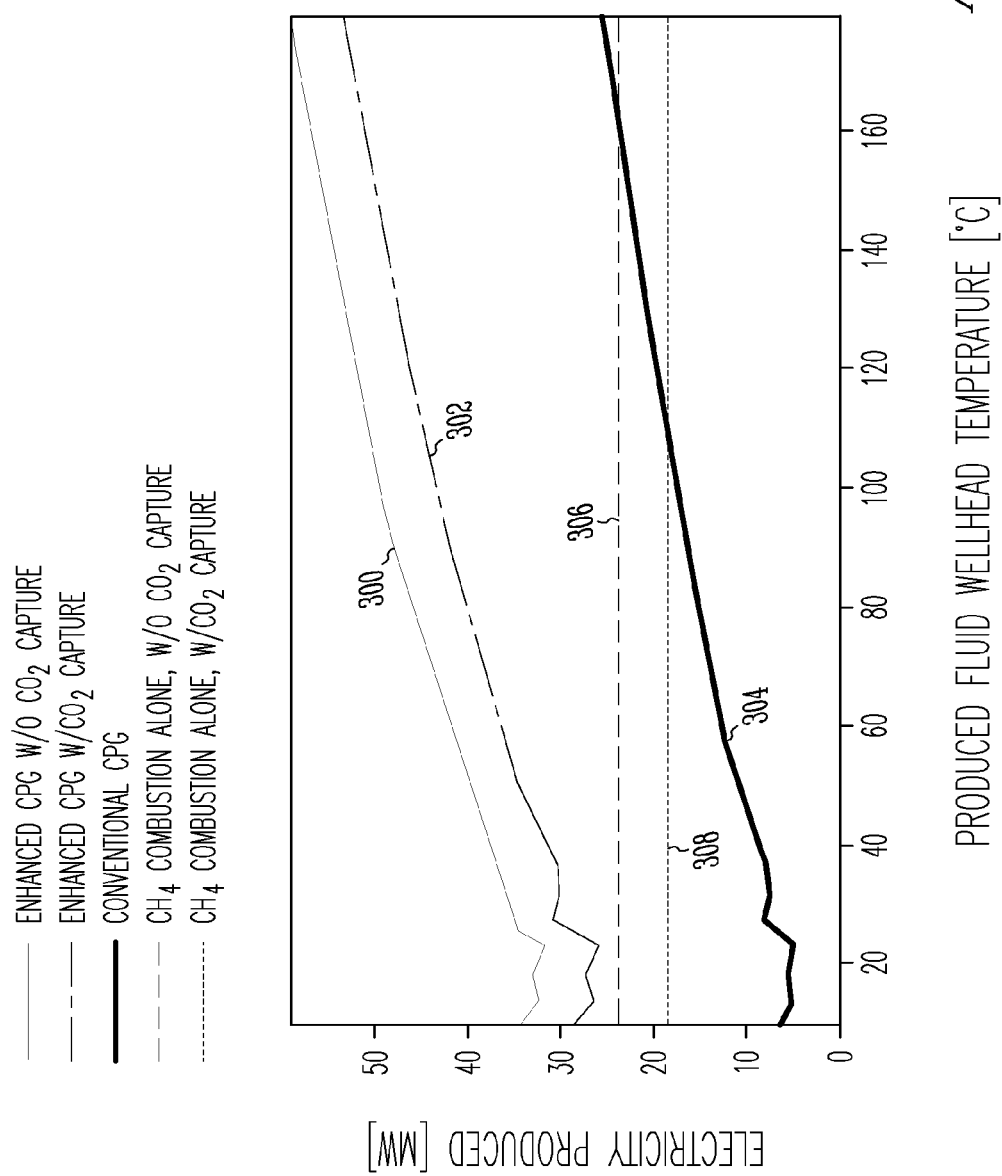
FIG. 11A shows a graph of electricity produced by a methane-enhanced geothermal energy recovery system compared to a non-enhanced $CO_2$-based geothermal energy recovery system and compared to methane combustion depending on the wellhead temperature of the produced fluid.
Figure 11B:
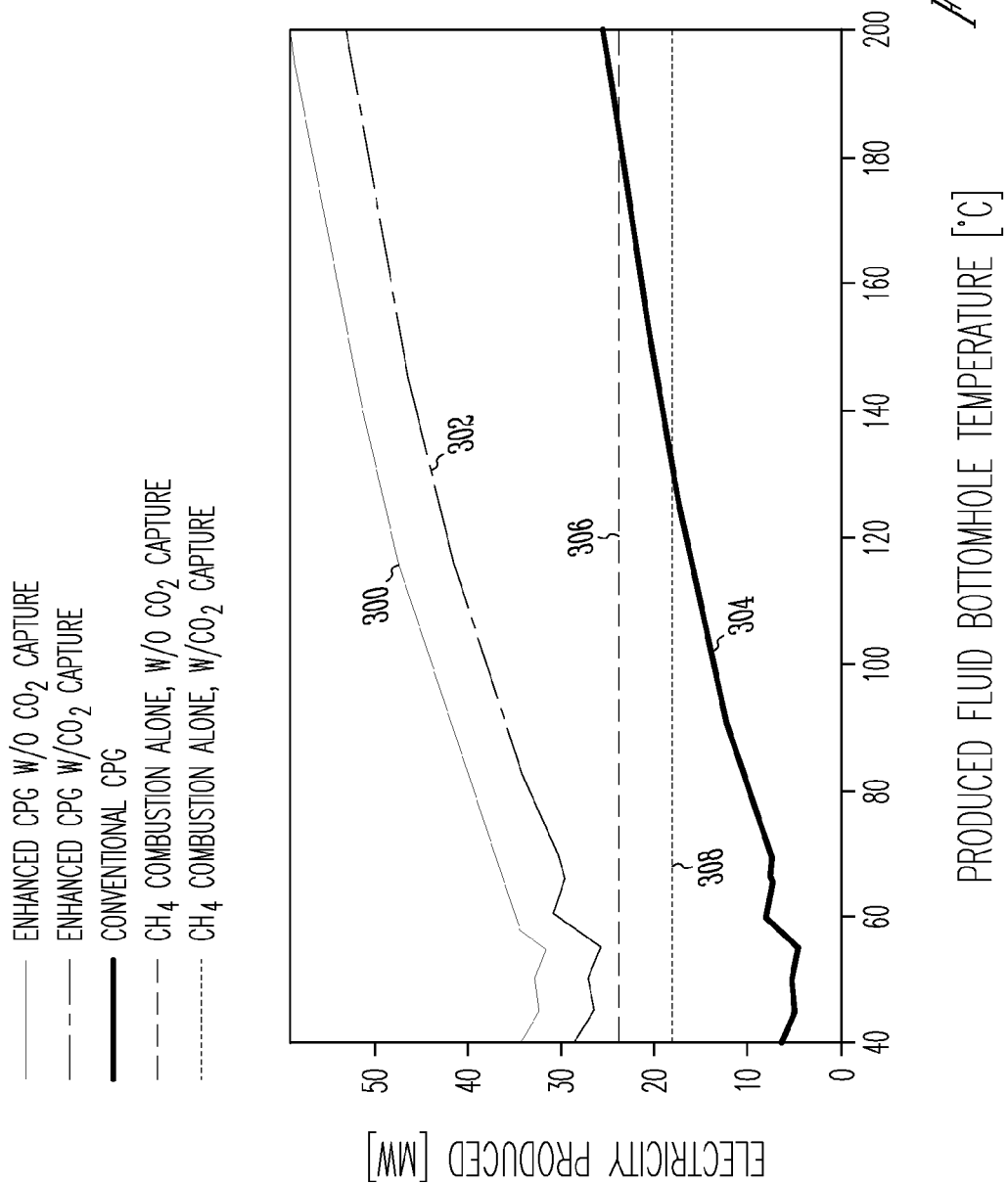
FIG. 11B shows a graph of electricity produced by a methane-enhanced geothermal energy recovery system compared to a non-enhanced $CO_2$-based geothermal energy recovery system and compared to methane combustion depending on the bottomhole temperature of the produced fluid.

FIG. 11A shows the electricity produced (in megawatts (MW)) depending on the wellhead temperature of the working fluid or the production fluid immediately after it is produced to the surface. FIG. 11B shows the electricity produced depending on the bottomhole temperature. The difference in temperature between the well bottom temperatures (FIG. 11B) and the wellhead temperature (FIG. 11A) are due to Joule-Thompson cooling, which occurs as the fluid pressure decreases during fluid ascent in the production well, such that the fluid bottomhole temperature and pressure are greater than the wellhead temperature and pressure. The calculations employed to create FIGS. 11A and 11B account for the Joule-Thompson behavior, which does not occur with water-based geothermal working fluids.

The modeling assumed a reservoir depth of 1500 m, a flow rate of the production fluid of 200 kg/s, that the production fluid is 99 wt % $CO_2$ and 1 wt % methane, that 2.0 kg/s of the methane is separated and combusted to boost the temperature, the pressure, or both of the production fluid. The expansion device and generator are assumed to have a power system efficiency of 50% of the Carnot efficiency.

FIGS. 11A and 11B both include data lines for the electricity produced by a methane-enhanced $CO_2$ Plume Geothermal (ME-CPG) system, similar to the system 10 shown in FIG. 1. Two data lines are shown for ME-CPG systems, a first line 300 shows the electricity produced if the $CO_2$ if the exhaust stream 56 from the heater 48 is not captured, such as in a $CO_2$ capture system 58, and a second line 302 shows the electricity produced if the $CO_2$ is captured. If a $CO_2$ capture system 58 is used, it can use up some of the electricity produced by the energy recovery system 32, for example to capture and compress the $CO_2$, which is demonstrated by data line 302 in FIGS. 11A and 11B being lower than the line 300. For the models, it is assumed that the $CO_2$ capture system 58 provides 90% capture effectiveness, e.g., 90% of the $CO_2$ created in the heater 48 is captured by the $CO_2$ capture system 58, and that the captured $CO_2$ is compressed and injected into the reservoir. For both the $CO_2$ capture data line 302 and the non-$CO_2$ capture data line 300, it is assumed that all of the methane in the production fluid is separated and combusted to increase the temperature of the production fluid, increase the pressure of the production fluid, or both. 90% of the heat of methane combustion is assumed to be transferred to the production fluid and captured by the power cycle.

FIGS. 11A and 11B also show data for geothermal recovery system that does not separate and combust released methane, e.g., a CPG only system, represented by line 304, and lines for electricity production from the methane combustion alone, both without $CO_2$ capture (line 306) and with $CO_2$ capture (line 308).

As shown in FIGS. 11A and 11B, it has been surprisingly found that the recovery of geothermal energy using a $CO_2$ and methane production fluid in conjunction with the separation and combustion of a portion of the methane can produce more electricity than the combination of both the $CO_2$ geothermal energy recovery and combustion of methane alone. In other words, the combination of both geothermal energy recovery with a $CO_2$ plume and separation and combustion of methane to boost the temperature or pressure, or both, of the production fluid is surprisingly more efficient than what would be expected for the combination of each of these energy components by themselves. For example, in FIG. 11A at a wellhead temperature of about 100° C., the CPG-only data line 304 shows electricity production of about 17 MW and the methane combustion with $CO_2$ capture data line 308 shows electricity production of about 18 MW so that the expected combined electricity production for geothermal energy recovery using CPG and methane combustion is about 35 MW. However, as shown in FIG. 11A, the methane-enhanced geothermal energy recovery with $CO_2$ capture data line 302 shows electricity production at a 100° C. wellhead temperature of about 44 MW, which is about 25% higher than the 35 MW that would be expected.

Example 2

Figure 12B:
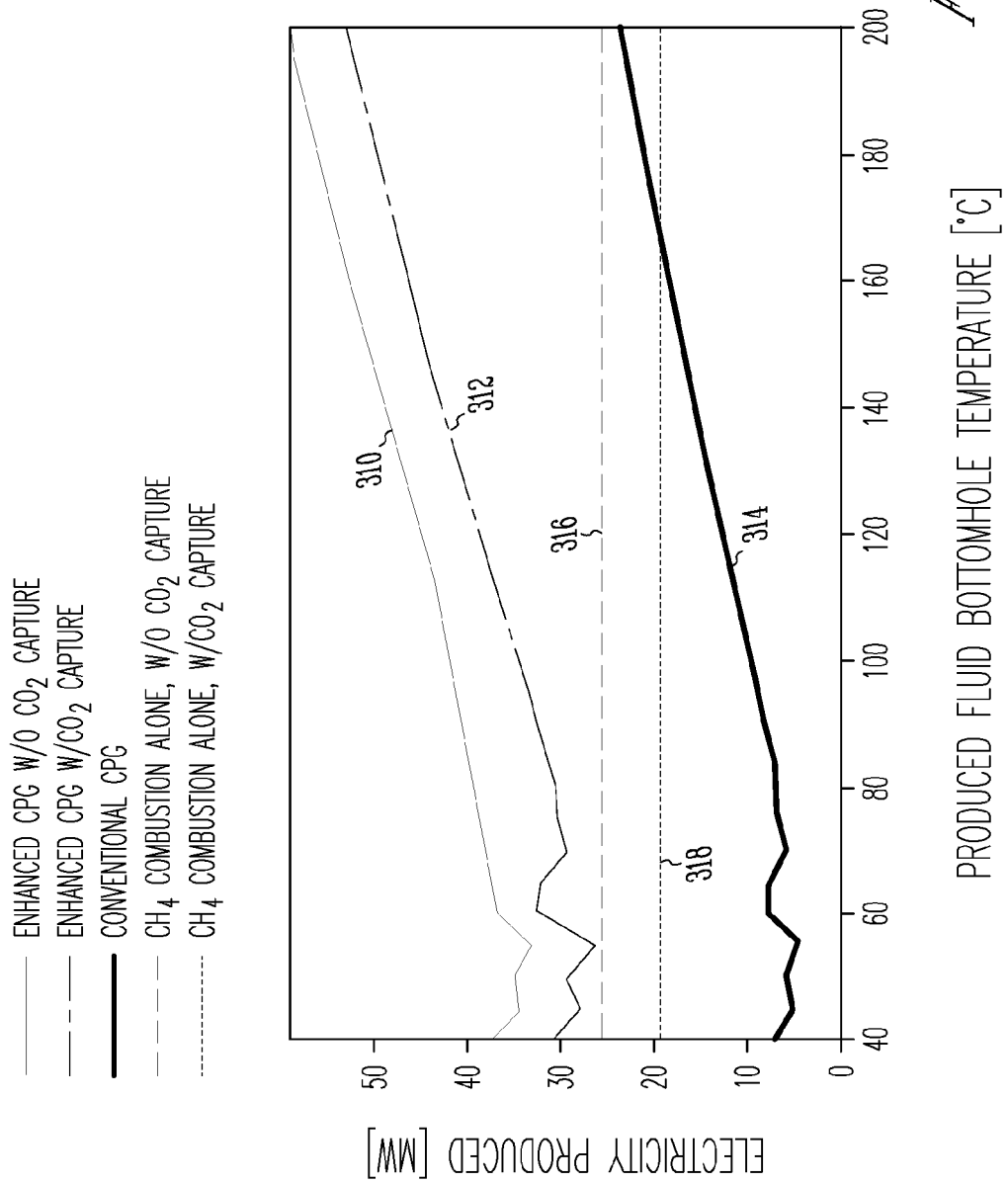
FIG. 12B shows a graph of electricity produced by a methane-enhanced geothermal energy recovery system compared to a non-enhanced $CO_2$-based geothermal energy recovery system and compared to methane combustion depending on the bottomhole temperature of the produced fluid.

FIGS. 12A and 12B show similar data comparing a ME-CPG system without $CO_2$ capture (data line 310) and with $CO_2$ capture (data line 312), CPG-only geothermal energy recovery (data line 314), and methane combustion only without $CO_2$ capture (data line 316) and with $CO_2$ capture (data line 318), but at a reservoir depth of 2500 m, rather than the 1500 m in FIGS. 11A and 11B.

Example 3

Figure 13:
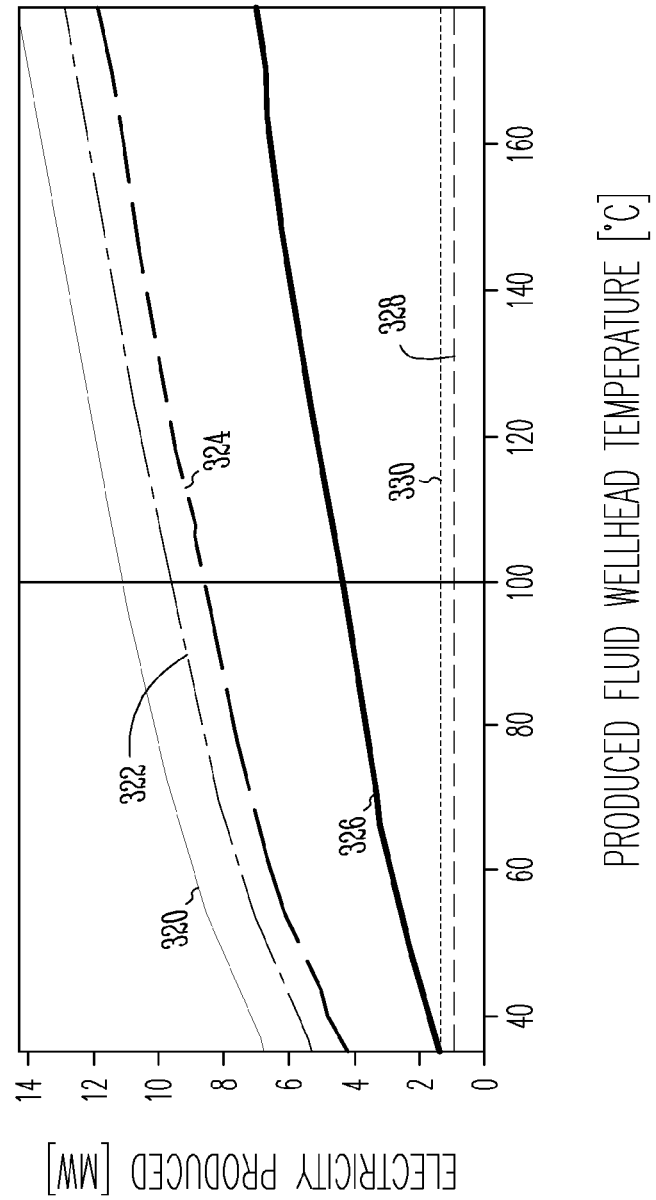
FIG. 13 shows a graph of electricity produced by a waste heat-enhanced geothermal energy recovery system compared to a non-waste heat enhanced $CO_2$-based geothermal energy recovery system and compared to waste heat recovery alone.

FIG. 13 shows the electricity produced (in megawatts (MW)) depending on the wellhead temperature of the production fluid. FIG. 13 includes data for methane-enhanced geothermal energy production from an EOR application, where the geothermal energy recovery is further supplemented by waste heat capture from a $CO_2$ compressor.

The modeling for this example assumed a reservoir depth of 1500 m, a flow rate of the production fluid of 100 kg/s. The production fluid is assumed to be 20 wt % $CO_2$, 1 wt % $CH_4$, and the remainder liquid hydrocarbons and brine. The flow rate of methane separated from the production fluid and combusted is assumed to be 0.5 kg/s. The energy recovery system for the EOR system is assumed to be a binary system with a secondary working fluid such that energy recovery is less efficient than the direct turbine system that can be used for Examples 1 and 2. Therefore, the energy recovery system is assumed to have a power system efficiency of 33% of the Carnot efficiency. The waste heat is generated by a high ratio (10:1) compressor with heat capture only off the final stage of compression, with no heat capture of any compressor intercoolers. Therefore, additional heat capture from the compressor beyond that shown in FIG. 13 may be possible.

FIG. 13 includes data for methane-enhanced and waste-heat enhanced geothermal energy recovery without $CO_2$ capture of any $CO_2$ produced by methane combustion (data line 320) and methane-enhanced and waste-heat enhanced geothermal energy recovery with $CO_2$ capture (data line 322). A data line 324 is also included to show the electricity produced just from the methane-enhanced geothermal energy recovery, e.g., with no waste heat capture, and without $CO_2$ capture. FIG. 13 further includes data for geothermal recovery system that does not separate and combust released methane, e.g., a CPG only system, represented by line 326, data for electricity production from the methane combustion alone without $CO_2$ capture (line 328), and data for the electricity produced via the waste heat capture alone (line 330).

As shown in FIG. 13, it has been surprisingly found that the capturing waste heat to further heat a working fluid in addition to geothermal energy recovery can produce more electricity than the combination of both the geothermal energy recovery and the captured waste heat alone. In other words, the combination of both geothermal energy recovery and waste heat capture is surprisingly more efficient than what would be expected for the combination of each of these energy components by themselves. For example, in FIG. 13 at a wellhead temperature of about 100° C., the methane-enhanced geothermal alone (with no waste heat capture and no $CO_2$ capture) data line 324 shows electricity production of about 8.5 MW and the waste heat captured data line 330 shows electricity production of about 1.5 MW so that the expected combined electricity production for geothermal energy and waste heat capture is about 10 MW. However, as shown in FIG. 13, the methane-enhanced geothermal energy recovery with waste heat capture and no $CO_2$ capture results in electricity production at a 100° C. wellhead temperature of about 11 MW, which is about 10% higher than the 10 MW that would be expected.

Figure 14:
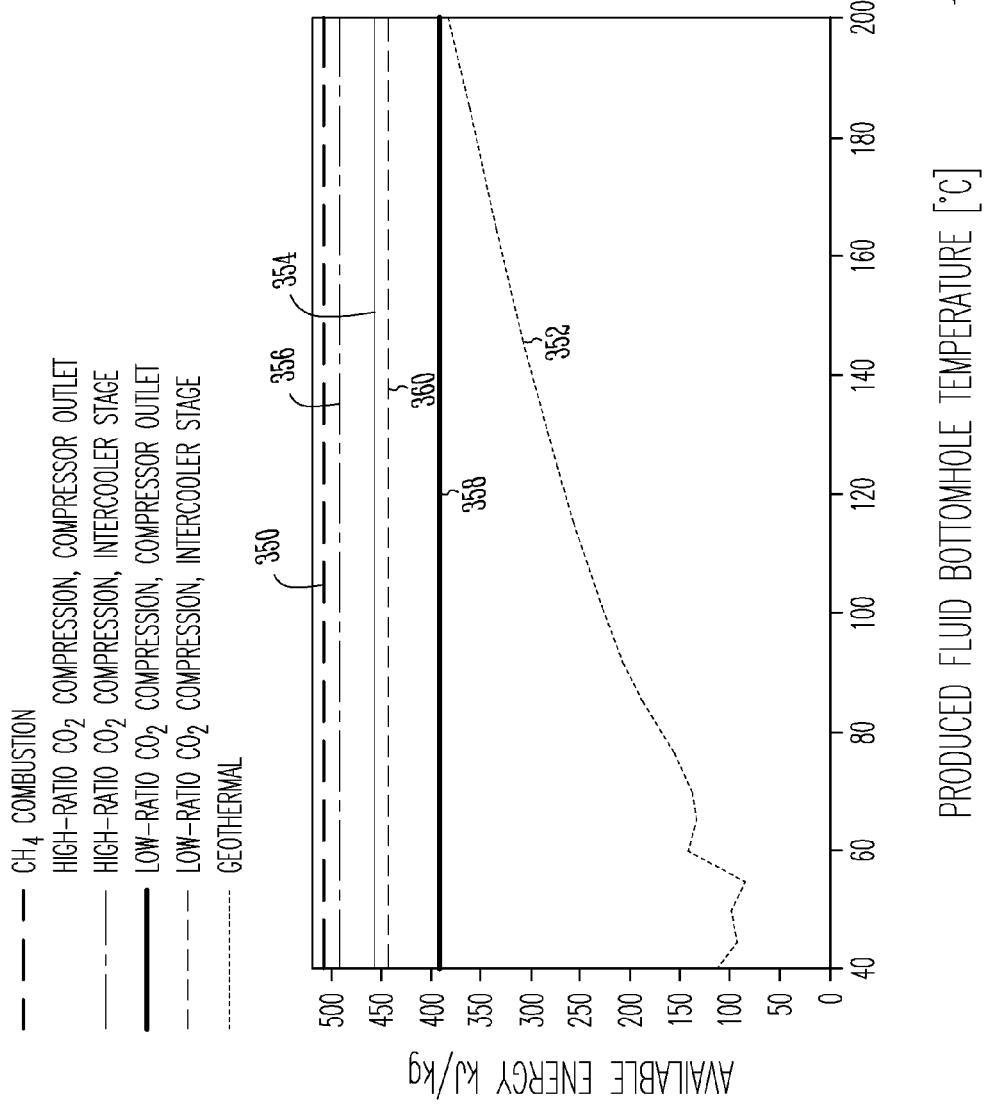
FIG. 14 shows a graph of the available energy values from various sources.

Various combinations of compressor stages can be used to capture waste heat for supplementing geothermal energy recovery. FIG. 14 shows the available energy (in kJ per kg of produced fluid) from various sources at various bottomhole temperatures. The example energy sources include methane combustion (line 350), geothermal energy (line 352), waste heat from the compressor outlet of a high-ratio, e.g., 10:1, $CO_2$ compressor (line 354), waste heat from an intercooler for a high-ratio, e.g., 10:1, $CO_2$ compressor (line 356), waste heat from the compressor outlet of a low-ratio, e.g. 2:1, $CO_2$ compressor (line 358), and waste heat from an intercooler for a low-ratio, e.g., 2:1, $CO_2$ compressor (line 360).

Example 4

Figure 15:
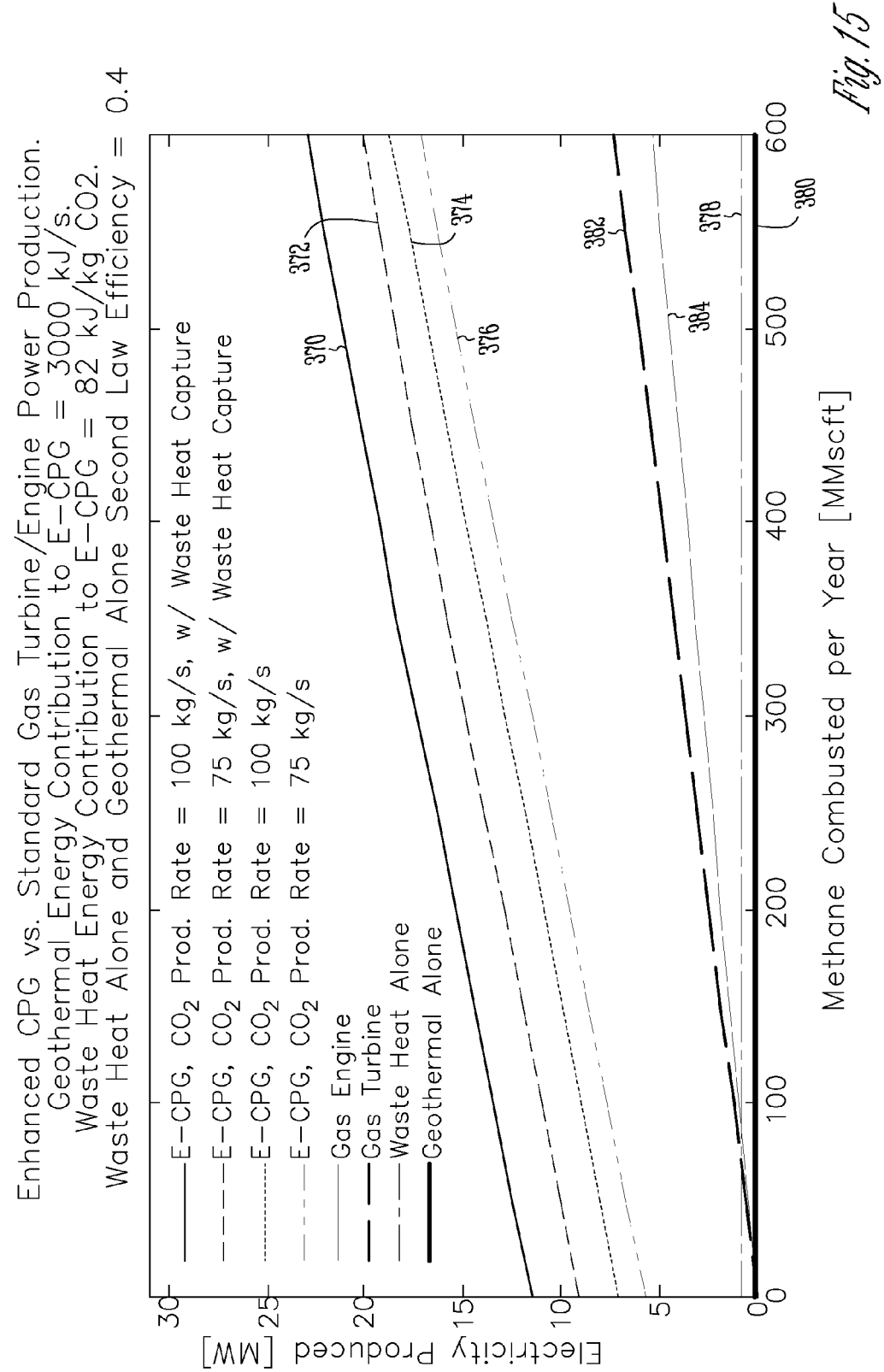

FIG. 15 shows the electricity produced (in megawatts (MW)) depending on the volume of methane (in million standard cubic feet per year) combusted. FIG. 15 includes data for methane-enhanced geothermal energy production from an EOR application, where the geothermal energy recovery is further supplemented by waste heat capture from a $CO_2$ compressor.

FIG. 15 includes data lines for the electricity produced by a methane-enhanced $CO_2$ Plume Geothermal (E-CPG) system, similar to the system 200 shown in FIG. 9, e.g., a $CO_2$-based production fluid 210 is assumed to be produced from a production well 204, pass through the EOR facility 206, and then into a methane combustion heater 218 and a direct $CO_2$ turbine (e.g., the primary energy-recovery system 220), and is then is used to heat a secondary energy-recovery loop 224 with ammonia as the working fluid. The $CO_2$-based production fluid 210 can then be cooled, if needed, compressed, and reinjection into the reservoir.

A first data line 370 in FIG. 15 shows the electricity produced for methane-enhanced CPG (E-CPG) for a $CO_2$ flow rate of 100 kg/sec and including waste heat capture of excess heat from a $CO_2$ compressor intermediate stage of the EOR facility being added to the enhanced CPG power system rather than exhausted to the atmosphere, as is commonly done in EOR operations. A second data line 372 shows the electricity produced for an E-CPG system for a $CO_2$ flow rate of 75 kg/sec, also with waste heat capture. A conservative estimate of 75% of the compressor waste heat is assumed to be transferred to the enhanced CPG power system. The waste heat translates to 109 kJoules/kg $CO_2$. Note that this waste heat quantity is a conservative assumption in some cases, as EOR sites may have multiple CO2 compression steps. Third and fourth data lines 374 and 376, respectively, show the electricity produced at 100 kg/sec and 75 kg/sec, respectively, without waste heat capture from the $CO_2$ compressor.

For each of the data lines 370, 372, 374, 376, the $CO_2$-based working fluid is assumed to leave the EOR facility, including $CO_2$ compressors, at 2000 psia (about 13.8 MPa) and 300° F. (about 149° C.), which is a moderate $CO_2$ injection pressure and a reasonable pre-cooling compressor outlet temperature. The $CO_2$ mass flow rate is shown for 100 kg/second (data lines 370 and 374) and 75 kg/second (data lines 372 and 376), which are consistent with a moderately-sized $CO_2$ EOR facility. Parasitic energy requirements of the compressors or pumps within the system are accounted for in the results, but the compressor power required by the EOR facility to raise $CO_2$ pressure from separation to injection conditions is not included because the facility requires this energy regardless of whether an enhanced CPG system is included. Either the primary energy-recovery or the secondary energy-recovery loop can be used to gather the geothermal and, if applicable, waste heat.

Each of the data lines 370, 372, 374, and 376 also includes an assumption of geothermal heat input in the system, the reservoir is assumed to be a relatively low temperature EOR field with moderate oil and water production (6000 barrels/day of each constituent). Geothermal energy is extracted from the combined $CO_2$, hydrocarbon, and water production stream, cooling the stream from 57° C. (about 135° F.) to ambient conditions. A conservative estimate of 75% of the geothermal energy is assumed to be transferred to the enhanced CPG power system.

FIG. 15 also include a data line 378 for how much electricity the waste heat alone could conceivable produce, and a data line 380 for how much electricity the geothermal energy alone could potentially produce. Finally, for reference, FIG. 15 also shows the amount of electricity that could be produced using an off-the-shelf gas turbine (data line 382) assumed to have 34% efficiency, and an off-the-shelf gas engine (data line 384) assumed to have 25% efficiency.

As can be seen in FIG. 15, the methane-enhanced CPG system including a secondary energy-recovery loop can provide for dramatically more electricity production compared to the geothermal energy alone, the waste heat alone, or the expected electricity production from methane combustion alone. As is further shown in FIG. 15, the enhanced CPG system with waste heat capture is more efficient than the expected combination of the enhanced CPG system alone and the waste heat alone. Finally, as shown in FIG. 15, the total energy produced in the enhanced CPG system with a secondary energy-recovery loop, including waste heat, is more than would be expected for each energy input by itself. FIG. 15 therefore shows that the enhanced CPG system with a secondary energy-recovery loop and waste heat recovery provides an unexpected synergistic benefit beyond what is expected for the combination of each individual energy input.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A system comprising:
one or more injection wells for accessing one or more underground reservoirs, the one or more reservoirs being at one or more first temperatures and containing at least one native fluid, the native fluid including a solution comprising methane, each of the one or more injection wells having an injection well reservoir opening in fluid communication with at least one of the one or more reservoirs;
one or more production wells, each having a production well reservoir opening in fluid communication with at least one of the one or more reservoirs;
a working-fluid supply system for providing a non-water based working fluid to the one or more injection wells at a second temperature lower than the first temperatures,
wherein exposure of the non-water based working fluid to the native fluid causes at least a portion of the methane to come out of solution with the native fluid to form a production fluid of at least a portion of the non-water based working fluid and the portion of the methane,
wherein exposure of the mixture to the first temperatures heats the production fluid to a third temperature that is higher than the second temperature, wherein the production fluid enters one or more of the production well reservoir openings; and
an energy recovery apparatus in fluid communication with the one or more production wells, the energy recovery apparatus including;
at least one separation apparatus that separates at least a portion of the methane from the production fluid,
a heater that combusts at least a portion of the separated methane and heats the production fluid to a fourth temperature that is higher than the third temperature to provide a heated production fluid, and
one or more expansion devices and one or more generators, one or more heat exchangers, or a combination thereof that convert energy contained in the heated production fluid to electricity, heat energy, or a combination thereof.

2. The system of claim 1, wherein the at least one separation apparatus is downstream of the one or more expansion devices and the one or more generators, the one or more heat exchangers, or the combination thereof.

3. The system of claim 1, wherein the energy recovery apparatus further comprises a feed source of an outside fuel to the heater, wherein the heater combusts the separated methane and the outside fuel in order to heat the production fluid.

4. The system of claim 1, wherein the energy recovery apparatus comprises at least one heat recovery apparatus that recovers heat energy from at least a first portion of the production fluid to heat a second portion of the production fluid that is upstream from the first portion of the production fluid.

5. The system of claim 4, further comprising at least one compressor that compresses at least a portion of the production fluid, wherein the at least one heat recovery apparatus recovers heat energy from the production fluid downstream at or downstream of the at least one compressor.

6. The system of claim 4, wherein the native fluid further comprises at least one hydrocarbon, wherein the production fluid comprises at least a portion of the at least one hydrocarbon,
further comprising one or more separation units to separate the at least one hydrocarbon from the production fluid;
wherein the heat recovery apparatus recovers heat energy from at least one of the one or more separation units, the separated at least one hydrocarbon, and the separated production fluid.

7. The system of claim 1, wherein the one or more reservoirs are located below one or more caprocks and are accessible without using large-scale hydrofracturing.

8. The system of claim 1, wherein the one or more reservoirs comprise a brine aquifer, the native fluid comprises a brine with methane dissolved in the brine.

9. The system of claim 1, wherein the one or more reservoirs comprise a partially-depleted oil or natural gas field and the native fluid comprises at least one hydrocarbon.

10. The system of claim 1, wherein the production fluid comprises from 0.01 wt % to 99 wt % of the non-water based working fluid.

11. The system of claim 1, wherein the non-water based working fluid is carbon dioxide.

12. The system of claim 11, wherein the carbon dioxide is supercritical carbon dioxide.

13. The system claim 11, wherein the carbon dioxide is obtained from a power plant, an industrial plant, or a natural carbon dioxide source.

14. The system of claim 13, wherein the system comprises the power plant or the industrial plant.

15. The system of claim 1, further comprising a reinjection system that reinjects at least a portion of the non-water based working fluid through one of more of the injection wells.

16. The system of claim 15, wherein the one or more production wells, the energy recovery system, and the reinjection system form a thermosiphon of the non-water based working fluid.

17. A method comprising:
introducing a non-water based working fluid at a first temperature through one or more injection wells to one or more underground reservoirs containing at least one native fluid, the native fluid including a solution comprising methane, wherein the one or more reservoirs are at one or more second temperatures that are greater than the first temperature;
exposing the non-water based working fluid to the native fluid so that at least a portion of the methane comes out of solution with the native fluid to form a production fluid of at least a portion of the non-water based working fluid and the portion of the methane;
exposing the production fluid to the second temperature to heat the production fluid to a third temperature that is greater than the first temperature;
producing the production fluid through one or more production wells;
separating at least a portion of the methane from the production fluid;
combusting at least a portion of the separated methane to heat the production fluid to a fourth temperature that is higher than the third temperature; and
converting thermal energy in the heated production fluid to at least one of electricity and heat energy.

18. The method of claim 17, wherein converting the thermal energy in the heated production fluid comprises combusting at least one of an outside fuel and the separated methane to heat the production fluid to the fourth temperature.

19. The method of claim 17, wherein converting the thermal energy in the heated production fluid to electricity comprises feeding the heated production fluid to an expansion device connected to a generator.

20. The method of claim 17, wherein converting the thermal energy in the heated production fluid to heat energy comprises feeding the heated production fluid to a heat exchanger.

21. The method of claim 17, wherein the separating the portion of the methane is downstream of the converting the thermal energy in the heated production fluid to at least one of electricity and heat energy.

22. The method of claim 17, further comprising recovering heat energy from a first portion of the production fluid to heat a second portion of the production fluid that is upstream from the first portion of the production fluid.

23. The method of claim 22, wherein recovering the heat energy from the first portion of the production fluid comprises recovering heat energy from a compressor that is compressing the first portion of the production fluid.

24. The method of claim 17, wherein the one or more reservoirs are located below one or more caprocks and are accessible without using large-scale hydrofracturing.

25. The method of claim 17, wherein the production fluid comprises from 0.01 wt % to 99 wt % of the non-water based working fluid.

26. The method of claim 17, wherein the non-water based working fluid is carbon dioxide.

27. The method of claim 26, wherein the carbon dioxide is supercritical carbon dioxide.

28. The method of claim 26, further comprising recovering the carbon dioxide from a power plant, an industrial plant, or a natural carbon dioxide source.

29. The method of claim 17, wherein converting the thermal energy in the heated production fluid comprises at least one of producing electricity, heating a second working fluid in one or more heat exchangers, providing condensed fluid to the reservoir; providing cooled fluid to the reservoir, and providing shaft power to one or more pumps or compressors.

30. The method of claim 29, wherein producing the electricity comprises:
either providing at least a portion of the heated production fluid to one or more expansion devices or providing the second working fluid heated in the one or more heat exchangers to the one or more expansion devices, and
producing shaft power to one or more generators to produce the electricity.

31. The method of claim 29, wherein the second working fluid heated in the one or more heat exchangers provides heat energy for direct use, for groundwater heat pumps, for a Rankine power cycle, or a combination thereof.

32. The method of claim 17, wherein converting the energy in the heated production fluid comprises extracting at least a portion of the thermal energy in the heated production fluid and at least a portion of the chemical energy in the heated production fluid.

33. The method of claim 17, further comprising re-injecting at least a portion of the production fluid through one or more of the injection wells.

34. The method of claim 33, wherein re-injecting at least the portion of the production fluid comprises forming a thermosiphon of the production fluid between the one or more production wells and the one or more injection wells.

* * * * *